US005636036A

United States Patent [19]
Ashbey

[11] Patent Number: 5,636,036
[45] Date of Patent: Jun. 3, 1997

[54] INTERACTIVE VIDEO SYSTEM HAVING FRAME RECALL DEPENDENT UPON USER INPUT AND CURRENT DISPLAYED IMAGE

[76] Inventor: James A. Ashbey, 162 Trevelyah Road, London SW17 9LW, United Kingdom

[21] Appl. No.: 399,471

[22] Filed: Sep. 18, 1989

[30] Foreign Application Priority Data

Feb. 27, 1987 [GB] United Kingdom ............. 8704672
Mar. 3, 1987 [GB] United Kingdom ............. 8704966

[51] Int. Cl.⁶ ........................................ H04N 5/76
[52] U.S. Cl. .................... 386/335; 358/342; 348/578; 386/45
[58] Field of Search ................. 358/104, 22, 310, 358/335, 337, 339, 342; 395/126, 129; 273/DIG. 28; 348/578, 603

[56] References Cited

U.S. PATENT DOCUMENTS

| | | | |
|---|---|---|---|
| 3,983,328 | 9/1976 | Newell | 358/337 |
| 4,139,868 | 2/1979 | Eisenberg et al. | 358/335 X |
| 4,360,876 | 11/1982 | Girault et al. | 395/129 X |
| 4,752,836 | 6/1988 | Blanton et al. | 358/104 X |
| 4,807,158 | 2/1989 | Blanton et al. | 358/104 X |
| 4,939,587 | 7/1990 | Deslypper | 358/342 |

FOREIGN PATENT DOCUMENTS

| | | |
|---|---|---|
| 0044642 | 1/1982 | European Pat. Off. |
| 0120487 | 10/1984 | European Pat. Off. |
| 0169339 | 1/1986 | European Pat. Off. |
| 0187073 | 7/1986 | European Pat. Off. |
| WO8302839 | 8/1983 | WIPO |

OTHER PUBLICATIONS

IEEE Global Telecommunications Conference, GLOBECOM '82, Conference Record, vol. 3 of 3, Gordon, R.D., An Intelligent electronic book system and publishing facility, pp. 1365-1369, Miami, 1982.

*Primary Examiner*—W. R. Young
*Attorney, Agent, or Firm*—Millen, White, Zelano, & Branigan, P.C.

[57] ABSTRACT

An interactive video system has a videodisc player, a joystick, a framestore, a display, and a control device for controlling functions such as reading of frames from the framestore to the display. The videodisc player stores several sequences of moving pictures with the frames of the sequences interleaved so that changes can quickly be made from one sequence to another. To mask the reduced frame rate of any one sequence, repeated frames from the framestore are given a alternate blue and red color casts. To give the effect of changing perspectives with motion, the portion of the framestore read to the display changes in dependence upon (ii) the joystick output and (ii) the existing location of the displayed portion in the framestore.

2 Claims, 68 Drawing Sheets

FIG.3

| A | F1 | F2 | F3 | F4 | | | | |

| B | F1A | F1B | F1C | F2A | F2B | F2C | F3A | F3B |

| C | | F1B | | | F2B | | | F3B |

| D | | F1B | F1B' | F1B'' | F2B | F2B' | F2B'' | |

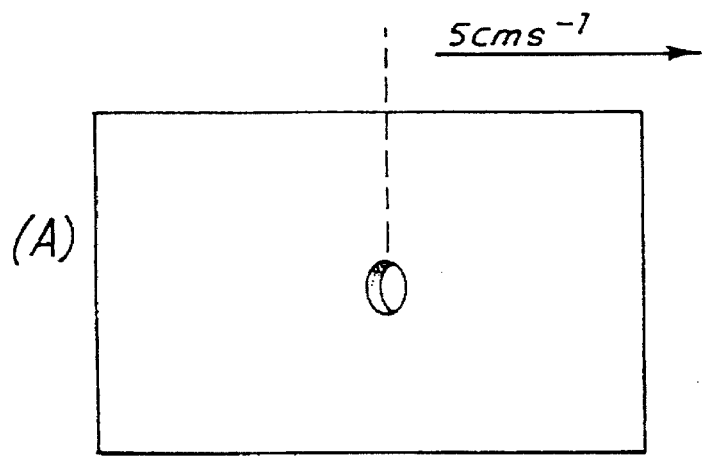
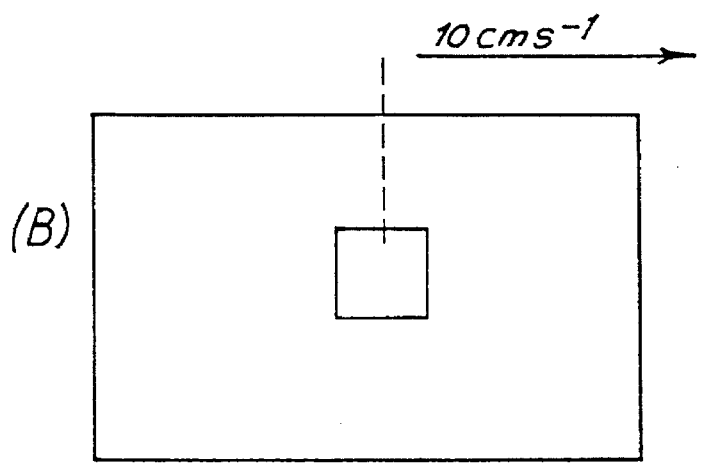
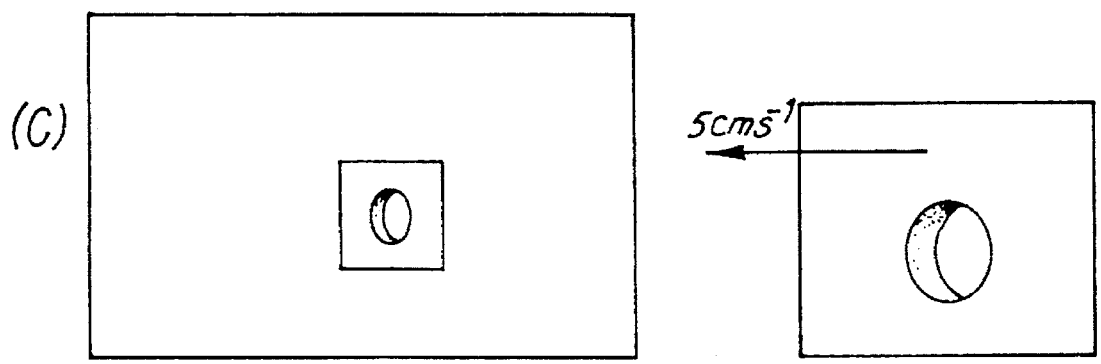
FIG.14

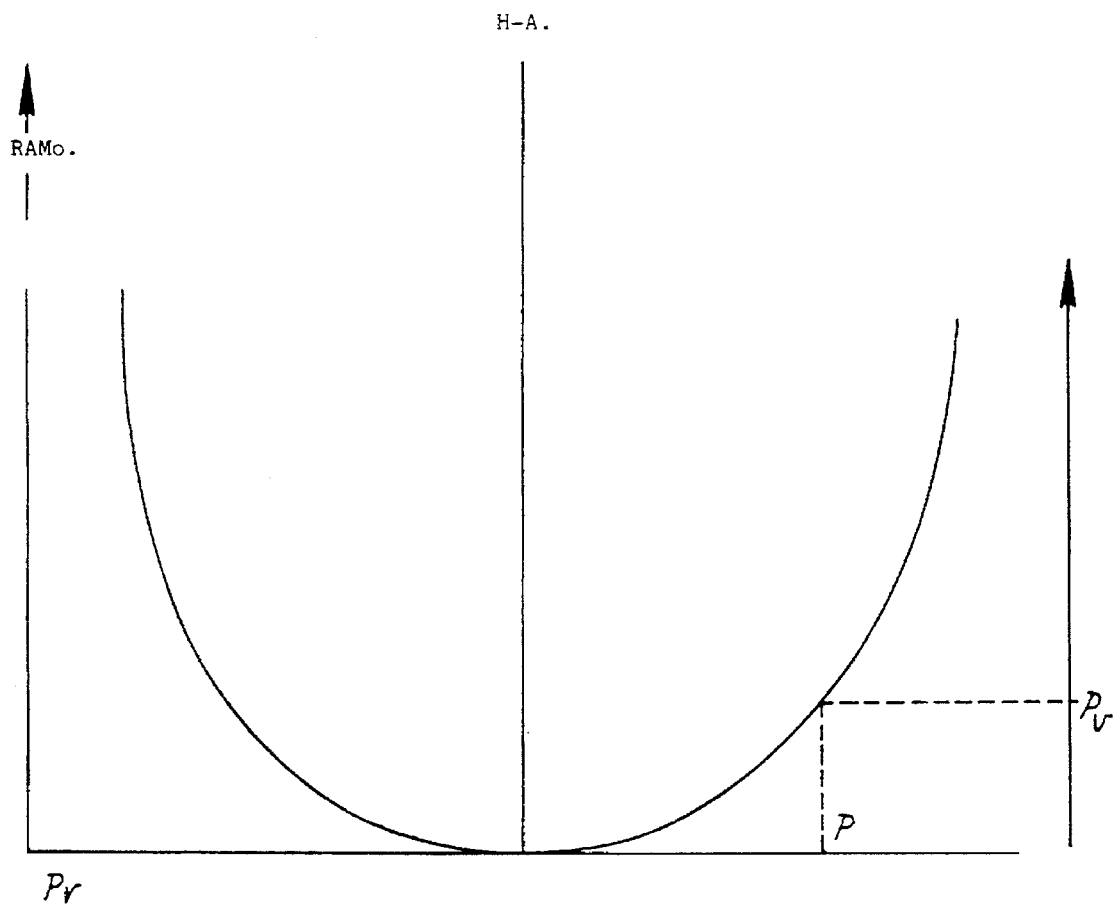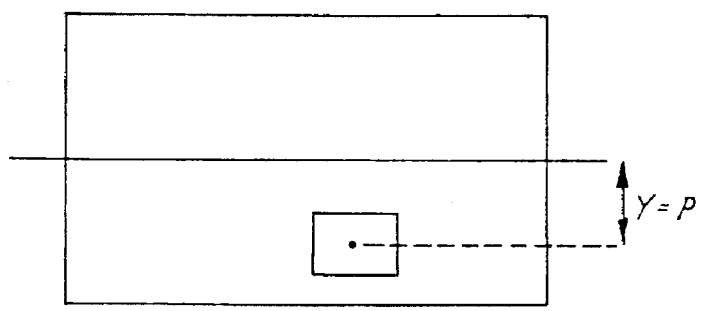
FIG.15A

FIG.23
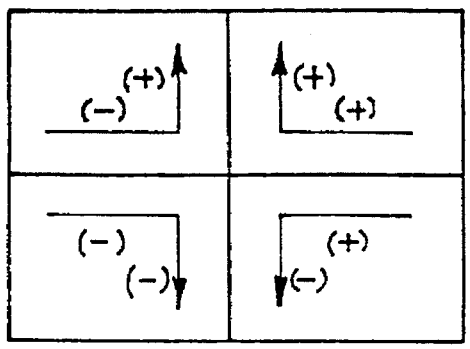
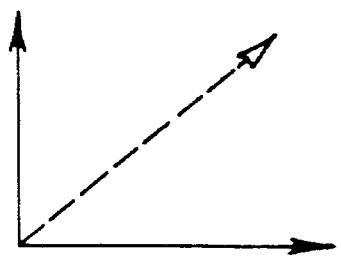
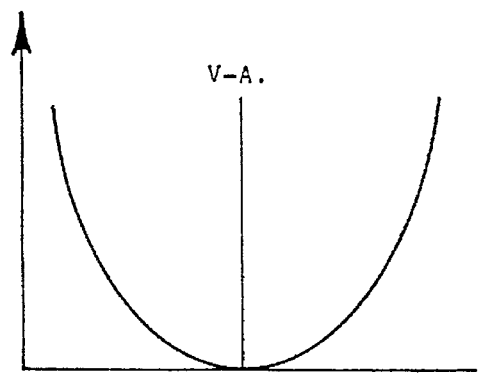
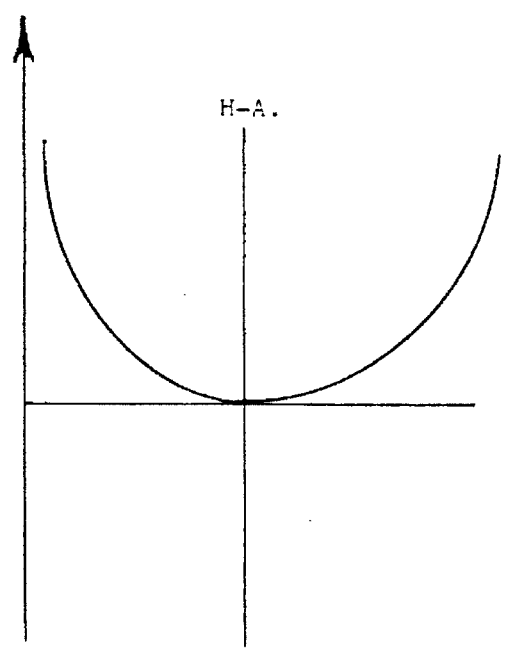

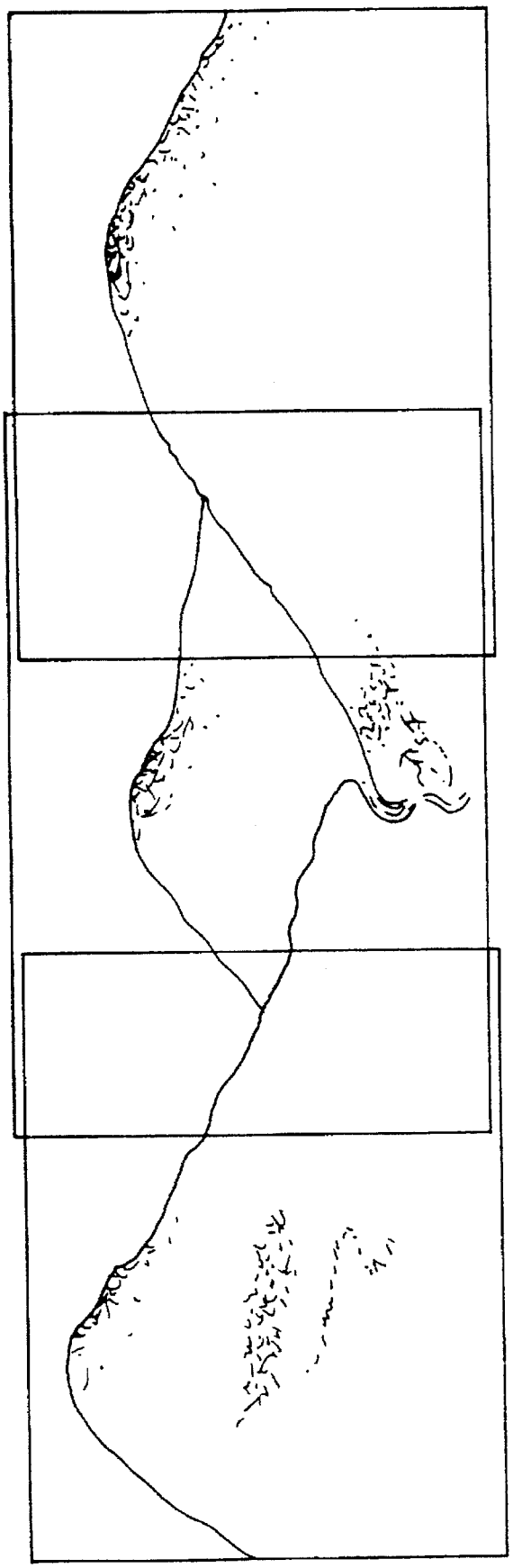
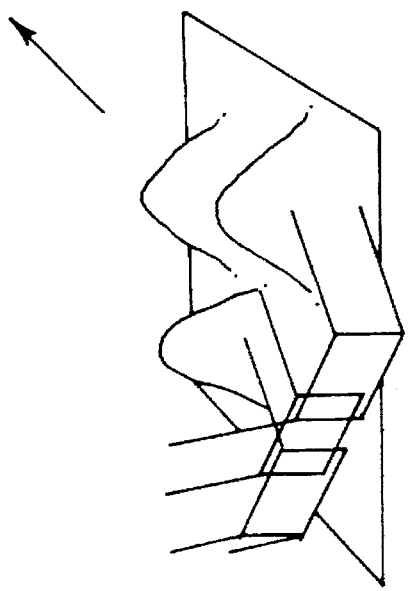
FIG.25

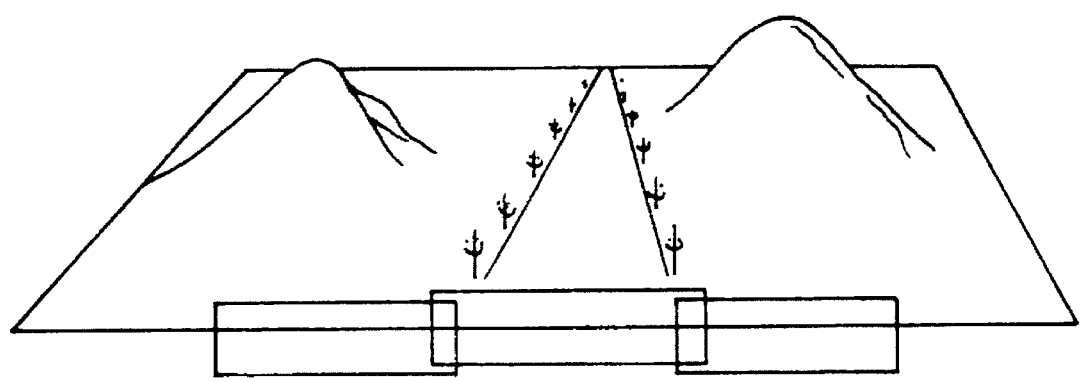
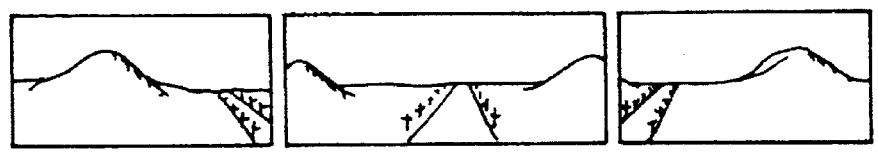
| $C^1$ | $C^2$ | $A^1$ | $A^2$ | $B^1$ | $B^2$ |
|---|---|---|---|---|---|
| $C^3$ | $C^4$ | $A^3$ | $A^4$ | $B^3$ | $B^4$ |
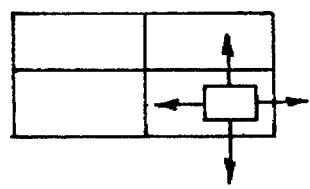
FIG.27
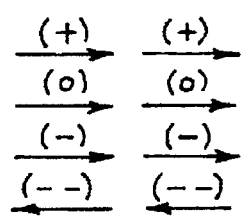

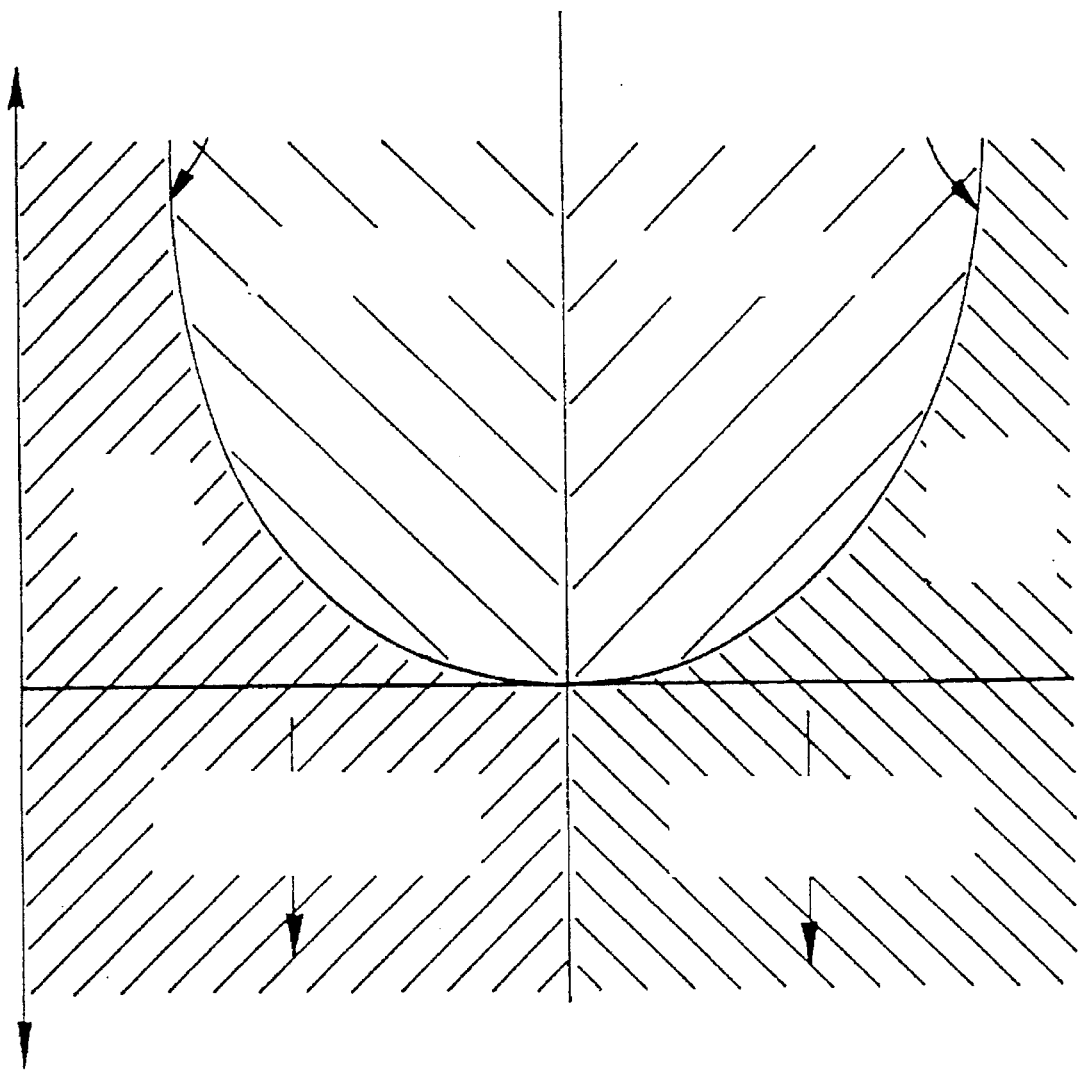
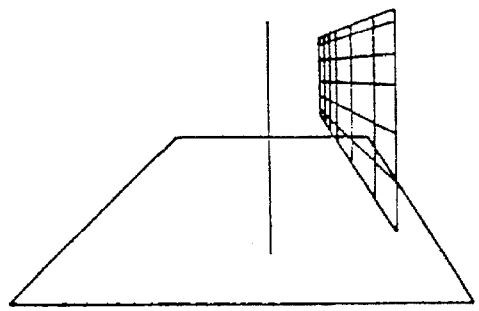
FIG.30

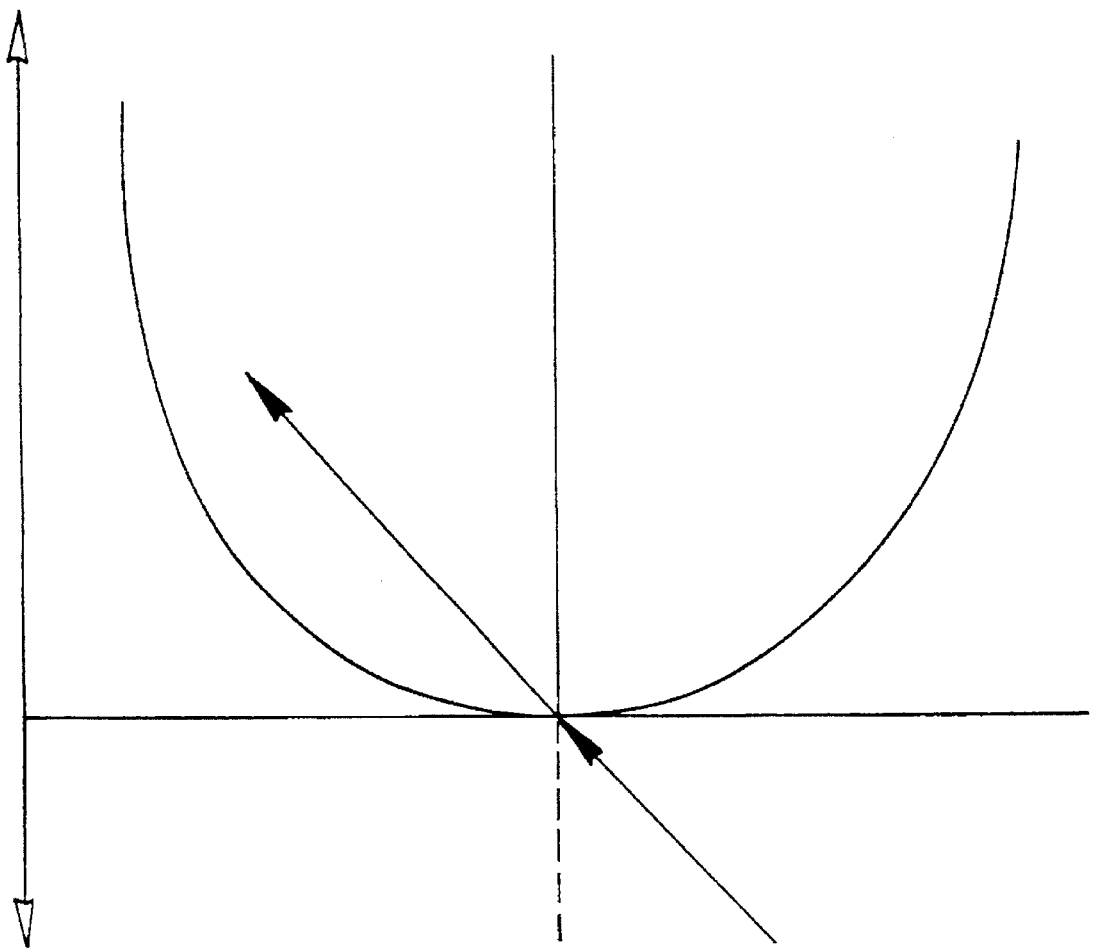
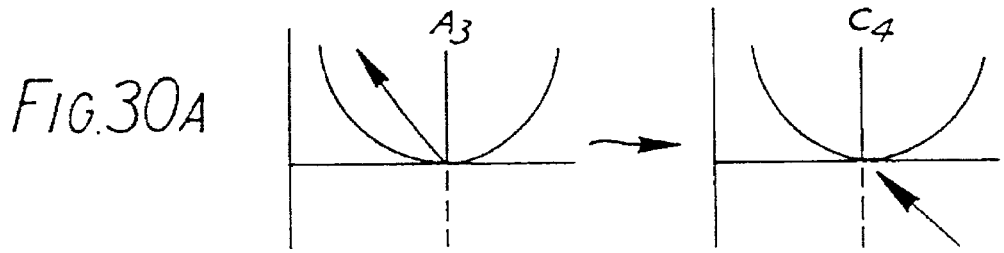
FIG.30A

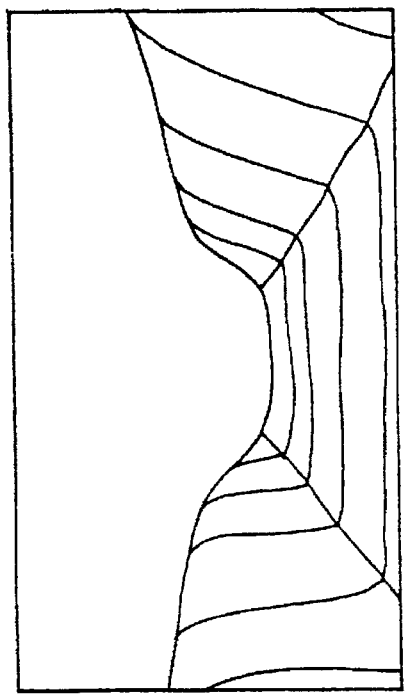
(C)
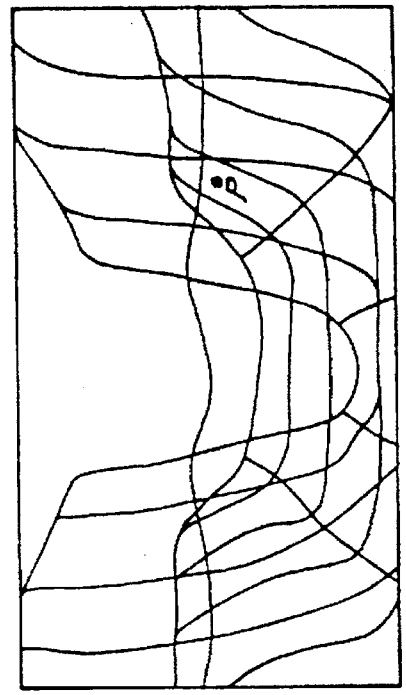
(D)
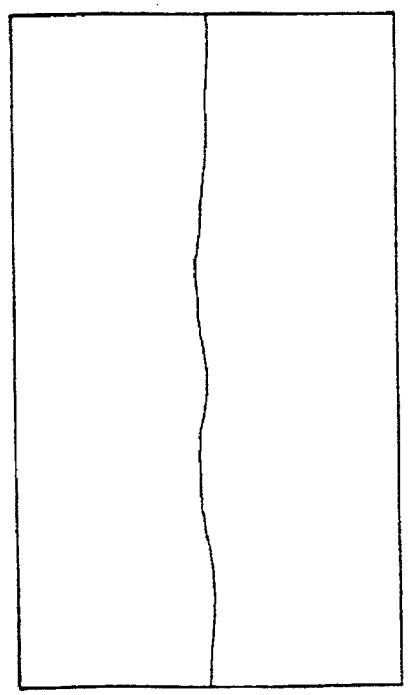
(A)
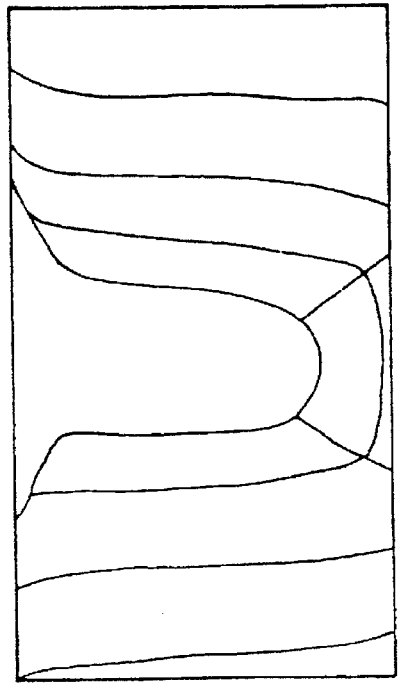
(B)
FIG. 31

FIG.32
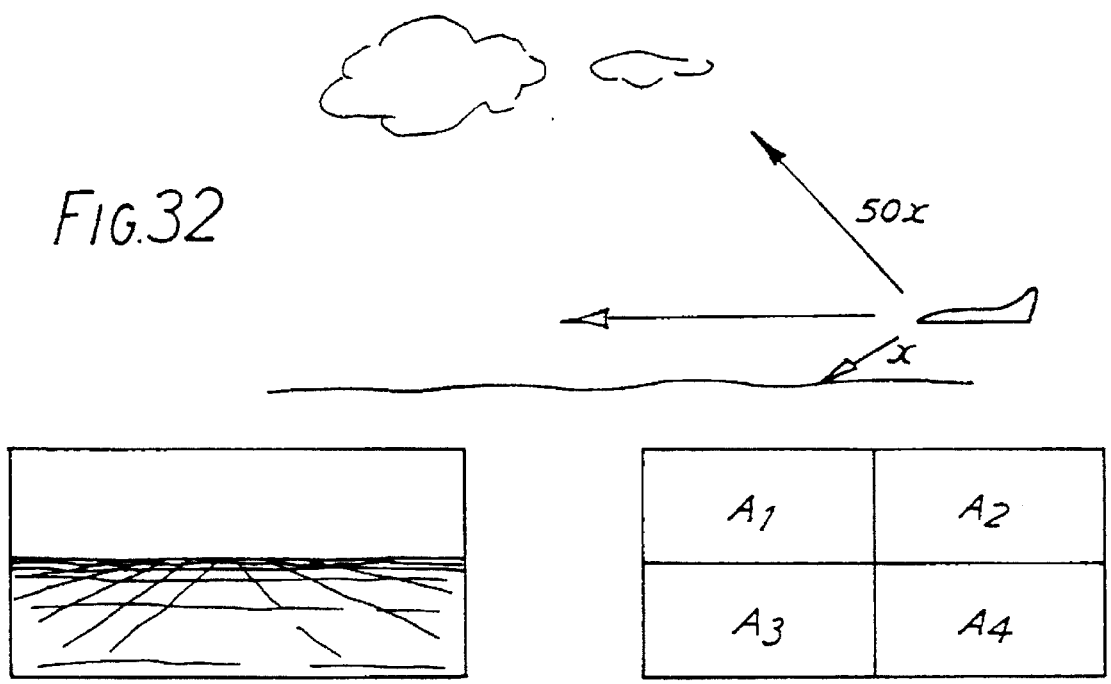
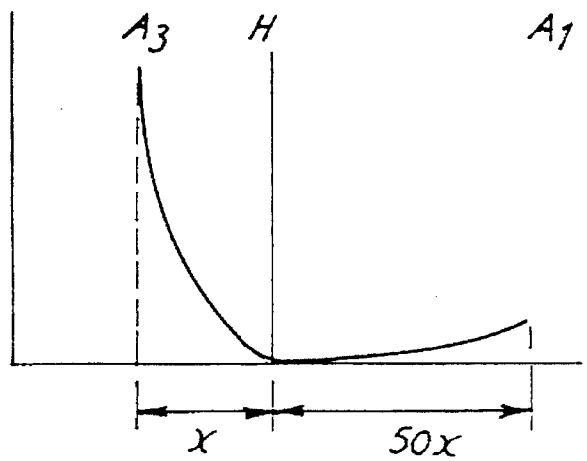
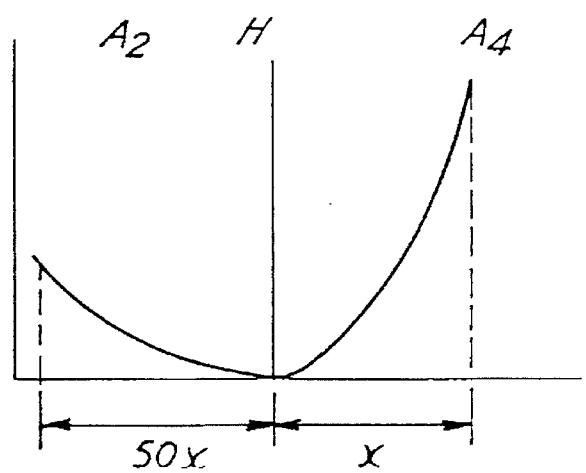

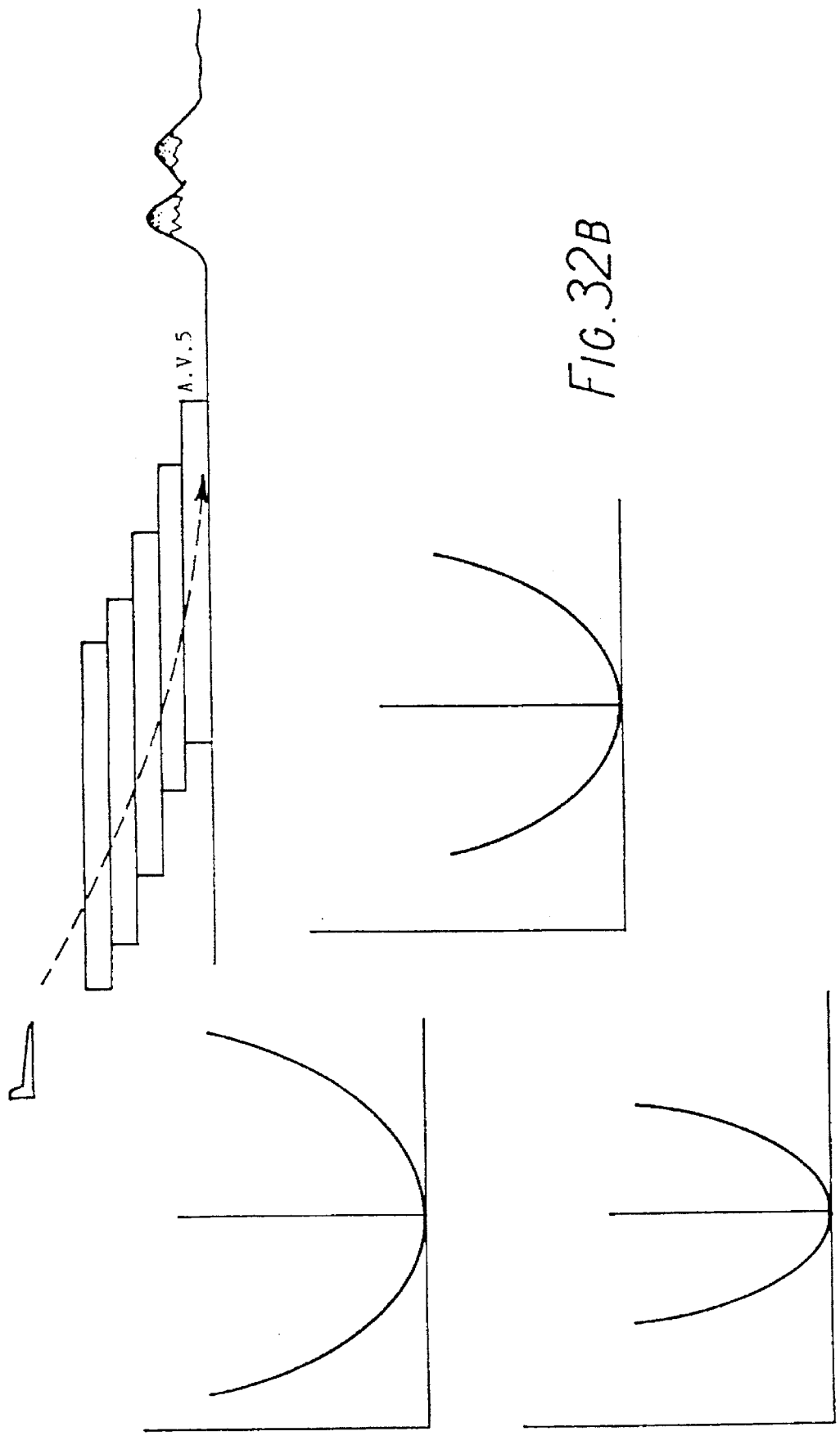

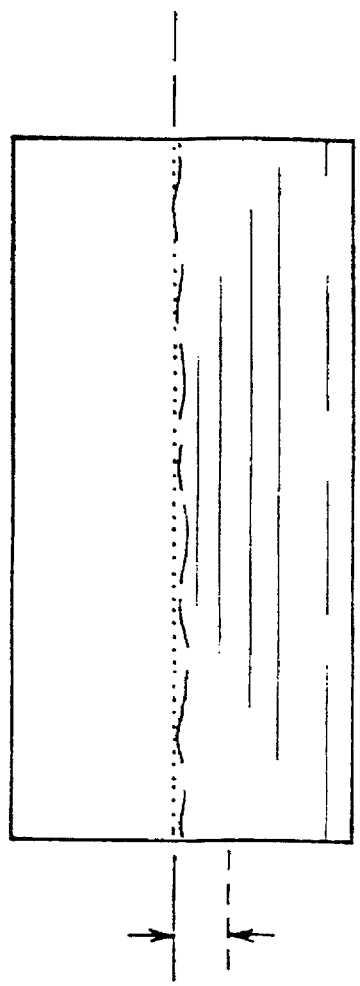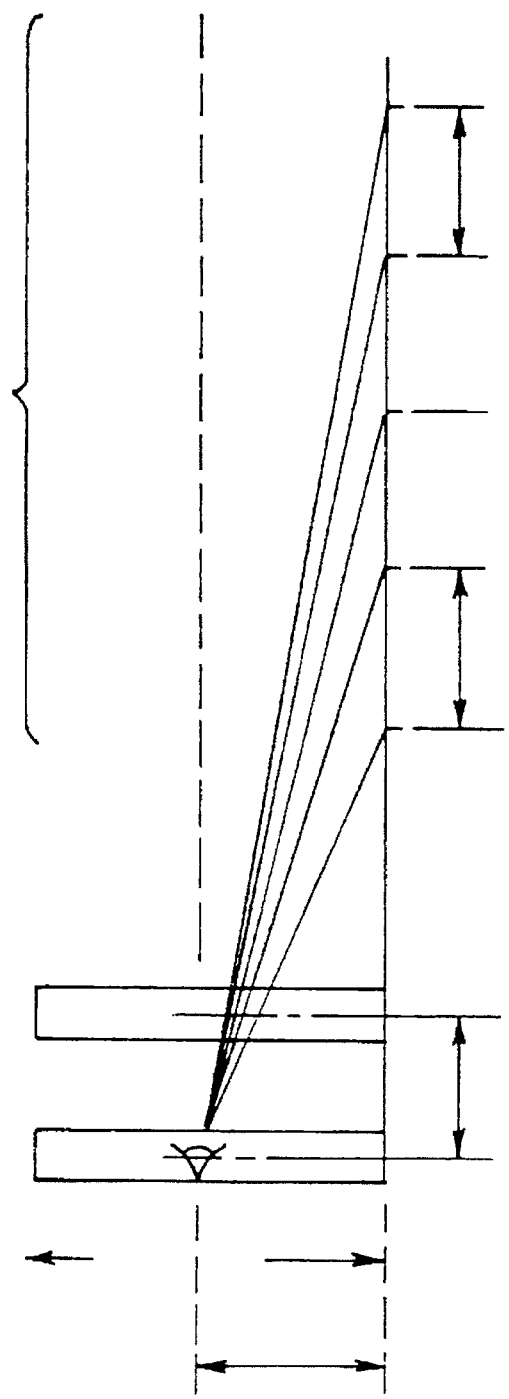
FIG. 33

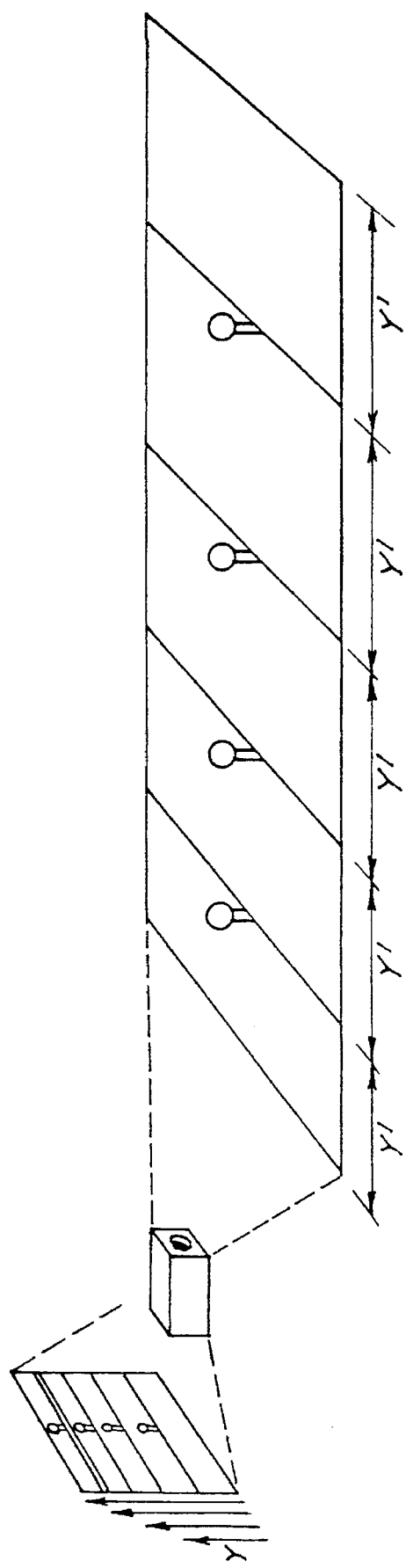

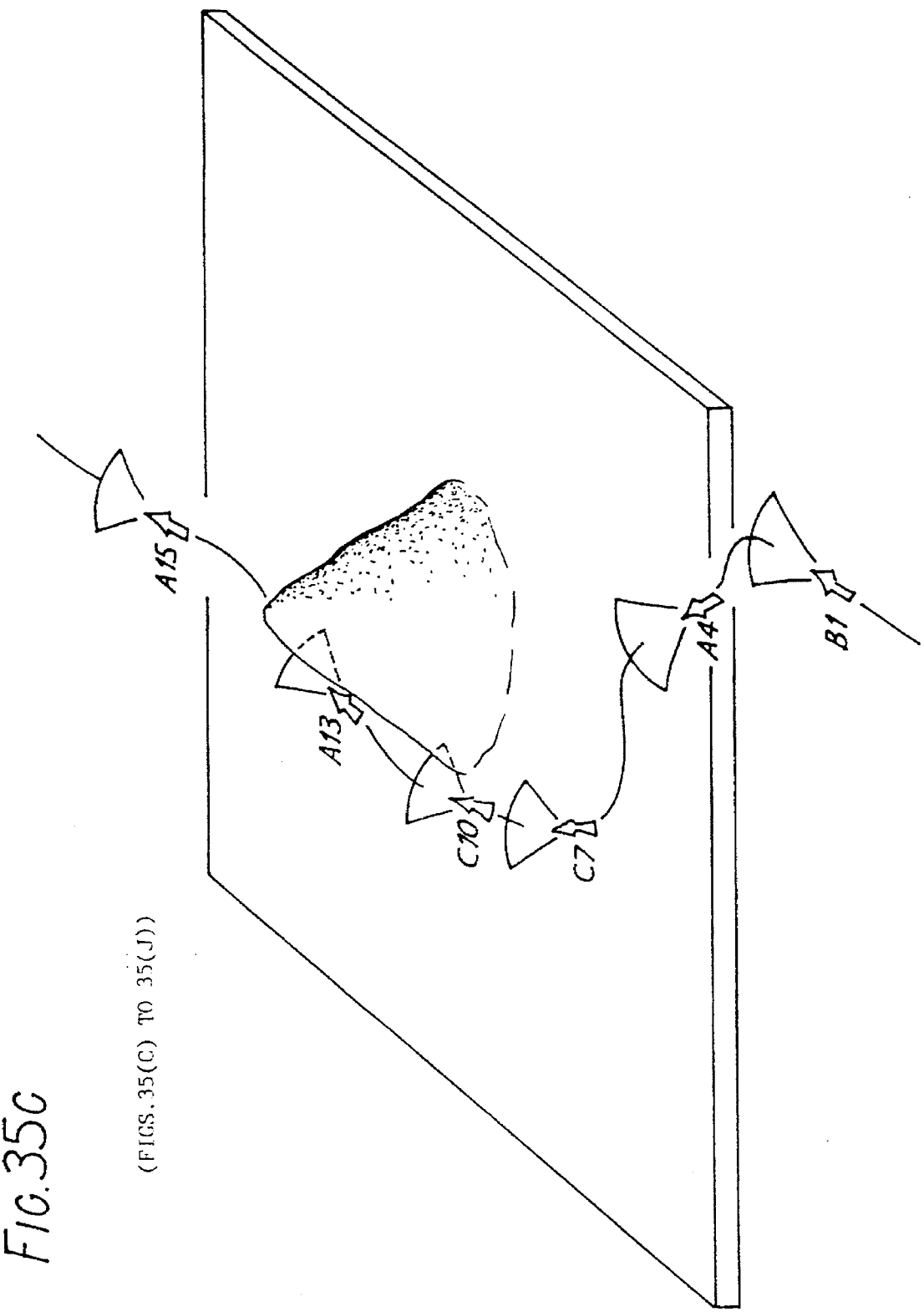
FIG.35c (FIGS.35(C) TO 35(J))

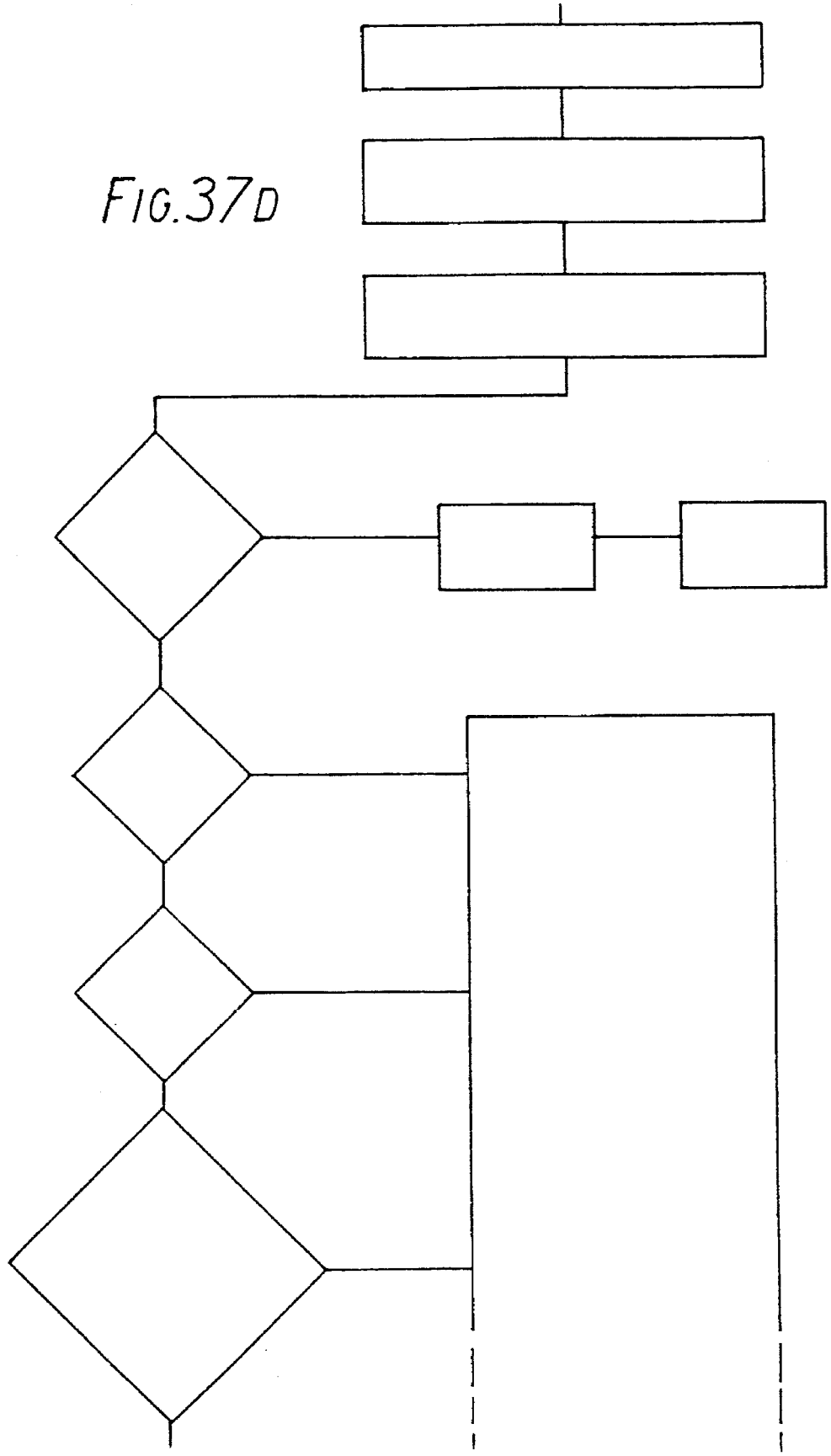

$$^\circ(\underline{A}^1 \downarrow A^3) \quad ^\circ(C^1 \leftarrow \underline{A}^1) \quad ^\circ(C^3 \swarrow \underline{A}^1)$$

$$^+(\underline{A}^1 \downarrow A^3) \quad ^+(C^2 \leftarrow \underline{A}^1) \quad ^+(C^4 \swarrow \underline{A}^1)$$

$$^-(\underline{A}^1 \downarrow A^3) \quad ^-(C^1 \leftarrow \underline{A}^1) \quad ^-(C^3 \swarrow \underline{A}^1)$$

$$^{--}(\underline{A}^1 \uparrow \square) \quad ^{--}(\underline{A}^1 \rightarrow A^2) \quad ^{--}(\underline{A}^1 \nearrow \square)$$

$$^\circ(\underline{A}^2 \downarrow A^4) \quad ^\circ(\underline{A}^2 \rightarrow B^2) \quad ^\circ(\underline{A}^2 \searrow B^4)$$

$$^+(\underline{A}^2 \downarrow A^4) \quad ^+(\underline{A}^2 \rightarrow B^1) \quad ^+(\underline{A}^2 \searrow B^3)$$

$$^-(\underline{A}^2 \downarrow A^4) \quad ^-(\underline{A}^2 \rightarrow B^2) \quad ^-(\underline{A}^2 \searrow B^4)$$

$$^{--}(\underline{A}^2 \uparrow \square) \quad ^{--}(A^1 \leftarrow \underline{A}^2) \quad ^{--}(\underline{A}^2 \nearrow \square)$$

$$^\circ(\underline{A}^3 \downarrow \Delta) \quad ^\circ(C^3 \leftarrow \underline{A}^3) \quad ^\circ(\Delta \swarrow \underline{A}^3)$$

$$^+(\underline{A}^3 \downarrow \Delta) \quad ^+(C^4 \leftarrow \underline{A}^3) \quad ^+(\Delta \swarrow \underline{A}^3)$$

$$^-(\underline{A}^3 \downarrow \Delta) \quad ^-(C^3 \leftarrow \underline{A}^3) \quad ^-(\Delta \swarrow \underline{A}^3)$$

$$^{--}(\underline{A}^3 \uparrow A^1) \quad ^{--}(\underline{A}^3 \rightarrow A^4) \quad ^{--}(\underline{A}^3 \nearrow A^2)$$

$$^\circ(\underline{A}^4 \downarrow \Delta) \quad ^\circ(\underline{A}^4 \rightarrow B^4) \quad ^\circ(\underline{A}^4 \searrow \Delta)$$

$$^+(\underline{A}^4 \downarrow \Delta) \quad ^+(\underline{A}^4 \rightarrow B^3) \quad ^+(\underline{A}^4 \searrow \Delta)$$

$$^-(\underline{A}^4 \downarrow \Delta) \quad ^-(\underline{A}^4 \rightarrow B^4) \quad ^-(\underline{A}^4 \searrow \Delta)$$

$$^{--}(\underline{A}^4 \uparrow A^2) \quad ^{--}(A^3 \leftarrow \underline{A}^4) \quad ^{--}(\underline{A}^4 \nearrow \Delta)$$

FIG.46

INTERACTIVE VIDEO SYSTEM HAVING FRAME RECALL DEPENDENT UPON USER INPUT AND CURRENT DISPLAYED IMAGE

The present invention relates to interactive video systems.

Interactive video systems are becoming increasingly important and relevant in a number of fields. They can be used in a variety of simulated training environments, for example vehicle driver and aircraft pilot training, for more straightforward education purposes, for animation in the production of cartoon films or commercials, or for simple entertainment. In this specification the system will be described as incorporated in a video game as one exemplary illustration of the uses to which the invention can be put but it will be appreciated that it can equally be used in other applications including but not limited to those just enumerated.

Considering video games therefore, these are generally played using a video screen on which images are generated by a computer, usually a microprocessor, in accordance with the game setting and the response of the player or players which is input via a suitable device such as a keyboard or joystick. One typical game-scenario which is currently popular has the player set against a number of alien spacecraft which attack his position and which can be destroyed by aiming and launching missiles and so forth. Although this type of game represents a considerable improvement on the original video ping-pong and tennis games, nevertheless they remain rather limited because the generation of the whole display by the microprocessor places heavy demands on its processing capabilities and requires large amounts of memory. The resolution, complexity and rate of change of the display is limited by processor speed, memory requirements and related constraints and the display tends not to be terribly realistic, even using high resolution graphics.

Work in the field of interactive video has hitherto been directed largely in the following areas:
1) Mainframe Computer, images stored in a large high speed memory.
2) Multiple video disc player systems.
3) Multiple head disc reader.
4) Single disc player, single head, single option.
5) Disc geography.

We shall consider the basic strategies behind each of the five approaches.

1. MAINFRAME COMPUTER

These have been the most expensive, in terms of the cost of the components of the arrived at research prototype, the potentially most versatile and yet, unfortunately, also the most unwieldly and unreliable.

This approach involves a very large (RAM) memory and a powerful central processor unit; the purpose of the memory is to either:
A) store the visual picture information itself, in which case the system dispenses with the need for a video disc or any other visual image reproduction medium, or,
B) to store the 'reference labels' for frames, or sequences of frames stored, in a subordinate multiple disc system.

In the case of (A) the memory needs to be very large and the central processor immensely powerful. However even with a large memory the images are at best (vectorscan) line-drawn, with the coordinates of all the apices and corners along with a 'line generate' program, stored in the memory. When such a system is realtime-interactive the central processor has to handle all of the perspective transformations within realtime parameters, the visual image database in this case (the memory), contains no perspectives at all (coordinate and line generate), and all such are generated by the central processor. Work has been done by architects and computer programmers working together to consign the entire city of San Francisco to coordinates in a mainframe computer memory. Although outline imagery is the result, see FIG. 42, when the central processor unit generating the images is powerful enough to achieve 'smooth' perspective transformations, then a flight sequence over the city is possible, with universal degrees of freedom in terms of movement. In this system the perspectives are handled totally by the (hardware) central processor unit, and the generated images are aesthetically unsatisfying line outlines.

In the case of (B) the memory acts in conjunction with a multiple video disc system as the visual image database. The memory proper (RAM) does not store any images, but instead stores 'reference labels' which on being addressed by the central processor instructs the multiple disc system to bring 'on line' the relevant video disc player. When the relevant frame or sequence of frames, has been located by the read head, when the head is in a position, a two-way protocol then informs the memory which then at that point has been addressed, and the relevant images are sent to the display system.

Although this system is a little unwieldly, both the memory and in particular the central processor unit, need be far less powerful than in (A). The central processor has the task of determining (through its programming) which reference labels to address, according to the instructions at the user interface, it has no perspective transformations to perform. Also because the visual image database involves video disc players, the images are capable of being full colour, high resolution pictures. However all the perspectives and the options are already filmed and contained (in software) on the video disc, and although the central processor may be able to assemble in realtime a unique sequence of frames to match the instructions at the interface, there are clear restrictions. One being the original filmed material stored on however many video discs (up to four), the images cannot deviate from this, the other is that the sequence of images must (if reality is being simulated) be consecutively plausible.

This system enables the user to trace a unique pathway along a map and then have the computer show the images that would correspond to such a journey.

The memory in such a system is 'heuristically' arranged such that the reference labels of contiguous image sequences, such as turning left, right or heading straight on at a road junction, are stored in close batches. The use of the central processor unit is to locate the correct reference labels in sufficient time to enable the relevant frames and sequences to be located and displayed in realtime or as fast as possible.

With the mainframe computer video systems that we have discussed, we can already see two divergent strategies. In (1A) the final dynamic perspective transformations are handled entirely by the hardware, which is why the degrees of freedom are universal (or very nearly so), but for this to occur in realtime requires both a powerful central processor and (/or) low information images (line outlines).

In (1B) the final dynamic perspectives are contained entirely within the software, in this our first example—the video discs. The degrees of freedom occur at specific decision points when referencing alternative relevant (realistically consecutive) sequences of images is possible, with a single frame or within a particular sequence once a choice has been made, there is no further degrees of freedom or further perspective transformations. In short, the user chooses from an already pre-chosen selection.

2. MULTIPLE VIDEO DISC PLAYER SYSTEMS

The main purpose behind multiple disc systems, and this also applies to (1B), is to enable the head on one disc player to search and locate (cue) the relevant next sequence whilst another player is generating an image, so that as one sequence comes to an end the two possible following alternatives (could be three) are already cued-in and waiting on the accompanying two machines. The purpose of this is to remove 'dead time'.

There is little or no processing of the image generated by the discs, by the controlling micro-computer, or microprocessor (replacing the mainframe), with the exception of an overlay text or graphics, which may be stored in the teletext lines of the visual image or in the RAM of the micro computer respectively. However once again the same restrictions apply, with the degrees of freedom (and to a lesser degree, user interaction) being counted in terms of the number of options at each (node) decision point achieved through the number of disc players in the system and the number of decision points themselves.

The question of universal degrees of freedom or total user interaction does not arise. The system is rated to (1B), see FIG. 43.

Of course the other purpose behind using multiple disc players, is that you have enlarged the visual database which is an asset for data filing applications.

3. MULTIPLE HEAD DISC READERS

The principle is exactly the same as in (2) only less expensive. With the purpose of eliminating dead time, each of the read heads is independently controlled, so that whilst one head is reading and consequently generating an image, the other read head or heads can be cueing-in the alternative relevant sequences (chapters) for the next decision point. The same restriction from (2) apply with the further consideration that you have only one disc player, and a need for further greater robustness and coordination within the single player.

4. SINGLE DISC PLAYER, SINGLE HEAD, SINGLE OPTION

The most advanced of this type of system is called a 'level three' system: an industrial level disc player (fast scan times) an interface and an external micro computer IBM, Sony and Phillips have marketed such systems, and they have some value in training applications. However realtime simulations with multiple degrees of freedom are beyond such systems.

However this does not mean that such systems cannot be harnessed imaginatively, one such application involved the tracking shots from the Voyager space probes. Using a disc in this system the user was able to see what the probes saw as they crashed into Mars, swooped past Venus and Mercury and plunged past Jupiter and its' moons. The realtime user interaction took the form of a 'throttle' effectively speeding up or slowing down the display of images.

5. DISC GEOGRAPHY

The dividing up of the video into a series of sequences of frames, referred to as chapters, has been greatly explored in the field of video system applications. The principle being that if frames 1 to 100 are chapter A: walking down the road to a junction, frames 200 to 300—chapter B: could be walking straight on, with frames 300 to 350—chapter C: turning left and frames 350 to 400—chapter D: turning right. The drawback for such systems, using single disc players and single read heads, is that if the user wishes to walk down the road and turn right, the read head has to jump from the end of chapter A to the beginning of chapter D, from frame 100 to frame 350, and while the intervening 250 frames are being 'skipped' by the read head the screen is blank: dead time.

We have appreciated that in all these approaches the realtime user interaction and any possibility of universal degrees of freedom, not merely at decision nodes but constantly throughout the image display, is dependent upon hardware processing. Also, full colour resolution images are impossible without the use of an extremely large memory, which is software: the video disc player has often been referred to as large optical memory.

The difficulty is how to enable a central processor unit (or microprocessor) to be able to 'number crunch' the enormous databits of information ($10^7$) which constitute high resolution colour pictures, in realtime; without that central processor being impossibly large.

As will become apparent from the following description, the invention can provide an interactive video system which, in a game context, can provide far more realistic displays, in real time, than present games which interact in real time with the user which are based on graphics generated entirely by the microprocessor. The processing capacity thus saved can be given over to more complex system functions and/or to providing high resolution in-fill graphics to enhance the on-screen game environment.

The invention is concerned with a video system of the type comprising a system controller, a video playback device for reproducing moving picture sequences stored on a record medium, a display device for reproducing a video picture from the video playback device, a user input device for enabling the user to interact with the controller, the controller being programmed to control the operation of the video playback device in accordance with predetermined rules and the user's response to the display as input via the input device. The controller may provide graphics information which may be mixed with the video signal from the playback device or interposed between the reproduced moving picture sequences, this graphics information again being determined in accordance with the predetermined rules and, optionally, the user's response, e.g. to display scores, status reports, prompts or instructions. The moving picture sequences may be filmed real life action sequences, films or models, or animations.

The predetermined rules may comprise the control scheme required to co-ordinate the operation of the hardware of the system to implement the functioning required to provide a particular video game. The video playback device may be controlled by the system controller in accordance with the game rules to reproduce a moving picture sequence, optionally with the controller adding graphics information to the display in accordance with the user's response and the state of the game. The controller may be programmed so that the moving picture sequence next to be reproduced is determined, at a particular stage in the game, by the user's response or by the game rules. There may be branch points in the general flow of the game where what happens next is determined by the user's response or score.

A first aspect of the present invention derives from an appreciation of the fact that a real time interactive video system has considerably more flexibility and potential than existing graphics-only ones if it comprises a video playback device, by means of which video programme material is reproduced, a display device for displaying reproduced video information from the playback device, a system controller operative to control the delivery of reproduced video signals to the display so that where the record medium has recorded on it a number of alternative moving picture sequences, with the new-picture rate in each sequence being lower than the frame rate of the video programme material, the frames of a particular sequence can be extracted from the programme material and then processed by processing circuitry for producing a succession of duplicate frames from each original one so that the frame rate of the reproduced selected alternative equals that of the video programme materials.

There may be branched points in the video programme material. The term branch point is used to cover the situation where there are two or more possible sequences of frames and one of these sequences only is desired, the user's response determining which sequence of frames is reproduced next. This is so at a branch point as it is conveniently thought of, but also it applies where, for example, there are frame sequences covering side-by-side strips of terrain and movement is required with a sideways component from one strip into an adjacent strip. Thus, in operation of the system, the sequences of moving picture may be available to be accessed in a linked manner in accordance with an overall scheme determined by the rules programmed into the controller with the particular order of moving picture sequences reproduced being determined, in accordance with the rules, by the user's response.

Traversing one of the branch points in the programme material with a reasonable degree of continuity poses a problem with current video playback hardware because of the time taken to access a particular part of the stored video information, whether this be stored on a video disc or tape. One solution is to provide a graphics "interlude" in which only processor-generated graphics are displayed. However, this may not be particularly pleasing from the aesthetic point of view because of the transition back and forth between pure graphics and what may be real moving picture images.

The first aspect of the invention provides an alternative to this whereby traversal of one of the programme branch points can take place in real time without having to shift back and forth between graphics and moving picture images. Thus this aspect of the invention proposes that the video information from the various alternative sequences from a branch point be recorded in an interlaced fashion on the record medium so that during serial reading of the information from the record medium information from each of the alternative sequences is read in a repeating sequence.

Also this aspect of the present invention provides a record medium having recorded thereon video programme material comprising a number of alternative moving picture sequences frames of the alternatives being disposed in interleaved fashion serially on the record medium. The alternative sequences may start at a branch point in the video programme material with each alternative sequence constituting an alternative continuation of the preceding programme material.

Preferably, the alternative sequences are interlaced by frame so that if, for example, there are three alternatives, the frames are recorded with the first frames of the three alternatives in succession, followed by the second frames of the three alternatives and so forth. Assuming these are read serially from the record medium, a time division demultiplexer may be used to retrieve the frames of the desired sequence. It will be apparent that where there are "n" alternatives, the frame rate of new frame rate of new frames for any one alternative is one nth of the overall frame rate of the reproduced information. Thus, the time division demultiplexing should be followed by processing which fills out the time between successive frames of the desired sequence. This may be achieved by repeating the most recently read frame in that sequence a further n-1 times so that the original frame rate is restored. However, this will still mean that the reproduced image will only be updated at one nth of the frame rate. In order to compensate for this, measures may be adopted to increase the information processing demand on the eye/brain of the viewer/user; one proposal for doing this involves modulating the luminance and/or chrominance information in the repetitions of the frame.

For example, in accordance with a second aspect of the invention where there are three alternative sequences interleaved so that the frame rate for each alternative is one third of normal, the colour balance may be shifted during the first repetition of the frame and the luminance level may be shifted in the second repetition of the frame, both as compared with the original frame.

This feature is applicable more generally to video displays where the same input frame is displayed more than once and is not limited to the use with interleaved frames emanating from a branch point as described above.

A third aspect of the invention is concerned to provide more realistic displays than have been available hitherto particularly to concerned the possibility of the user appearing to move realistically across the terrain recorded on the record medium. It is desirable to allow the user to move on a path which does not necessarily correspond to the path followed by the camera which took the original frames, and indeed the user may wish to pass some objects in the landscape on the other side than the camera passed them. That is if the camera passed the object on the right, the user may wish to pass it on the left. Such variety of portrayal is difficult to produce in the known systems with any detail in the display because of the large amount of computer processing required to recalculate the viewing point for each frame and adjust the frame accordingly.

In accordance with a third aspect of the invention we provide an interactive video system in which each frame recorded on the record medium contains substantially more information than can be displayed at one time. The whole frame is loaded from the record medium into a semiconductor memory (RAM store). However, only a desired portion of the stored frame is selected for display.

Furthermore, the portion selected changes from frame to frame in response to two factors (i) user input such as from a joystick, which provides an indication of desired movement and (ii) a function of the existing location of the displayed portion which is so calculated as to make the correct allowance for the perspective change between the frames stored on the record medium.

Examples embodying the invention in its various aspects will now be described with reference to the drawings.

One of many applications of the systems illustrated is to create a controlled interaction with a computer and an optically generated image which can be programmed to simulate for instance low level flight through the Welsh valleys or over a Saturnian landscape, or a drive through the streets of New York. As well as an interactive lecture from a nuclear physicist, with permitted discussion within a controlled topic range.

A major difference with other systems is that the exemplary system illustrated is capable of handling over 25 megabytes of picture data every second and manipulates the resultant high resolution picture, smoothly in accordance with the user performance at whatever interface designated.

The manipulations themselves are not only smooth but conform to the reality of the simulation using techniques which we term AVC (array vector co-ordination) and PPT (pseudo perspective transformations). The result on screen is a sensibly universal degree of freedom for the user exploration of a stored world, that may be composed of up to 40 gigabytes of data. In this way the system can "put you in the cockpit" with few apparent restrictions.

The system can be used with a wide range of applications in mind. Though it is only in certain applications such as 'crisis potential' simulations, that the "real time criteria" is involved.

The hardware may comprise a memory device, and an intelligent soft address framestore allowing variable location, together with pixel interpolation circuitry. The software comprises an encoded video disc, compact disc or video tape medium (plus synch track): VHS or Betamax interactive through the framestore 'clocking' a count microprocessor which registers the exact frame number.

A window location is created within the framestore and its location addresses are massively incremented. Natural perspectives are not created by employing geometric functions or distortion. As a result the integrity of the image and attendant optical perspectives is sustained, without recourse to massive geo-mathematical transformation (number crunching).

The rules of the location addressing and the special encoding of the video disc are important for generating the realtime interactive effects, including natural perspective transformations.

When a compact disc is used as the data storage medium, the reduced band width and data transfer rates will result in less well detailed images. Once again, however, the interactions can be made to occur in real time.

As each stored 'gameworld' may have many optional player scenarious, it may be possible to store five stereo sound-tracks along with the images on the disc (the multivisual concept). Depending upon the availability of any detailed specifications concerning the disc player (intended to be the 'video supply' within the system), the principle will involve 100 KHz data packing within a 40 KHz (PCM) bandwidth on an omission ratio-and possible frequency modulation within 8 KHz channels. In this way both the images and the accompanying soundtrack may be explored uniquely on each performance.

Specific rules govern the film-making and post-production. Certain encoded parameters may be stored on the disc, and be down-loaded at the beginning of every program-run.

The system is suitable for both domestic and professional use with leisure, educational, training and business applications.

The preferred system illustrated, using a single read head single disc player, is able to create realistic simulations: such as a low level flight through the Welsh valleys and a drive through New York City. The system is able to generate near universal degrees of freedom, through the final image and the attendant dynamic perspective changes being the result of both the hardware and the software combining to generate the displaced image.

The system displayed image can be a full-colour high resolution picture, but the displayed dynamic perspectives are not prechosen, but can be continually changed to suit the 'flight path' of the users choice.

To achieve realtime near universal degrees of freedon, the system preferably employs three techniques, all within the one system. We shall term our preferred system the RIV system. The techniques are:
1) RIV: encoding and decoding
2) RIV: Chromatron
3) RIV: perspectives A.V.C. (array vector coordination)

N.P.A. (natural perspective algorithm) which combine to provide

P.P.T. (pseudo perspective transformations)

1. RIV: ENCODING AND DECODING

The RIV video discs have a special disc geography, the first aspect is that five chapters of time are serially interleaved, so that if chapters A, B, C, D and E contained filmed images showing five different sequences, they are stored on this in the serially interleaved manner: (frames) $A_1B_1C_1D_1E_1A_2B_2C_2D_2E_2A_3B_3C_3D_3E_3 \ldots \ldots A_{100}B_{100}C_{100}D_{100}E_{100}$, if each chapter is 100 frames long, then the five chapters occupy 500 frames.

The signal coming from the video disc is a nonsense of jumbled imagery. This jumbled image showing five different views every $5/60$ or $5/50$ of a second is referred to as the RIV code.

RIV: encoding refers to the mastering of the video disc in this serially interleaved manner.

The relationship between each frame in each chapter and related frames in accompanying chapters in the groups comes under array vector coordination (A.V.C.) see RIV: perspectives.

RIV: encoding refers to the software components of the system. RIV; DECODING refers to all of the hardware components, in particular those that are responsible for decoding the RIV code signal.

The RIV video disc player, revolves at the standard (30/25 r.p.s.-, we shall refer to 30), however the head travels over the disc at twice the normal rate, reading 60 grooves per second. As a result the head is one each groove for only one half of a revolution before moving, so it only reads one of the two fields on each groove, its movement is synchronized by the (VBI) vertical blanked interval lines in each field, so it moves from each groove after the complete reading of each field (from two). So the signal leaving the disc-player contains 60 complete fields per second.

The sixty fields per second can be represented thus:

$$A_1B_1C_1D_1E_1A_2B_2C_2D_2E_2 \ldots A_{60}B_{60}C_{60}D_{60}E_{60}$$

A frame grabber has the task of grabbing every fifth field from the input stream on a phase cycle, the signal leaving the frame grabber can be represented thus:

$$A_1 \underline{\qquad} A_2 \underline{\qquad} A_3 \underline{\qquad} A_4 \underline{\qquad} A_5 \ldots \ldots$$

A frame store component generates from its stored field a full frame repeat field interlaced-scan picture. It also adds colour information to the second and third repeated full frame pictures, this is the Chromatron system, see below, $$(A_1^0 A_1^1 A_1^2 A_1^3 A_1^4 A_2^0 A_2^1 A_2^2 \ldots).$$

The frame store microprocessor also creates a window buffer within the frame store which alone reads to the monitor. This window is called the 'Refresh Array', see RIV: perspective and its movement via microprocessor control generates the pseudo perspective transformations (P.P.T.) see RIV: perspectives.

2. RIV: CHROMATRON

Through principles based on a phsychological model of intelligence, colour interpolation of the video signal with alternative shifts towards the red and blue spectrum is achieved through microprocessor control of the frame store (C.L.T.) colour look-up table. This increases the human processing requirements which assists the overall RIV strategy.

3. RIV: PERSPECTIVES

A.V.C. coordination refers both to the axes of camera movement of the filming techniques and then to the hardware processing. Within the filming techniques each chapter is referred to as an array vector, and is treated as a three-dimensional entity: two dimensions plus movement (time).

RIV perspectives techniques are largely responsible for the RIV system being able to generate near universal degree of freedom.

The basis principle is that the final dynamic perspective changes are the sum of the perspective stored on the video disc which are the result of the camera movement over the observed environment and the perspectives generated by the microprocessor controlled movement of the refresh array in the frame store, the final on user screen dynamic perspective changes, are what we refer to as pseudo-perspective-transformations (P.P.T.) and they are convincing because they conform to essentially the same rules as do normal 'real' perspective changes.

There are certain rules which govern the refresh array movement (RAMo) in the frame store, which are described more fully in the detailed description given below.

The invention will be further described by way of example with reference to the accompanying drawings, in which:

FIG. 3 illustrates the processing of video signals during operation of the system of FIG. 1;

Figure 1:
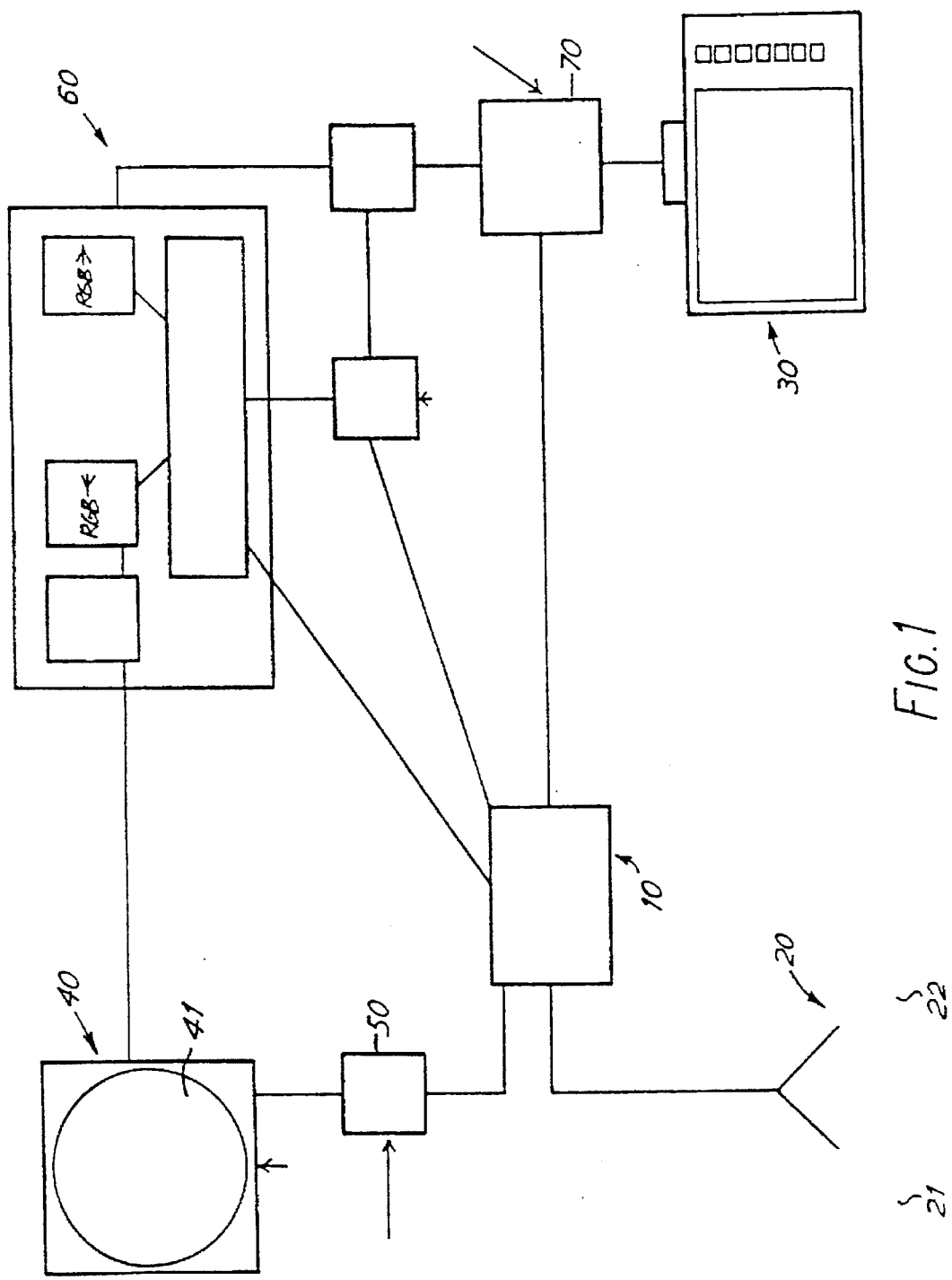
FIG. 1 is a functional block diagram of one embodiment of the present invention.
Figure 5:
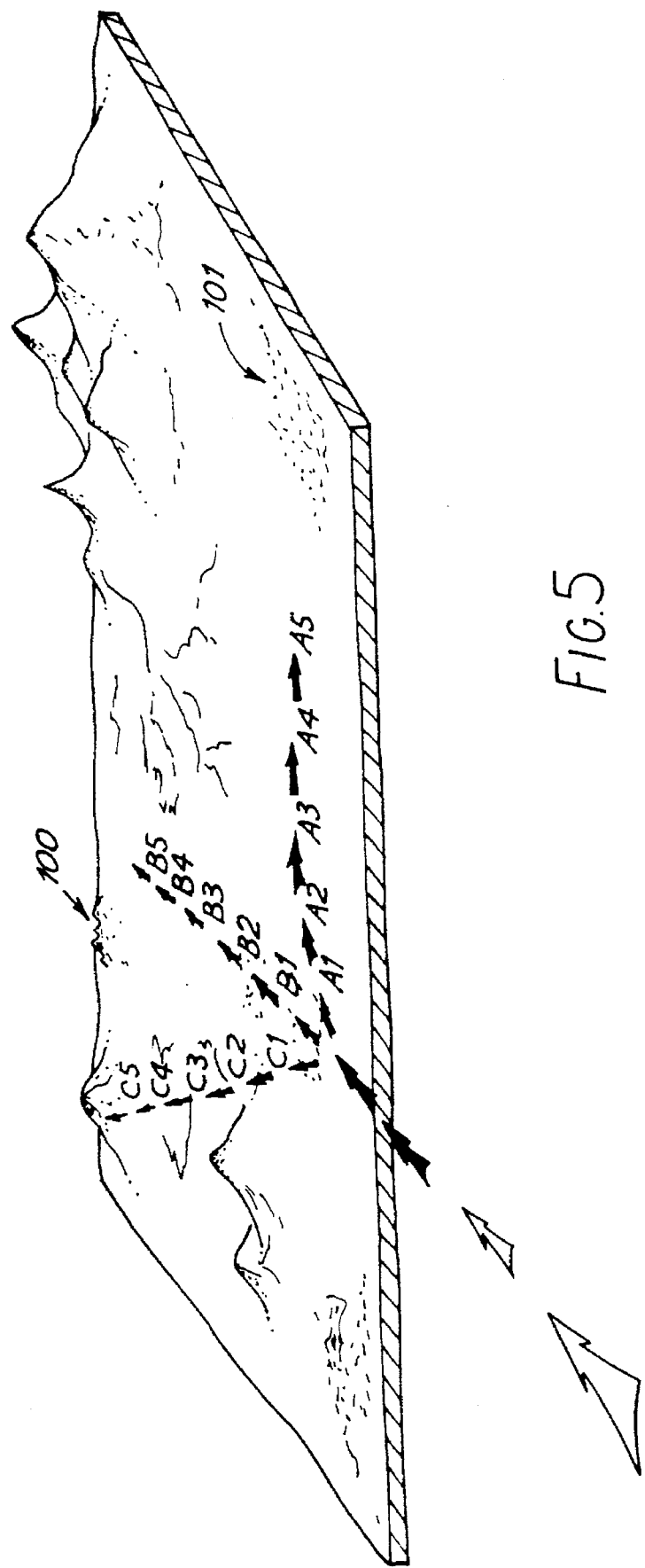
FIG. 5 shows somewhat schematically how recorded frames may relate to a flight over a landscape as displayed by the system of FIG. 1.
Figure 7:
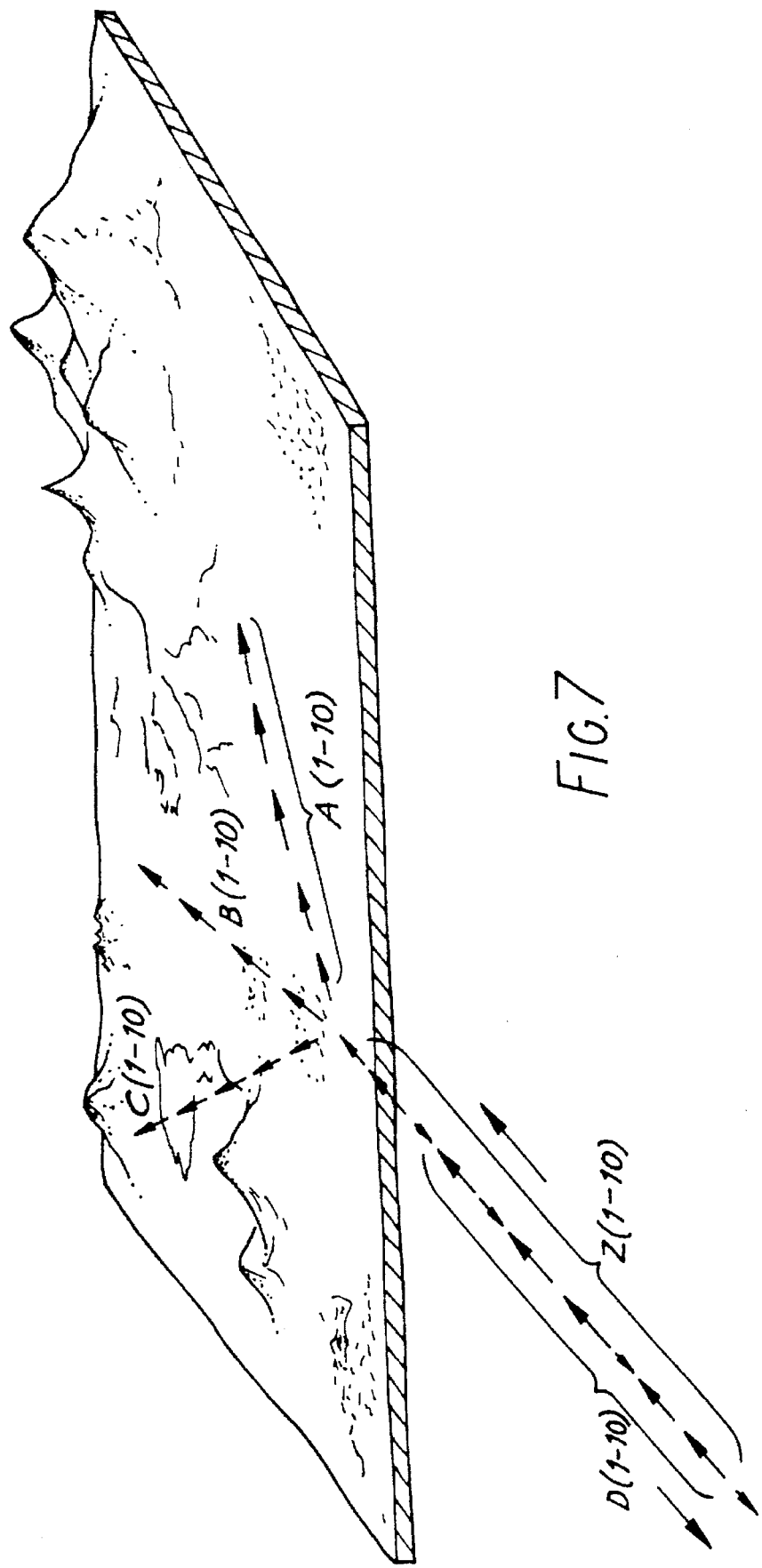
Figure 8:
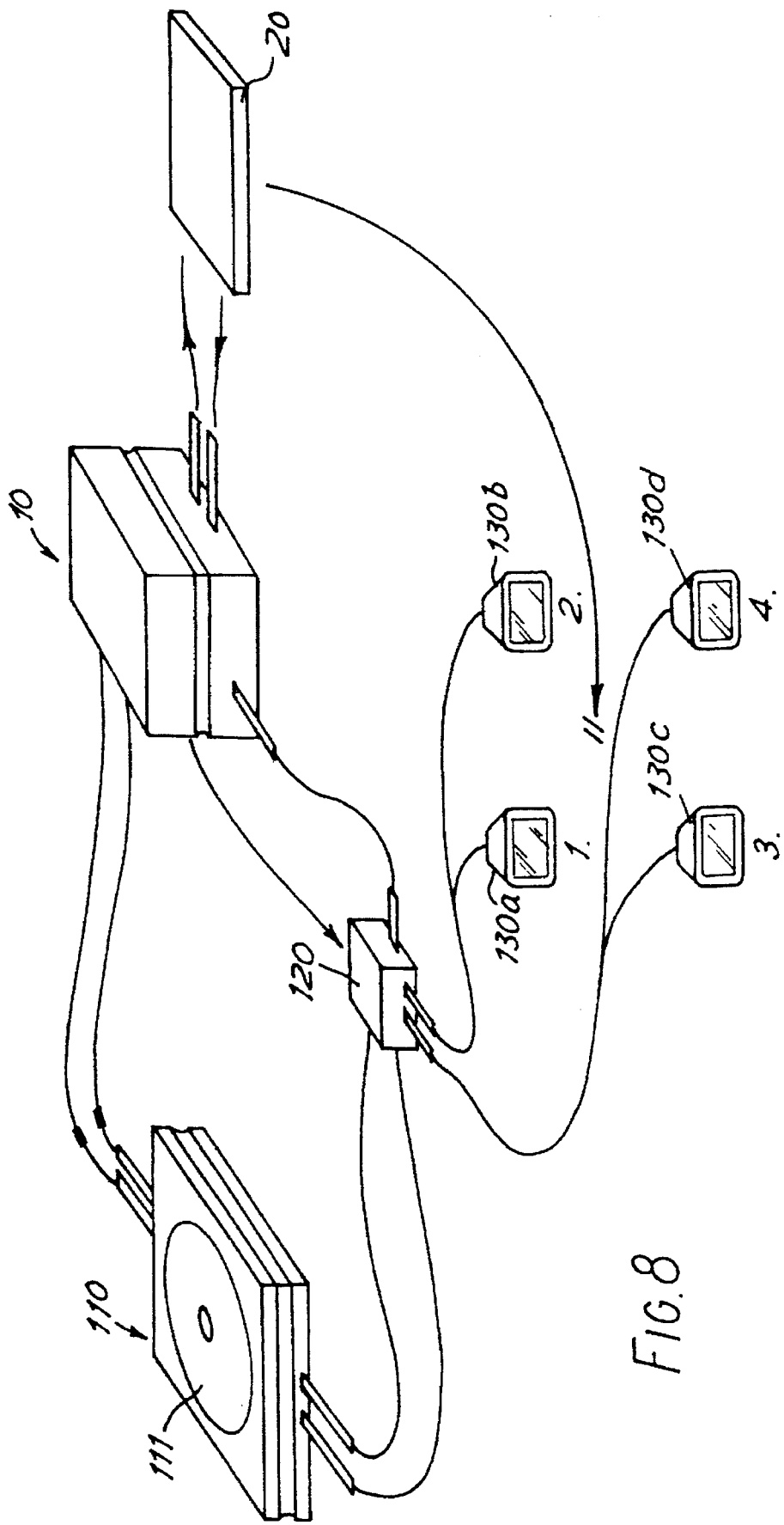
Figure 9:
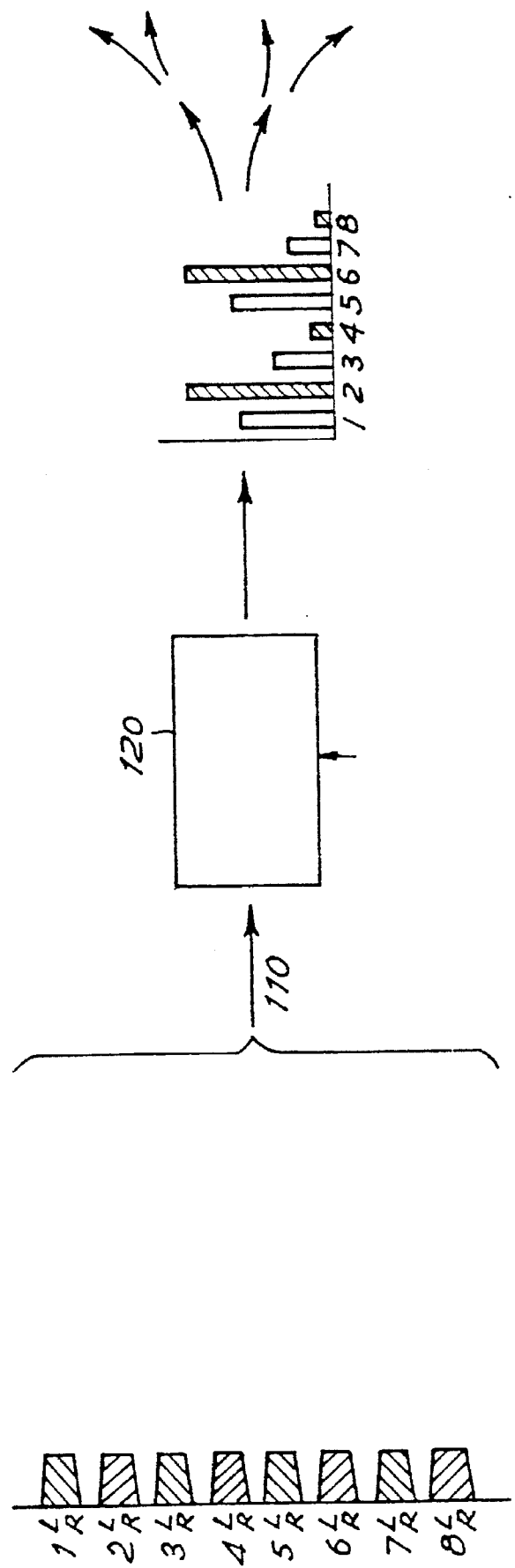
Figure 10:
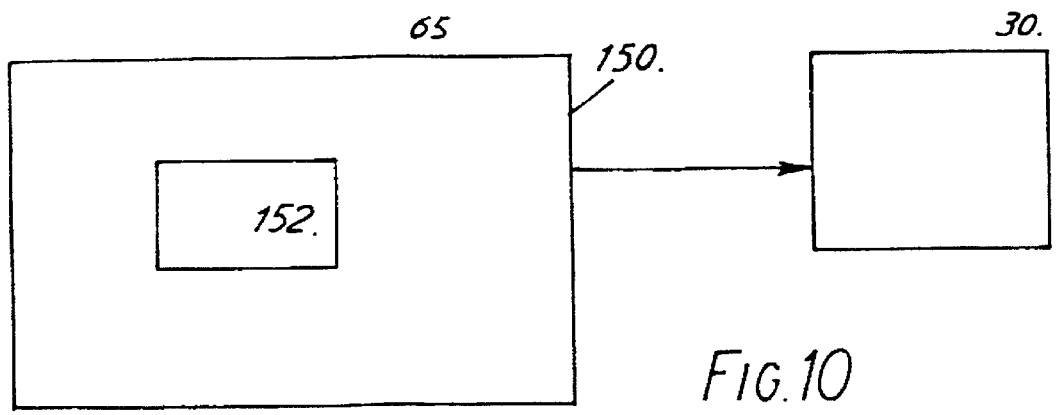
Figure 11:
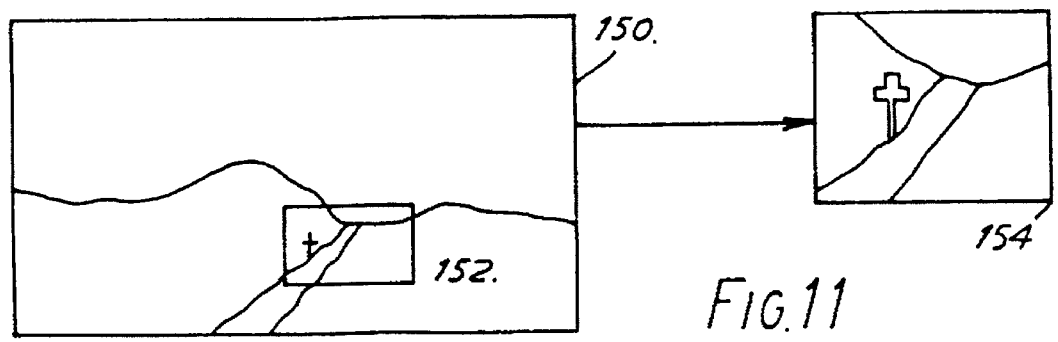
Figure 12:
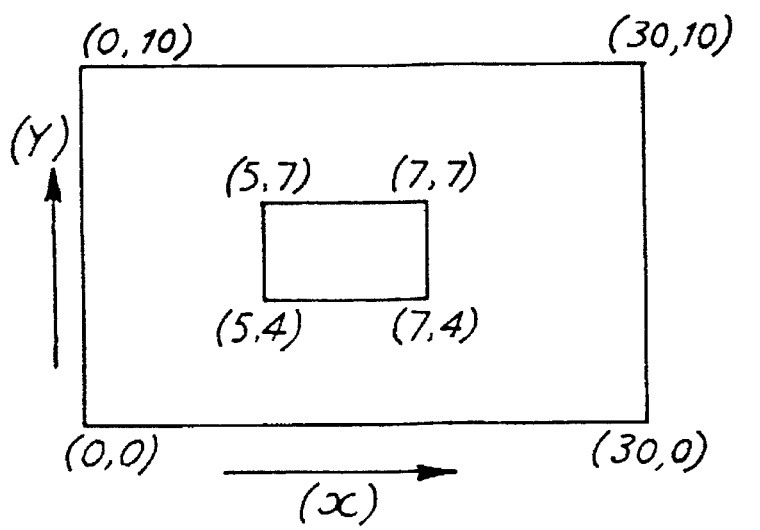
Figure 13:
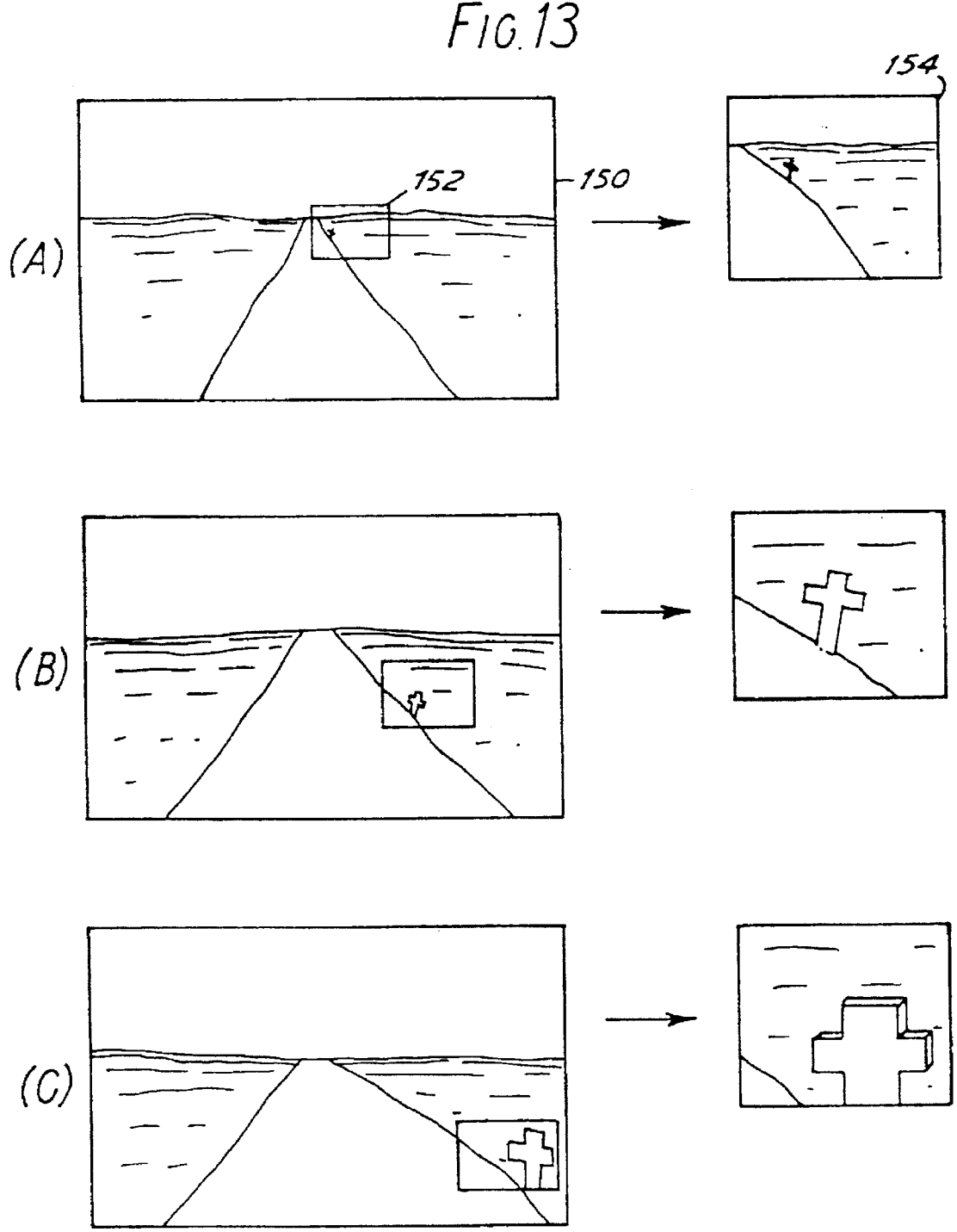
Figure 15:
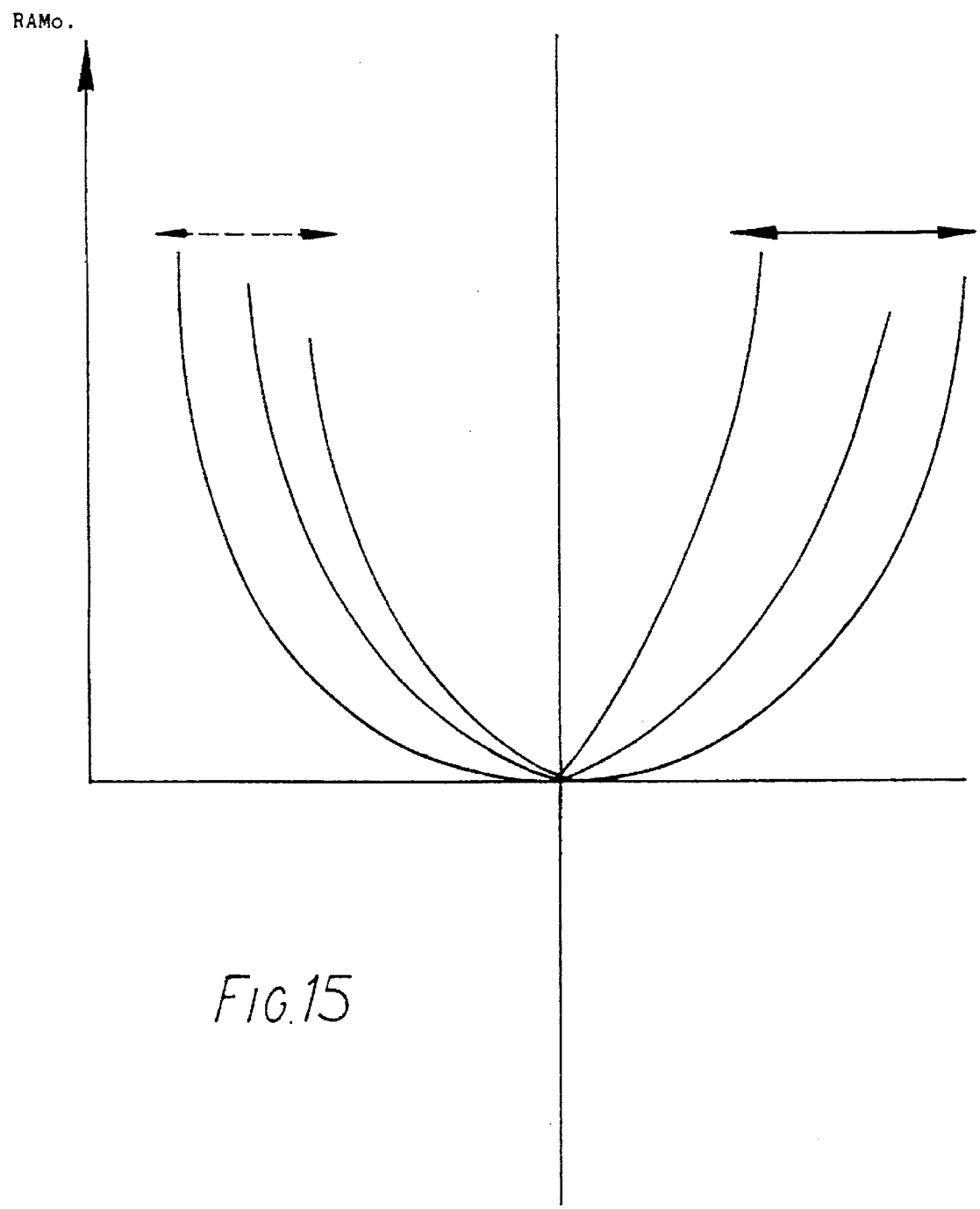
Figure 16:
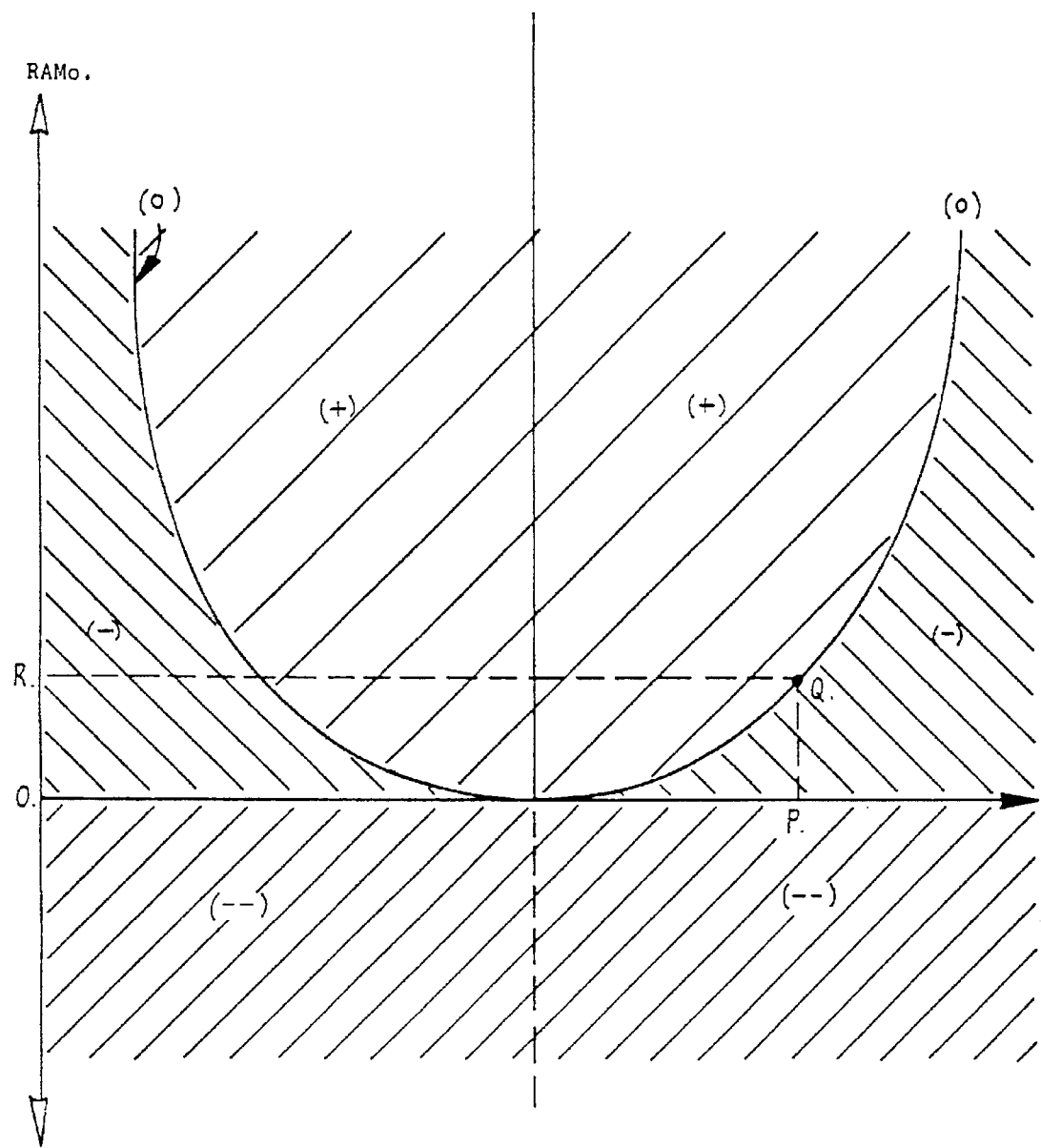
Figure 17:
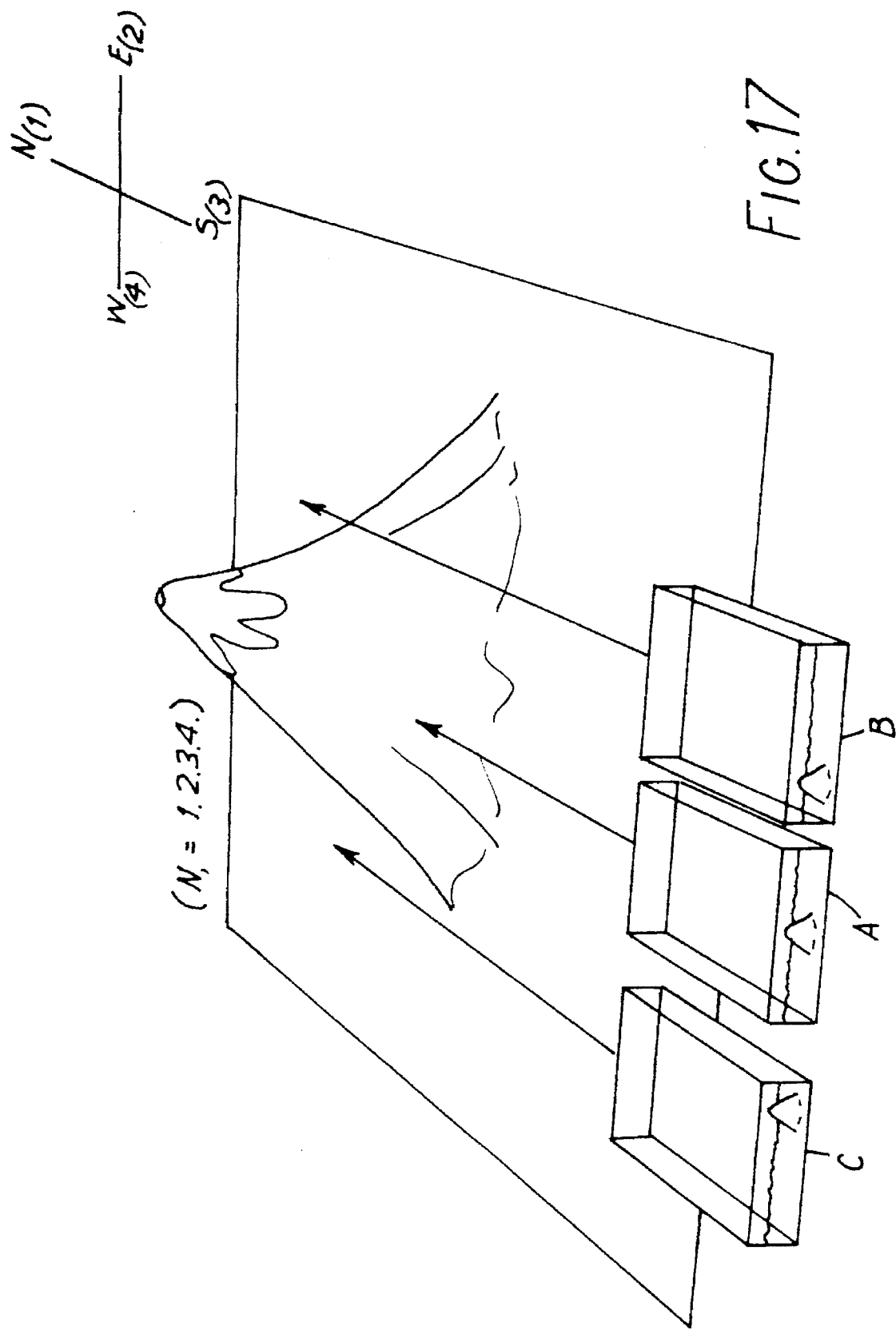
Figure 18:
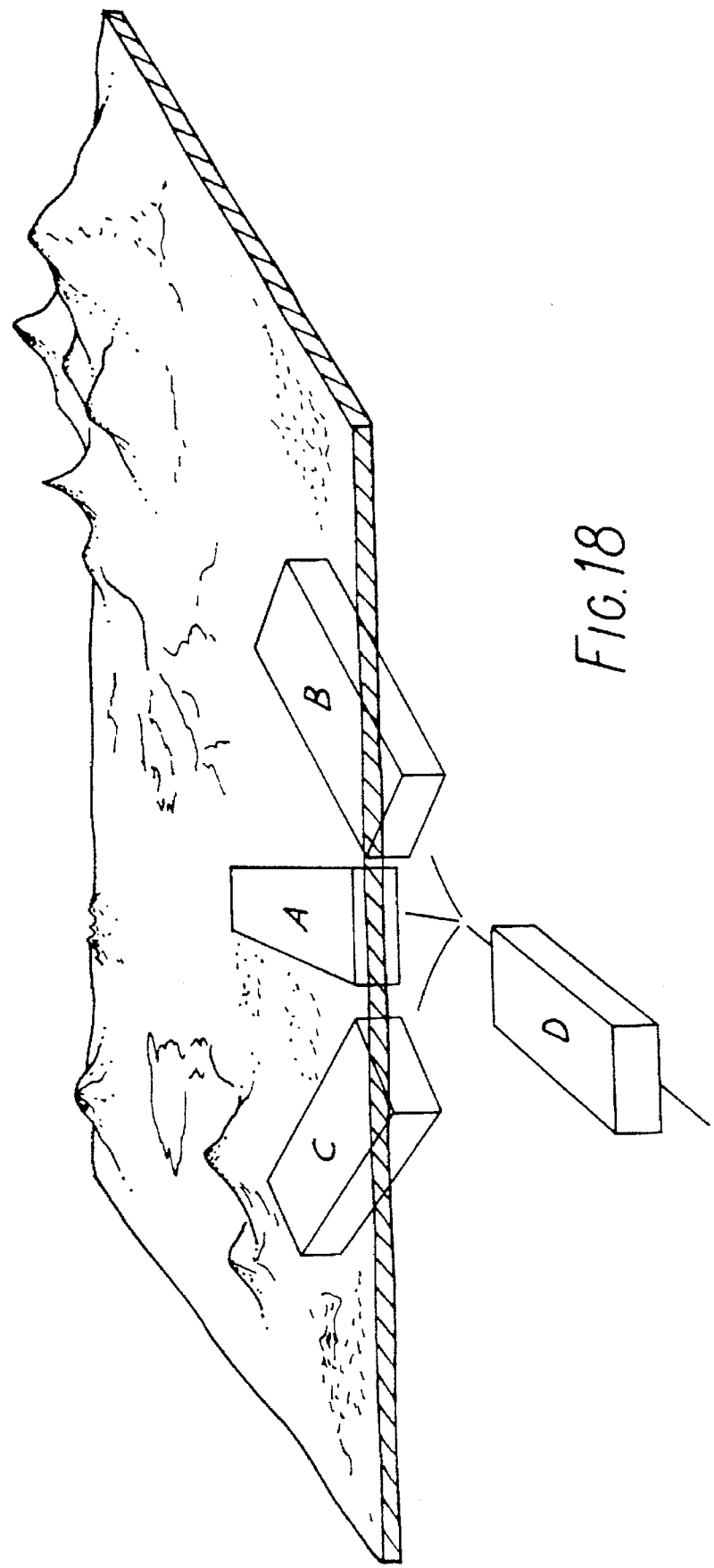
Figure 19:
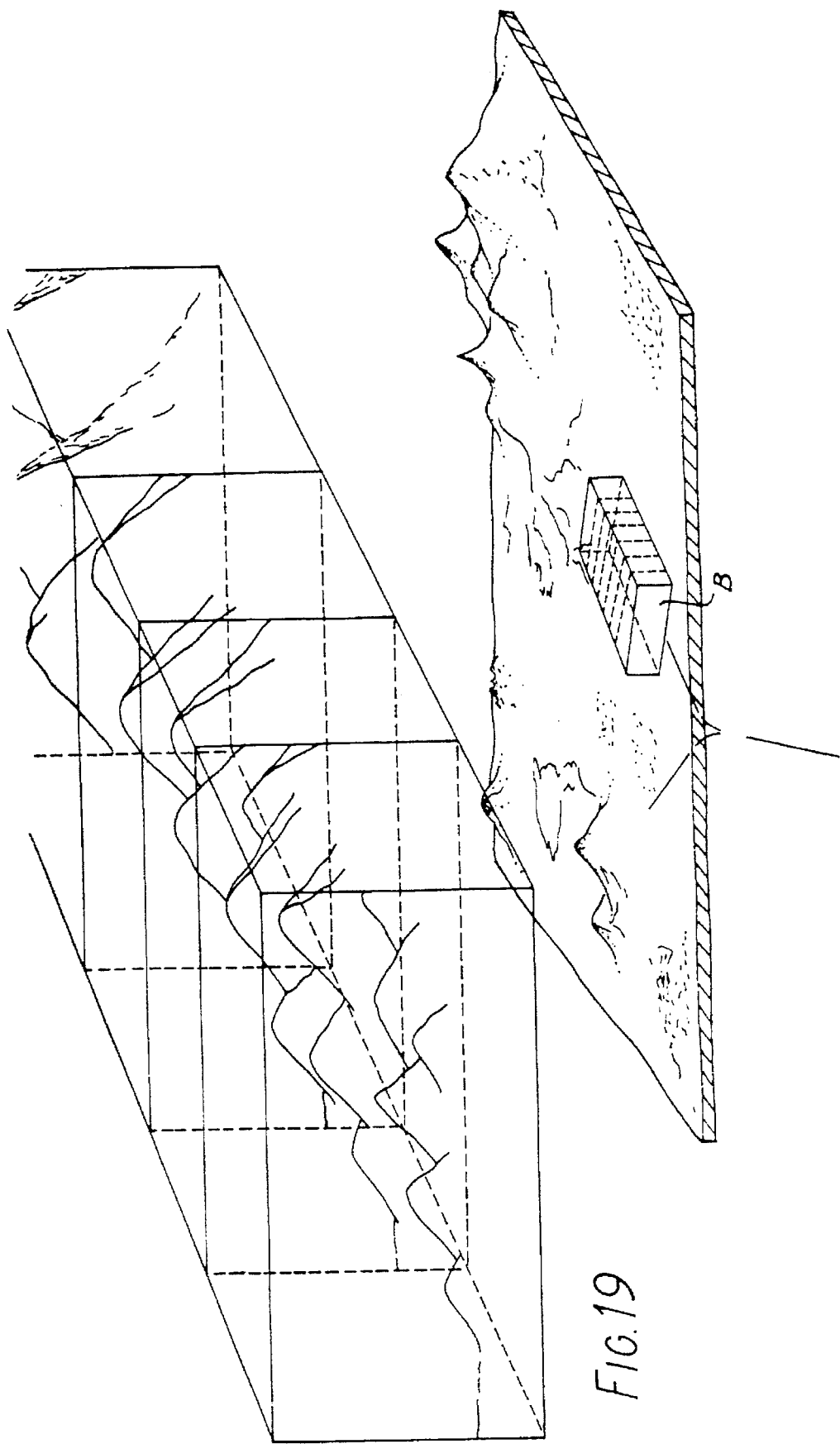
Figure 20:
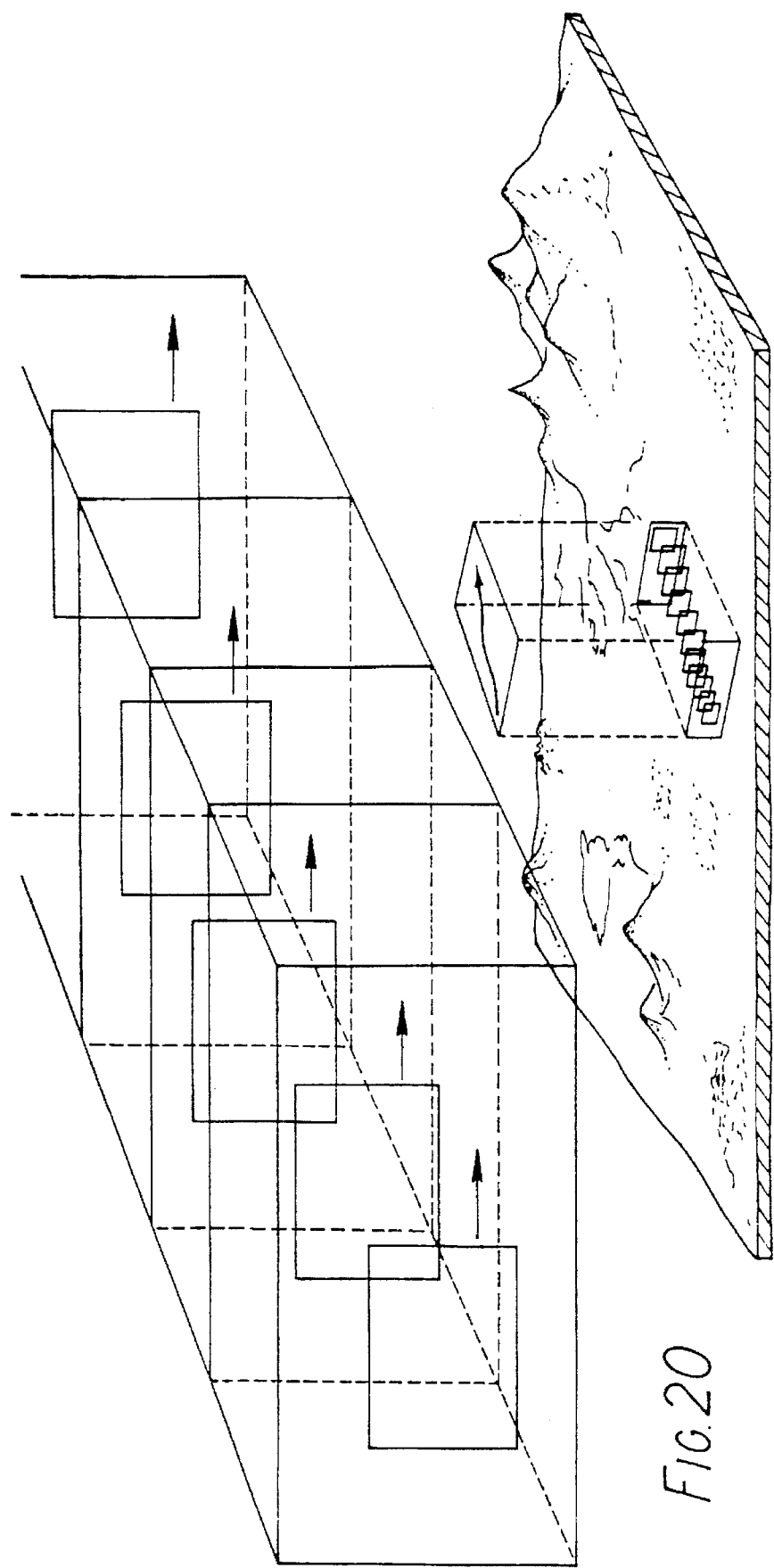
Figure 21:
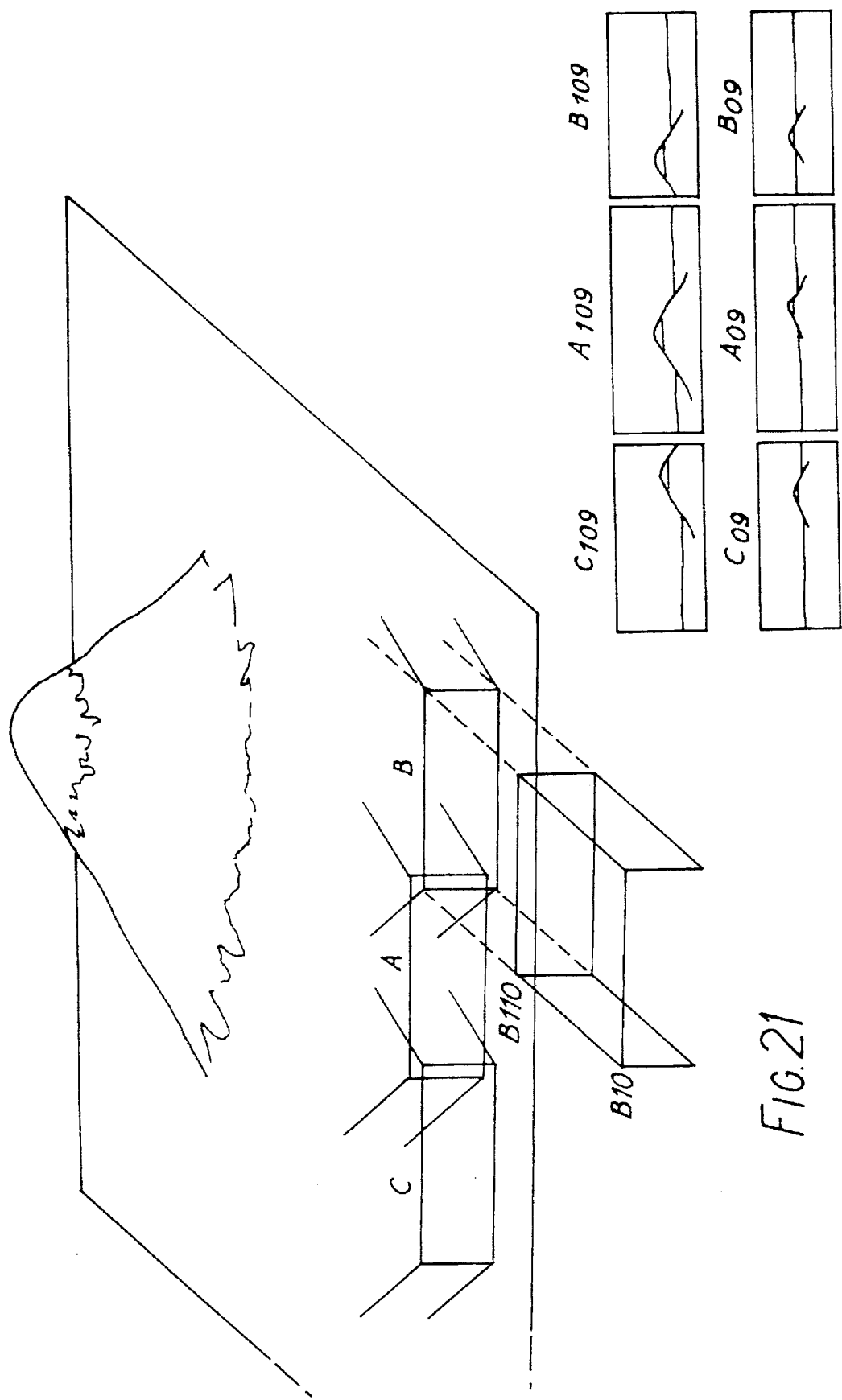
Figure 22:
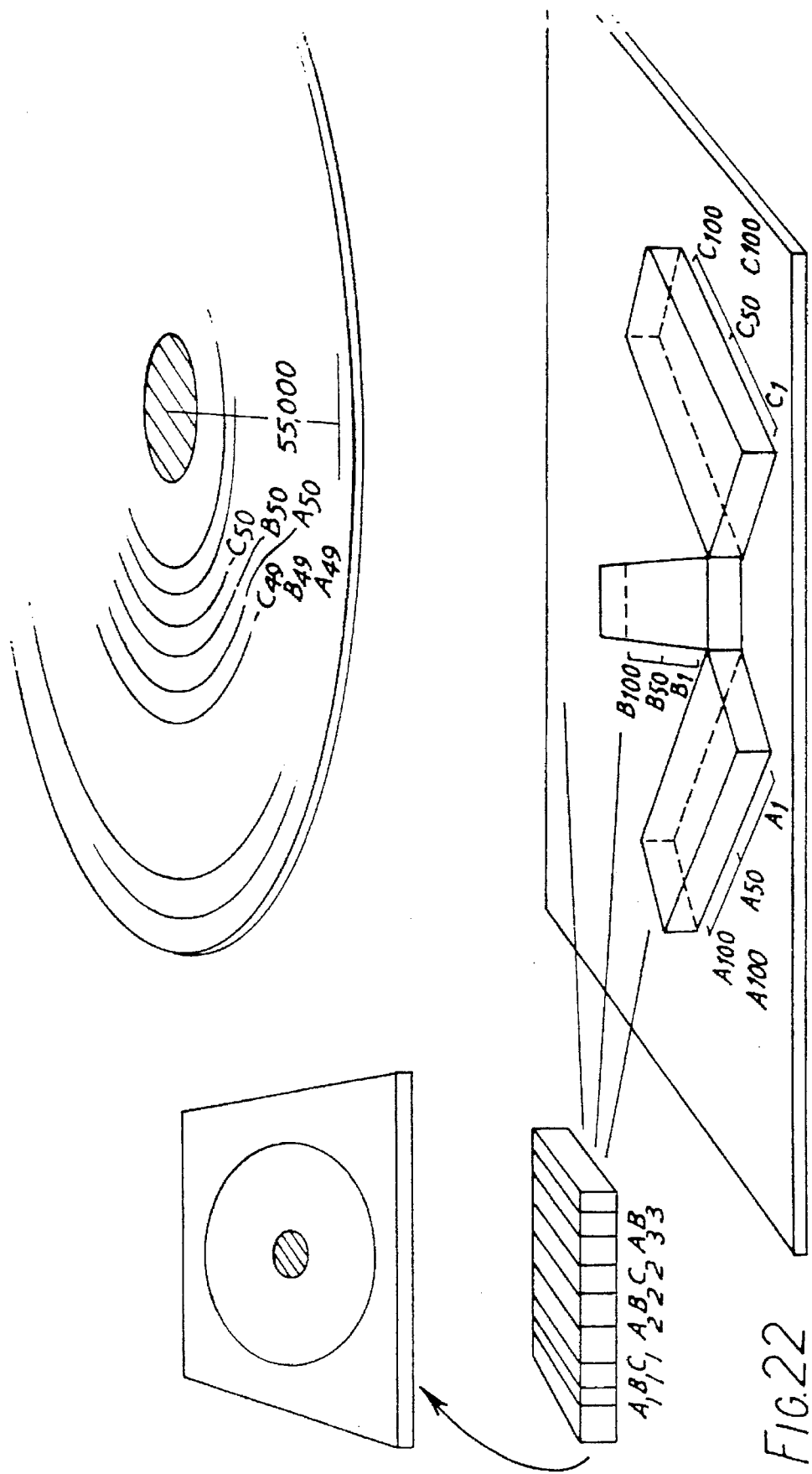
Figure 24:
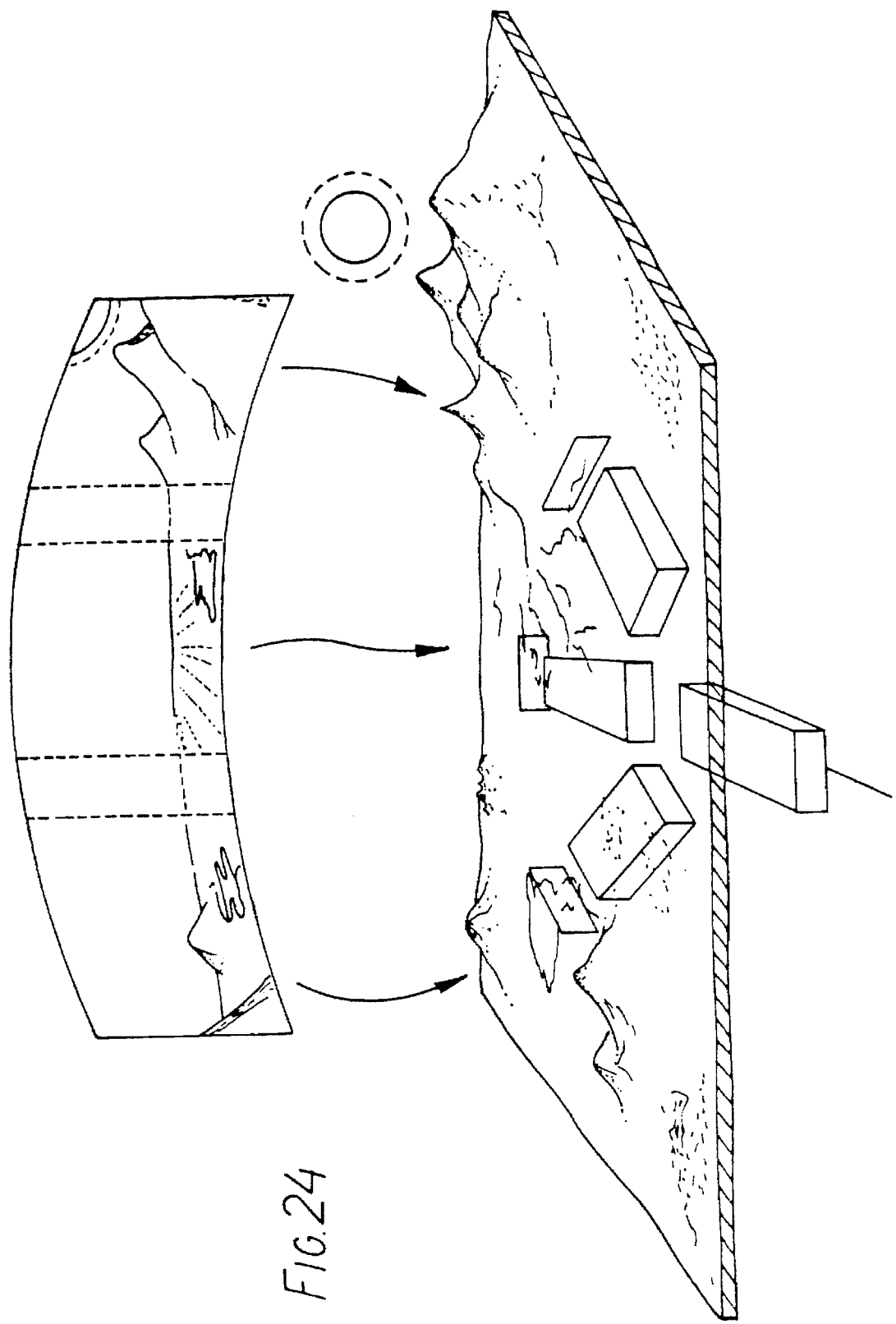
Figure 26:
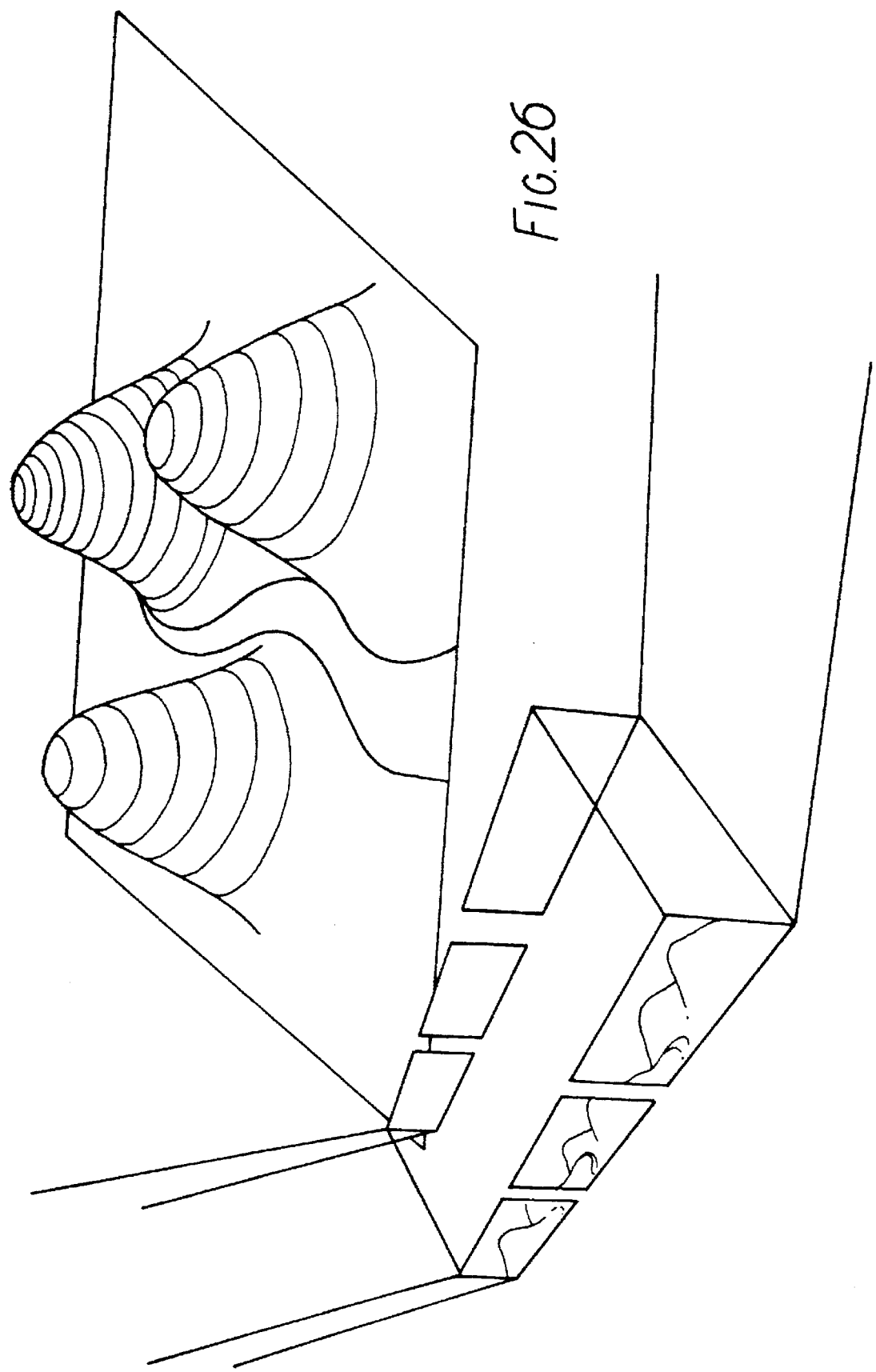
Figure 28:
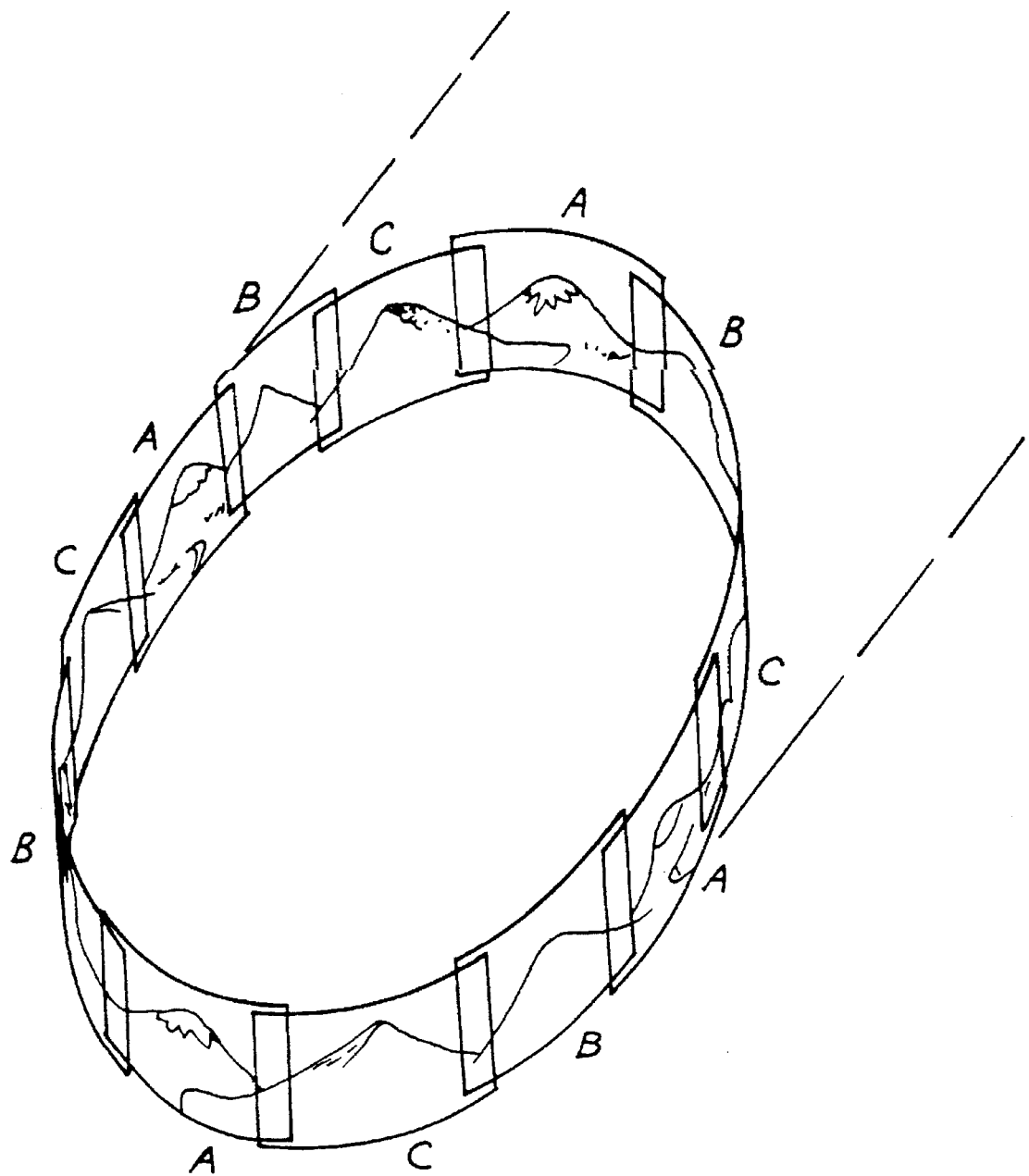
Figure 28A:
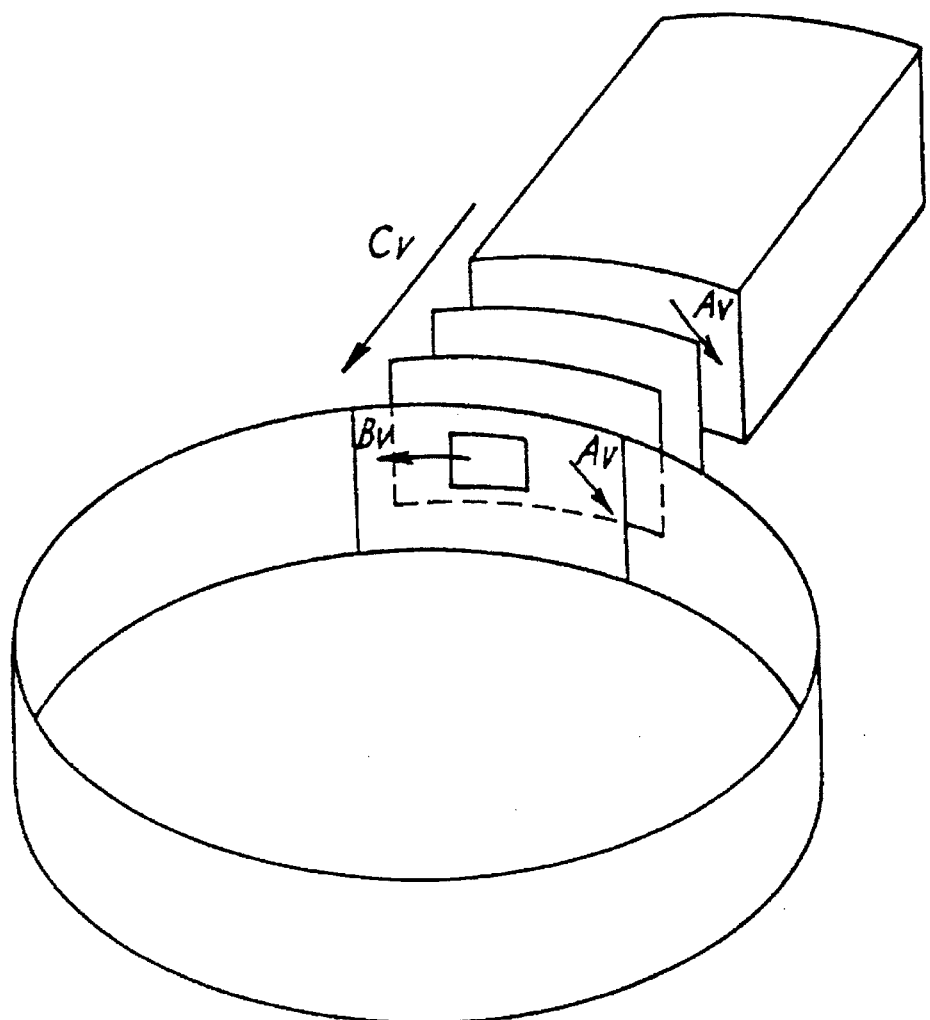
Figure 29:
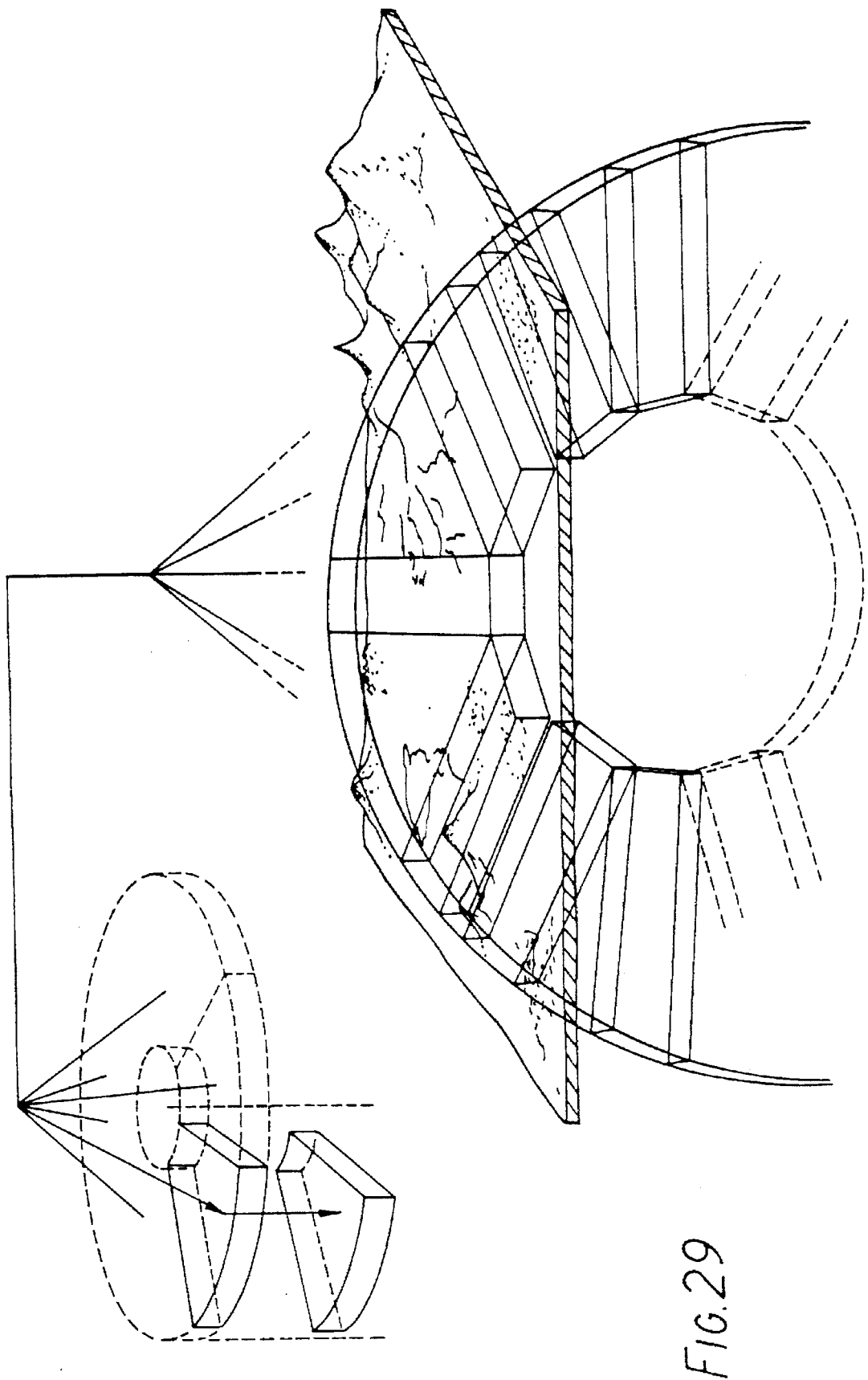
Figure 30B:
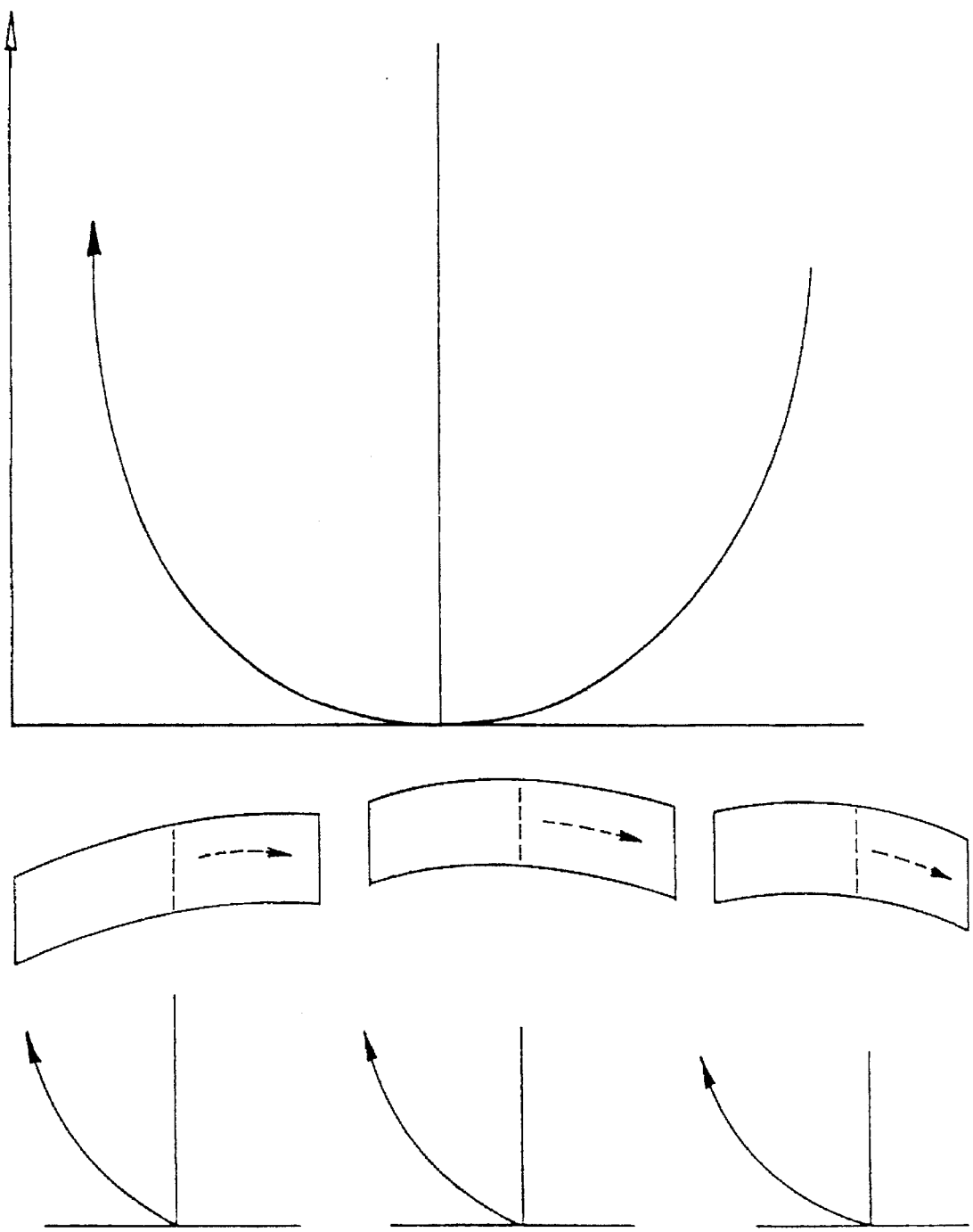
Figure 32A:
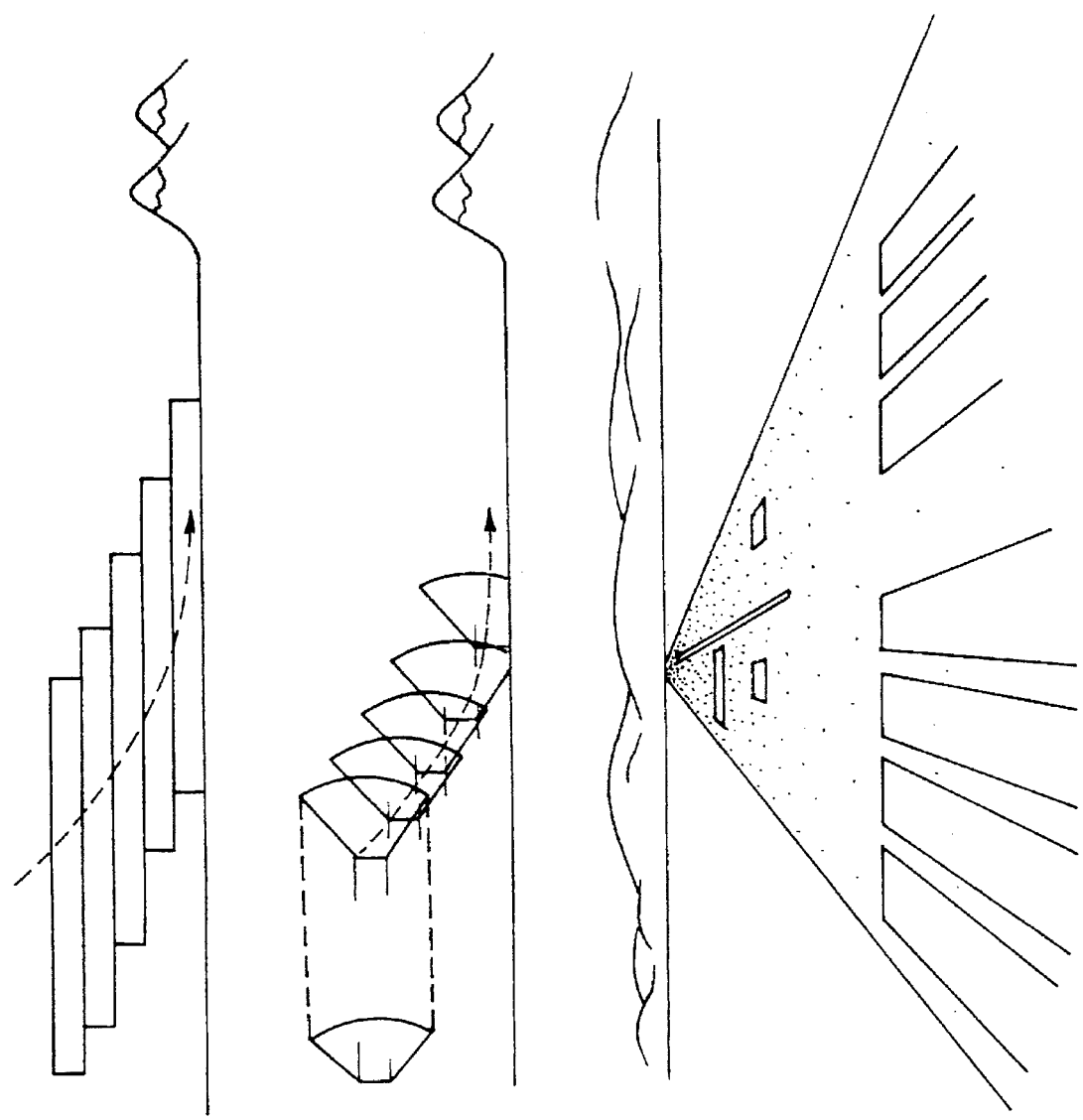
Figure 36:
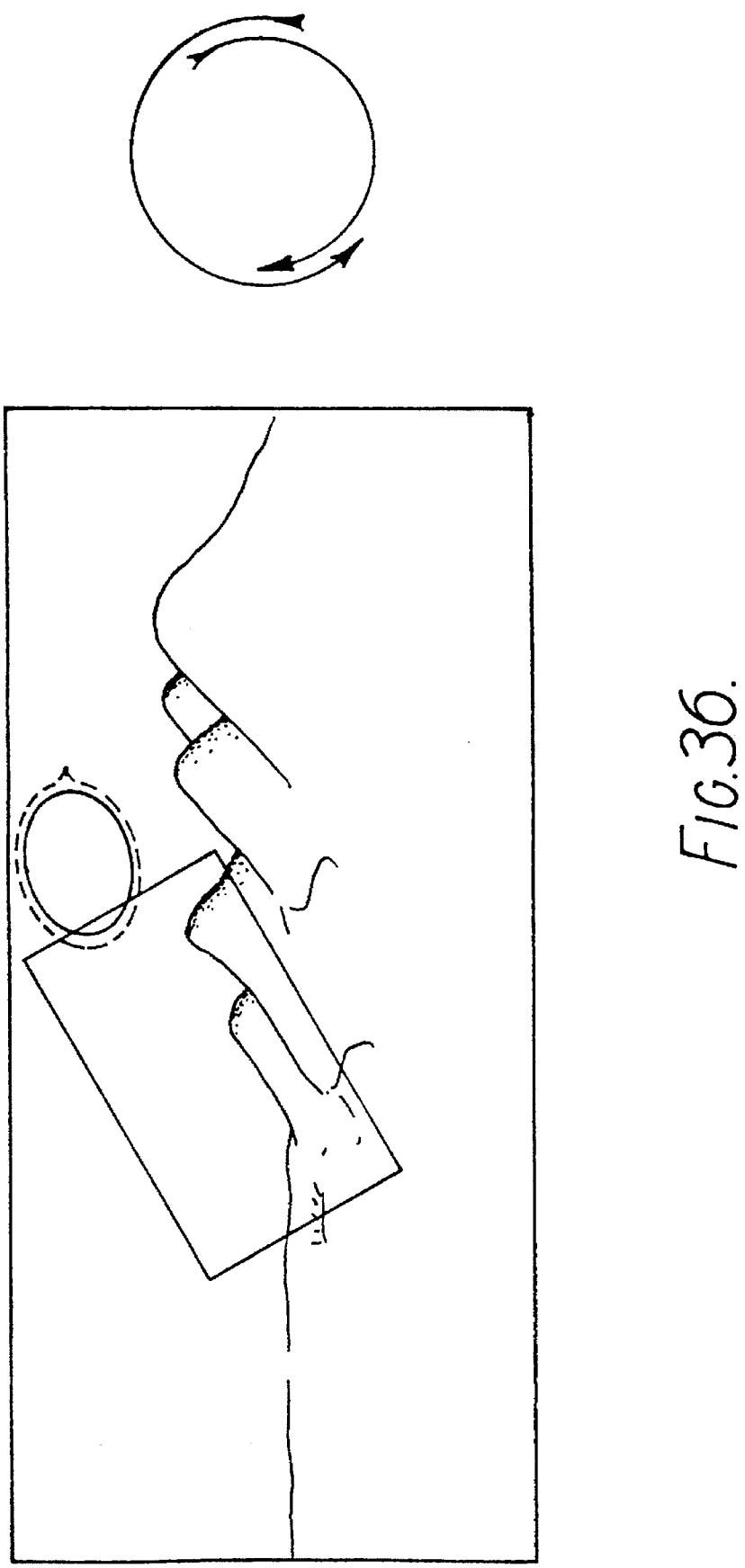
Figure 37A:
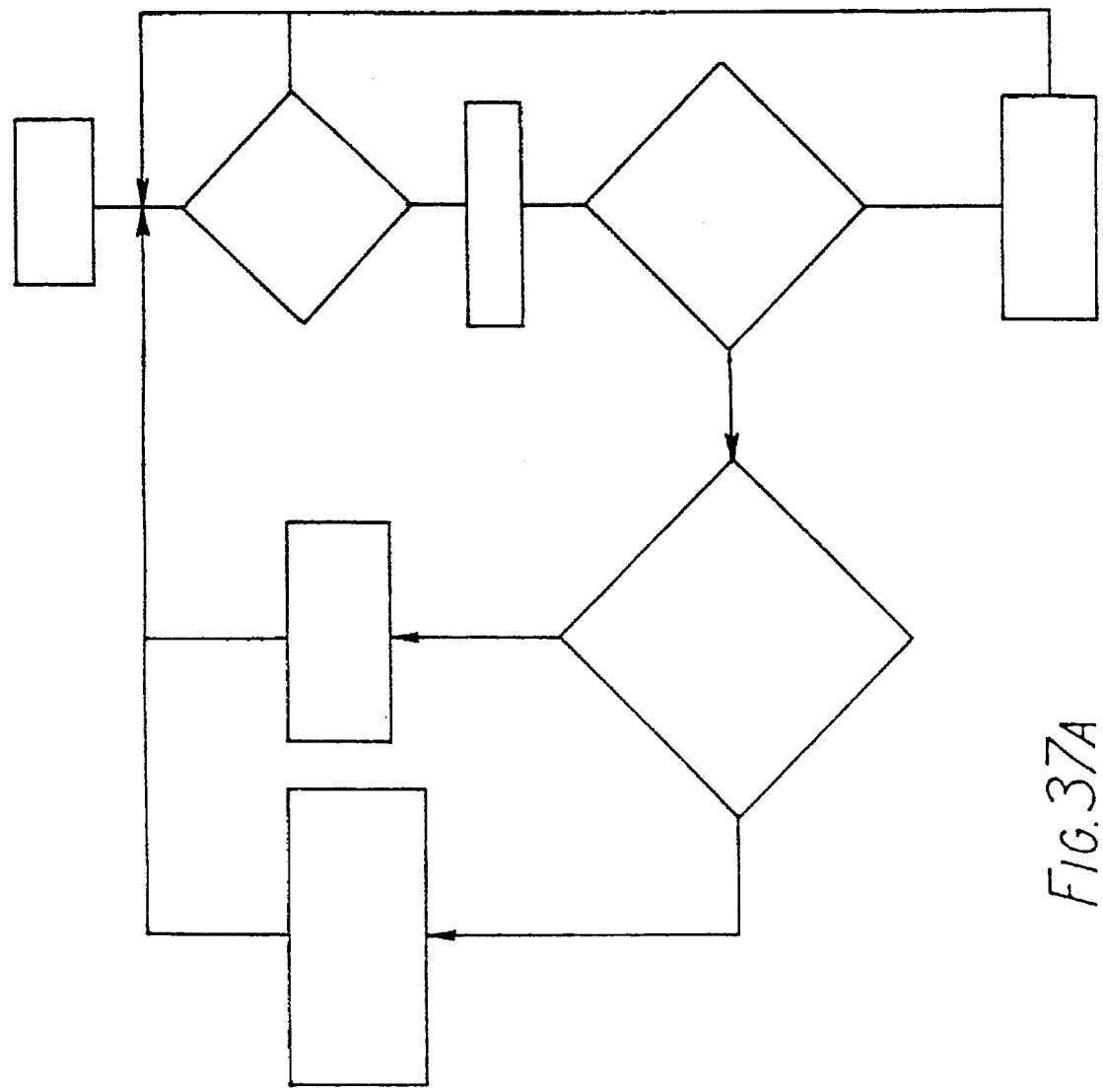
Figure 37B:
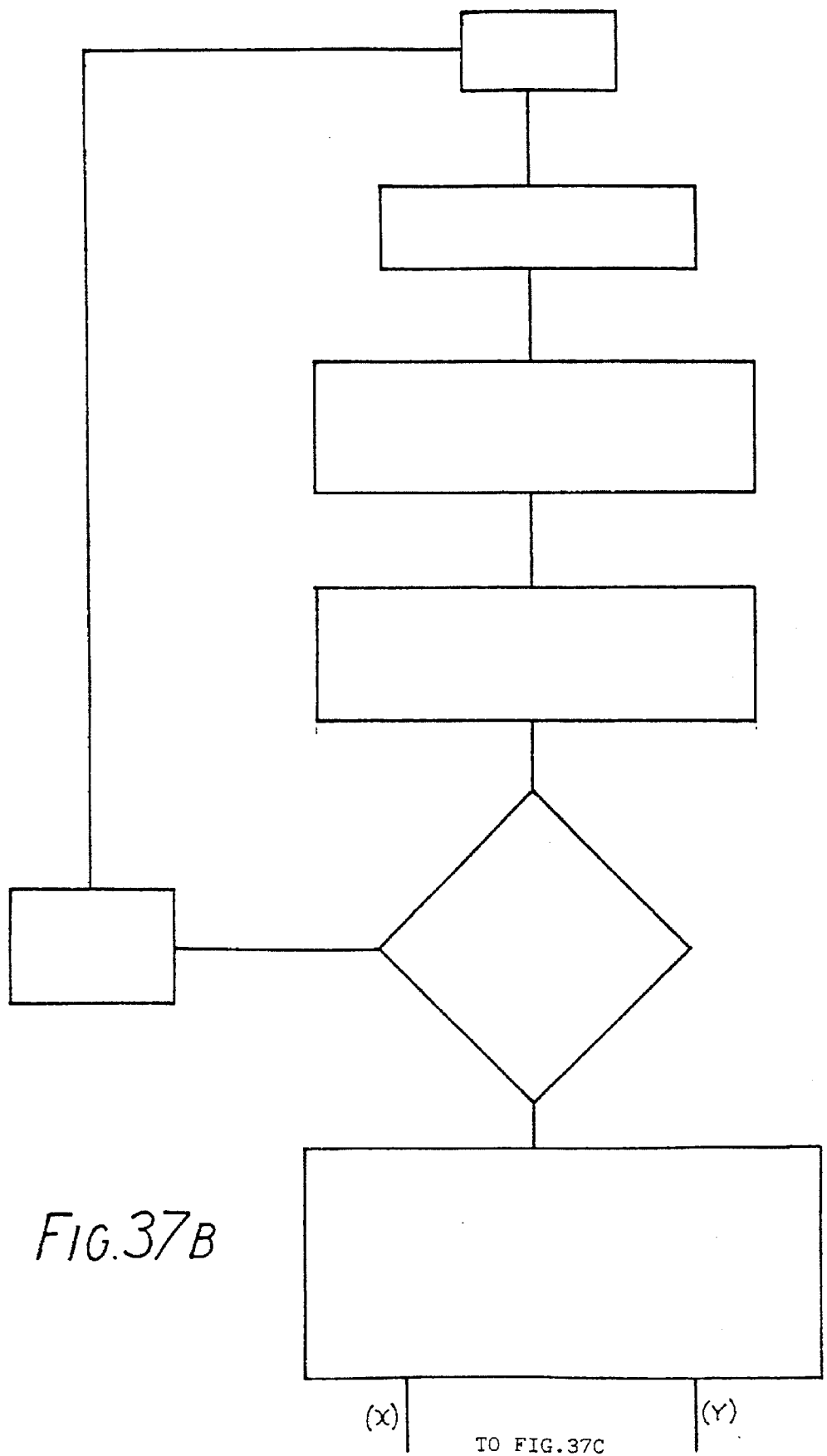
Figure 37C:
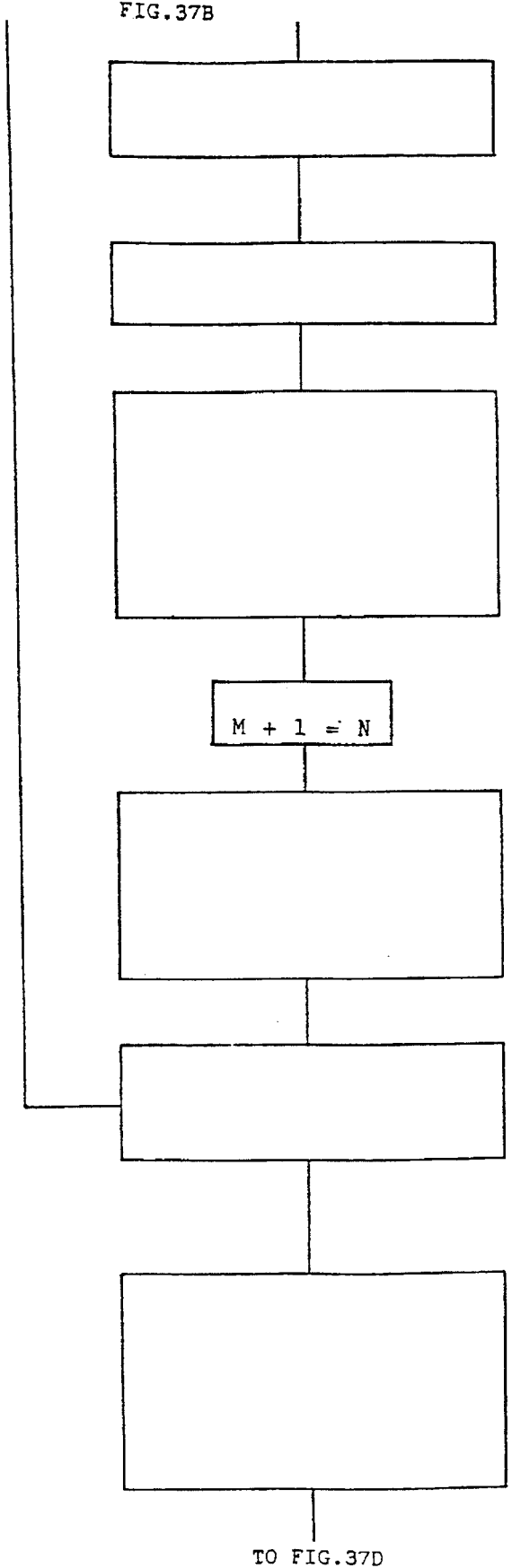
Figure 37D:
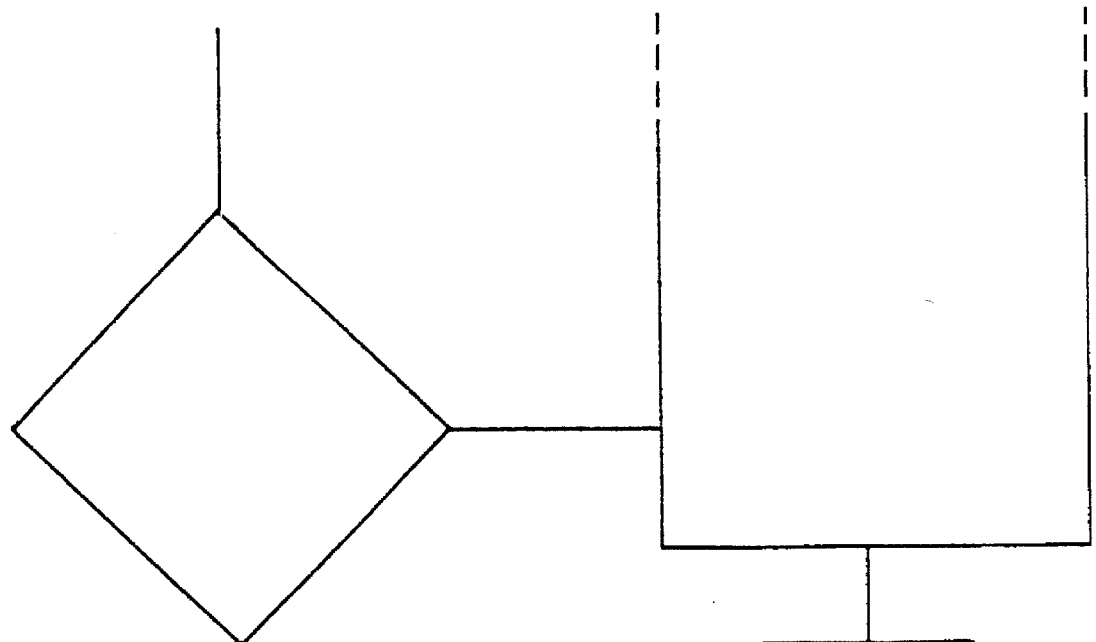
Figure 37E:
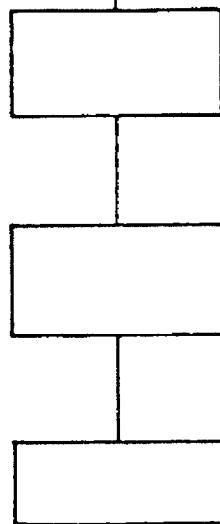
Figure 38:
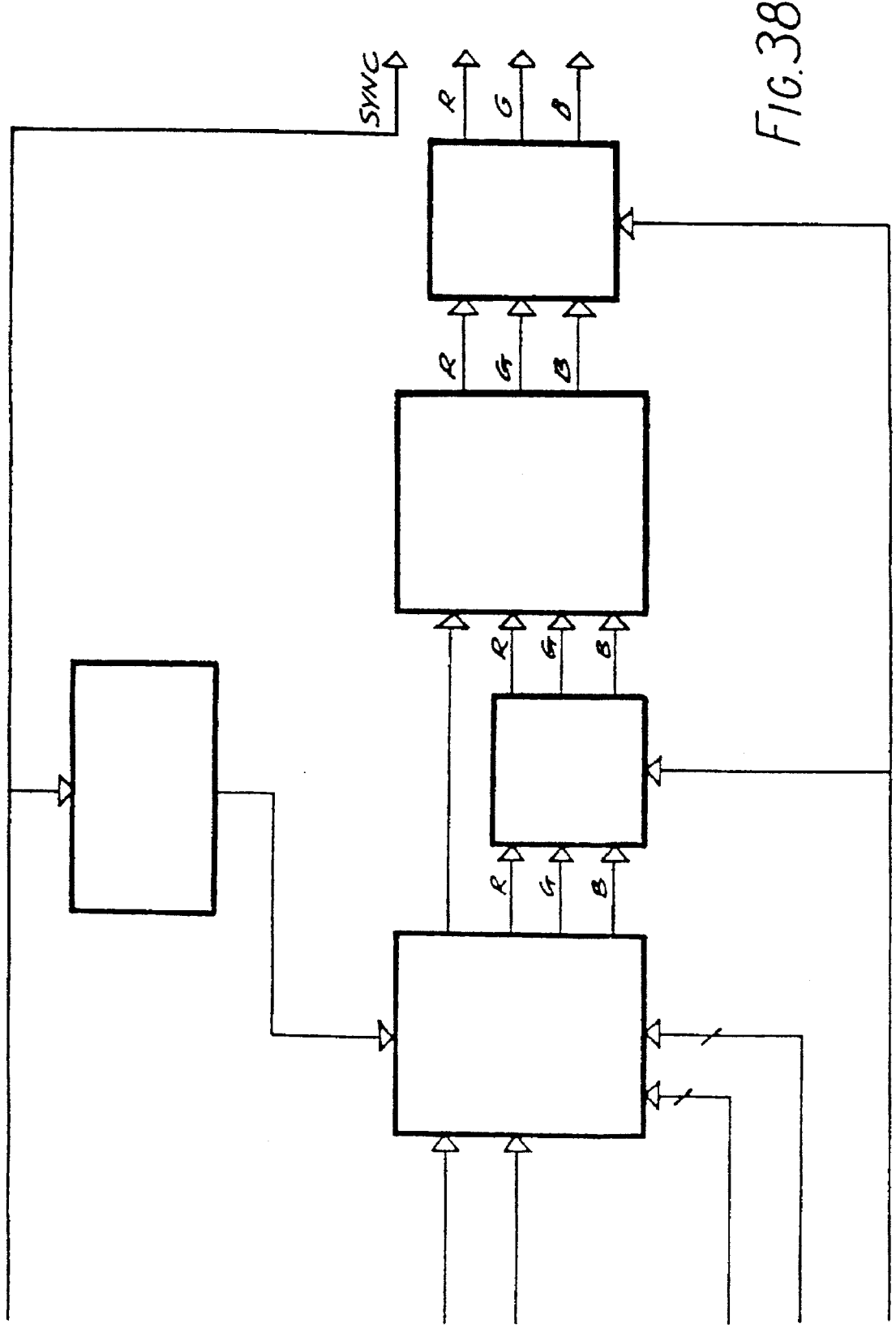
Figure 39:
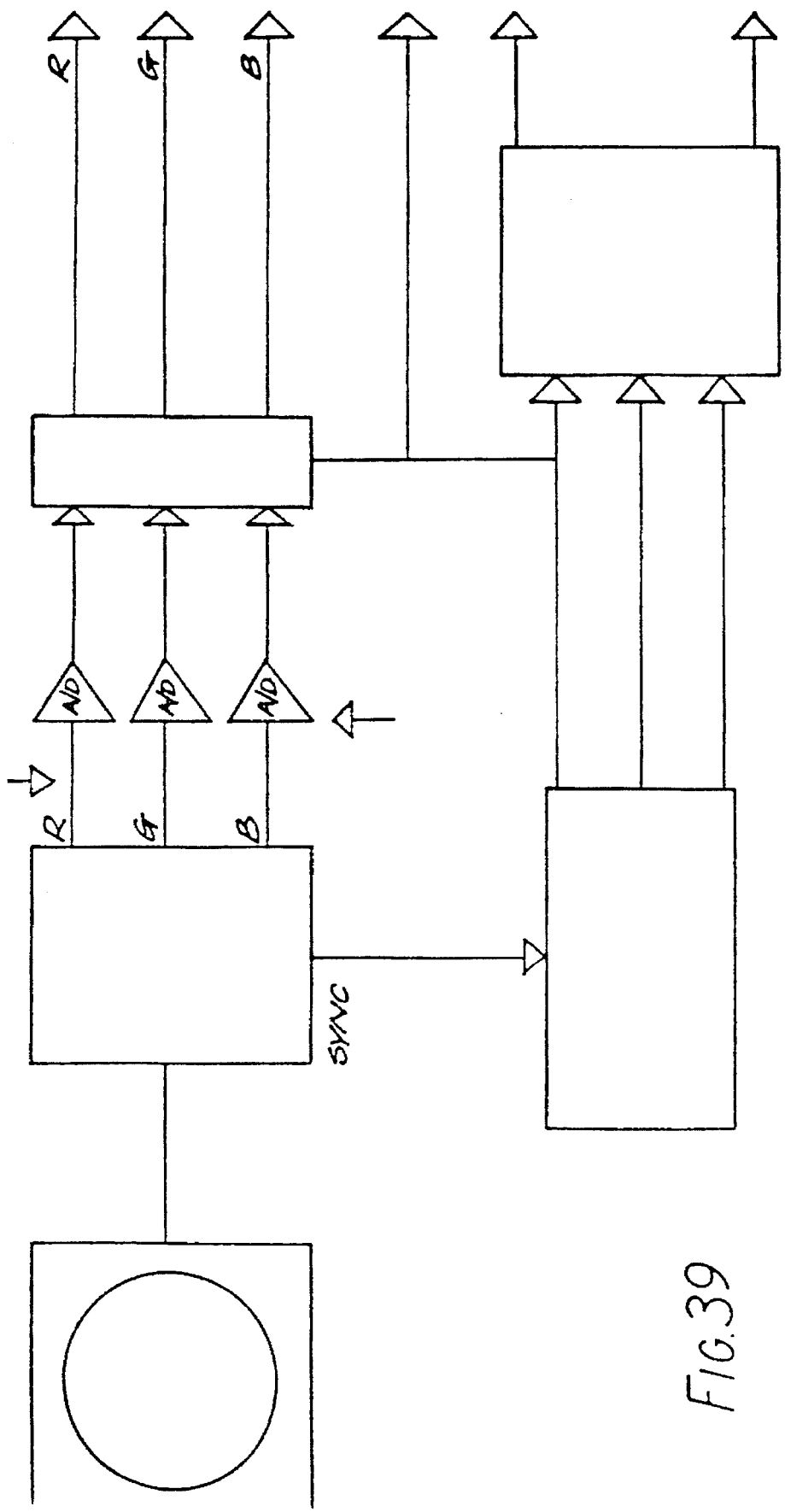
Figure 40:
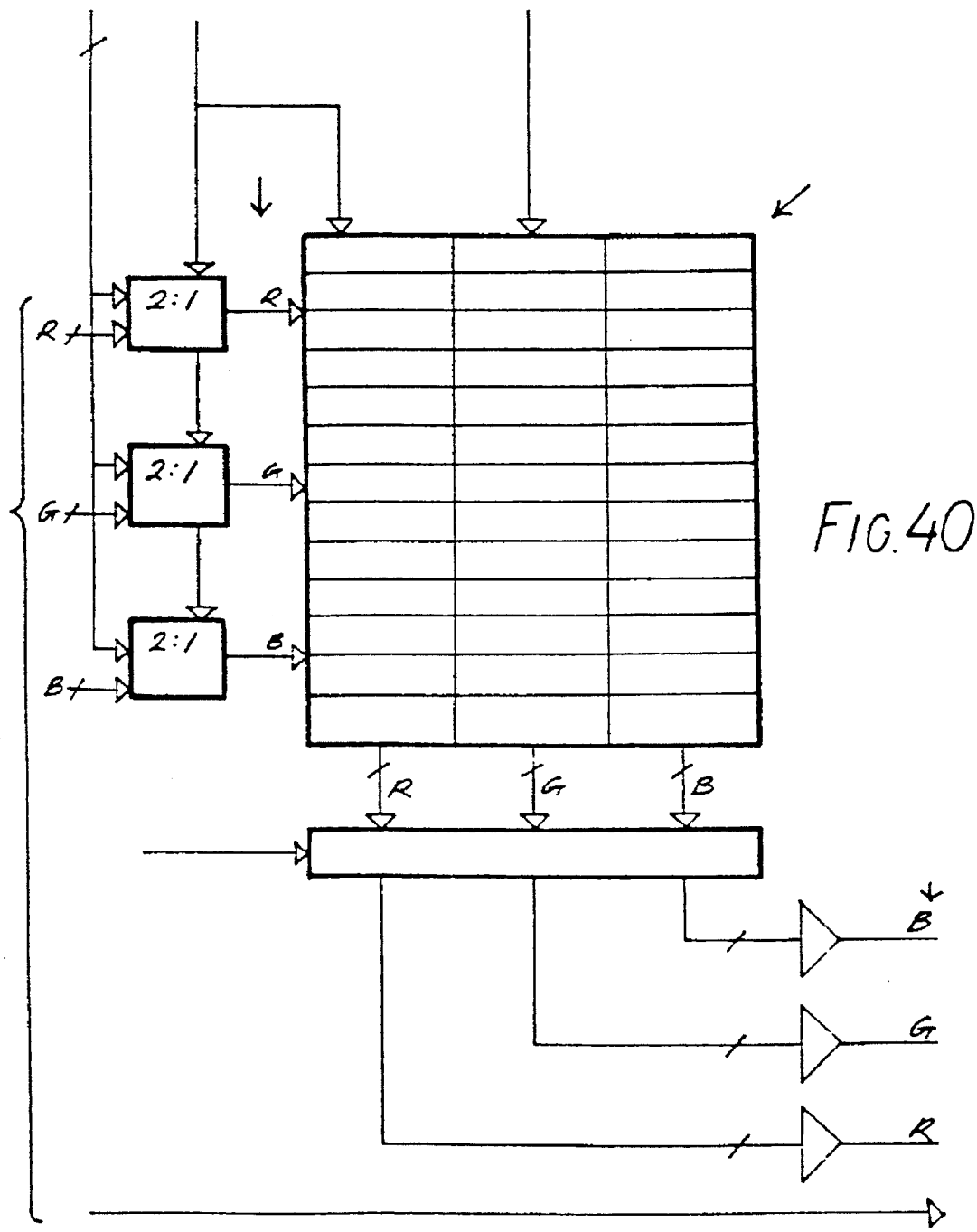
Figure 41:
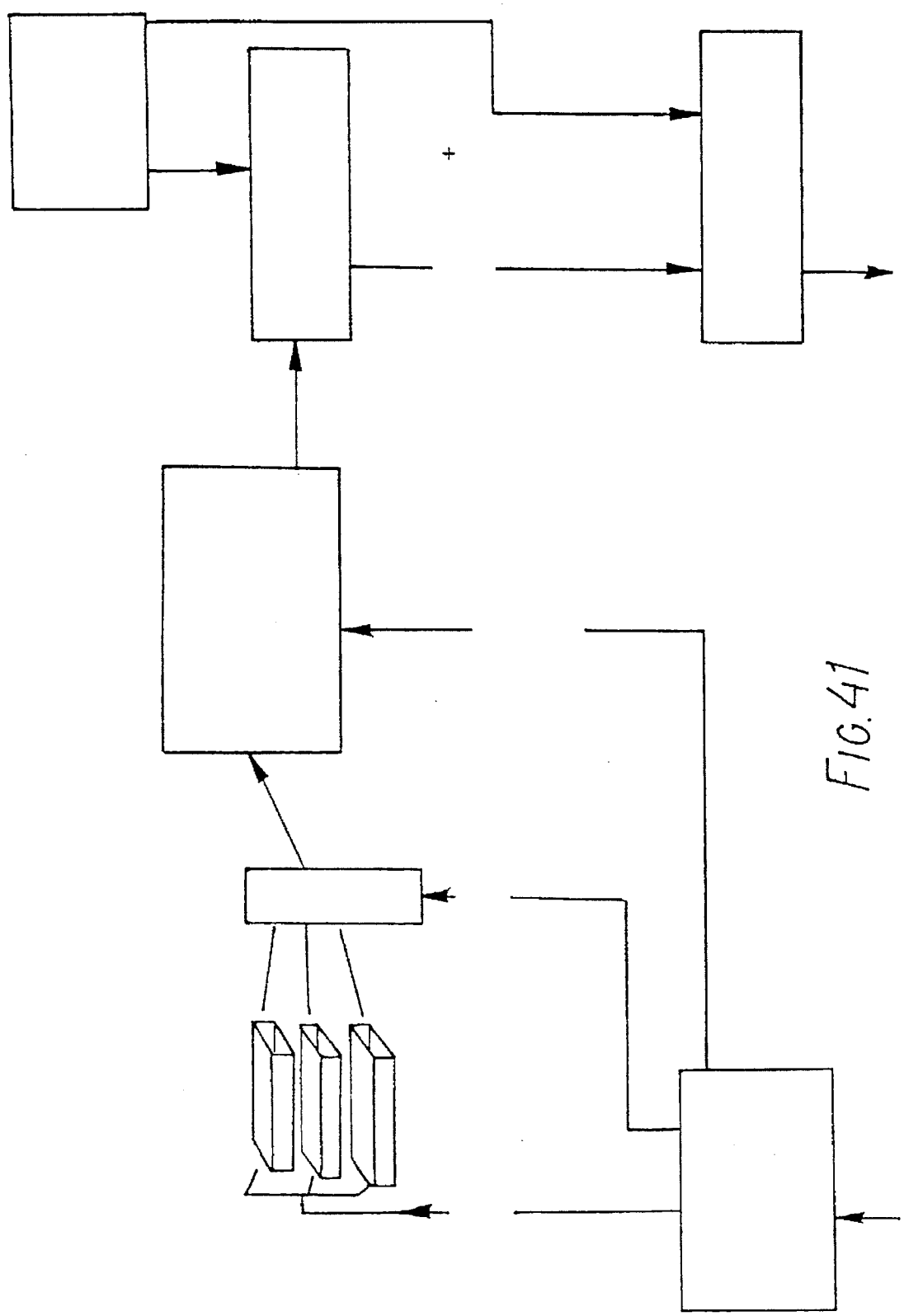
Figure 42:
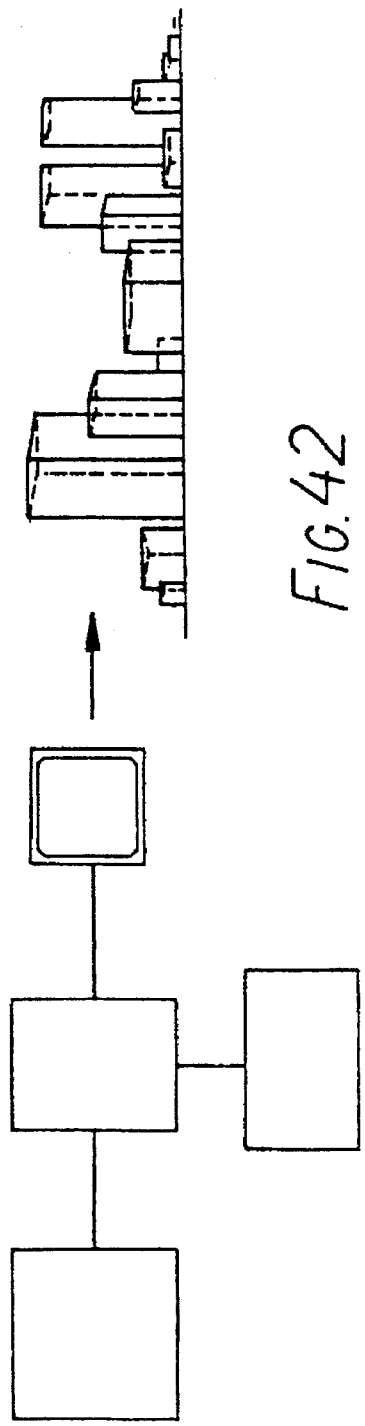
Figure 43:
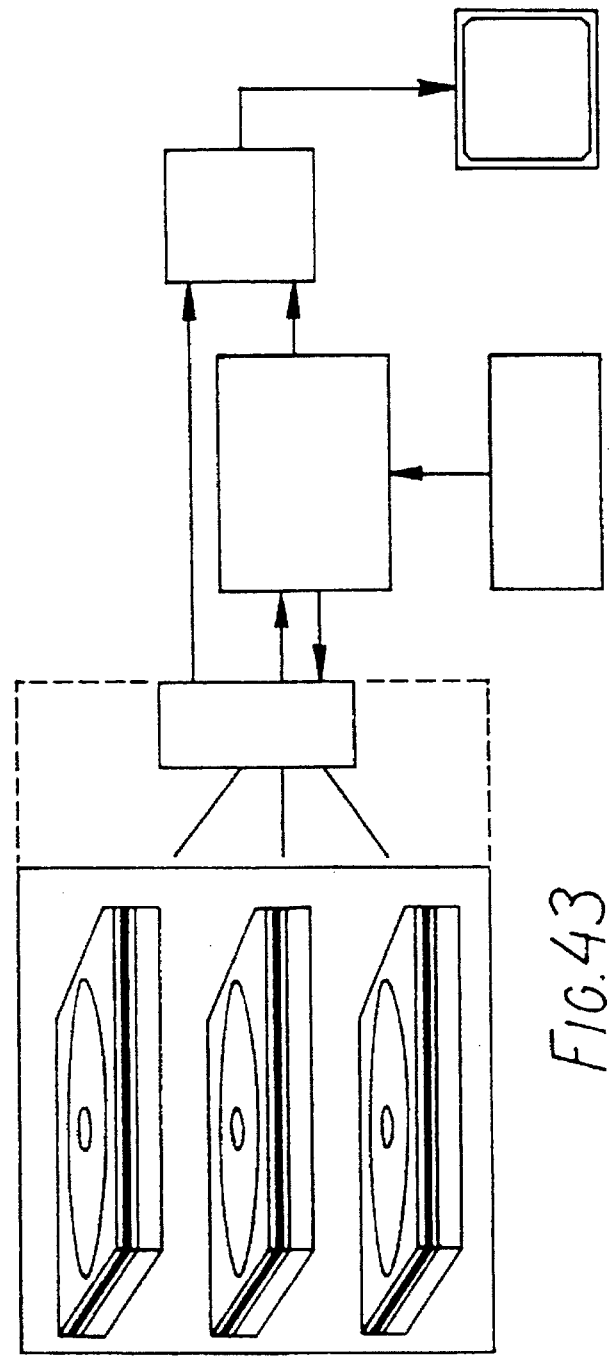

FIG. 7 corresponds to FIG. 5 but shows how different flight paths relate to frame sequences on the video record medium;

FIG. 8 shows schematically how multi-channel sound may be added to the system of FIG. 1;

FIG. 9 illustrates the operation of the apparatus of FIG. 8;

FIG. 10 illustrates the relationship between the refresh array and the frame store;

FIG. 11 is a diagram similar to FIG. 10 showing the portion of the picture in the frame store selected by the refresh array for display on monitor;

FIG. 12 illustrates the use of co-ordinates to define the refresh array;

FIG. 13 is a sequence illustrating the operation of the pseudo perspective transformation;

FIG. 14 illustrates how the illusion of passing an object on the "wrong" side is generated;

FIGS. 15 and 15A show curves illustrating the relationship between the rate of movement of the refresh array and the distance from the centre of the frame store for objects that are different distances to the side of the camera path;

FIG. 16 shows one of the curves in more detail;

FIG. 17 illustrates parallel paths followed by the camera in preparing three adjacent sequences;

FIG. 18 illustrates three radial camera paths;

FIG. 19 illustrates the successive frames on one of the three paths;

FIG. 20 illustrates the refresh array moving to an edge of the picture in the frames of one of the sequences of successive frames;

FIG. 21 illustrates the interrelation of the frames of the three sequences;

FIG. 22 illustrates the numbering and interleaved storage of frames from adjacent channels;

FIG. 23 shows the division of a frame into four quanrants;

FIGS. 24 to 27 show how a panorama can be built up by three frame sequences;

FIGS. 28 and 28A show how the sequences A, B, C can be repeated side by side to cover 360 degrees;

FIG. 29 illustrates the resulting panorama;

FIG. 30 is based on FIG. 16 showing the relation to curved movement;

FIGS. 30A and 30B are further illustrations of movement between the sectors of FIG. 16 when changing between interleaved sequences;

FIG. 31 illustrates how foreground, midground and background have different rates of incremental movement;

FIG. 32 shows curves based on FIG. 15 in the vertical plane related to low-flying aircraft;

FIGS. 32A and 32B illustrate the effect obtained and the manner of operation in obtaining it;

FIGS. 33, 33A, 34, 34A and 34B illustrates the theoretical basis for the natural perspective algorithm;

FIGS. 35 and 35A to 35J illustrate how different frame sequences give different viewing aspects for an object;

FIG. 36 illustrates the effect of "rotation" of the refresh array on the frame store;

FIGS. 37A to 37E are flow charts illustrating the operation of the NPA software to allow for movement parallax;

FIG. 38 is a block diagram of a preferred frame store;

FIG. 39 is a block diagram of a preferred frame grabber;

FIG. 40 is a block diagram of a preferred colour processing sub-system;

FIG. 41 is a block schematic detail of an improved video supply based on multiple playback devices and buffered frame stores;

FIGS. 42 and 43 illustrate known interactive video systems;

FIGS. 44A to 44H illustrate use of the system in an educational mode; and

Figure 45:
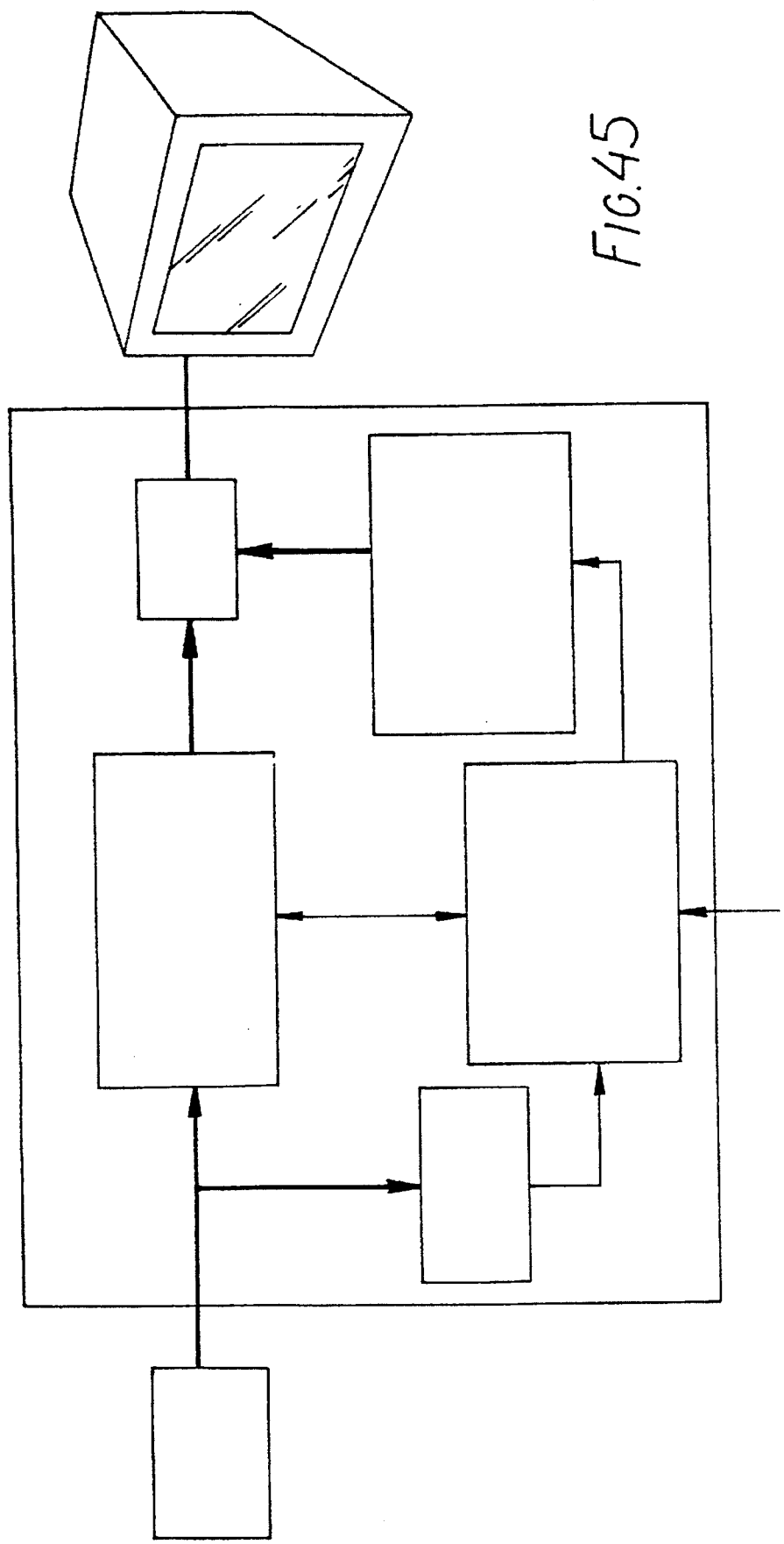

FIG. 45 is a block diagram of the overall system showing some of the basic components; and FIG. 46 is a Table defining the manner of movement from one quadrant to another.

In the following, a description of the various features mentioned above of the present invention is given with reference to their application in a real time interactive video system for use as a video games system. It will be appreciated, however, that the various concepts and features are applicable to various other applications, some of which will be mentioned below.

The illustrated real time interactive video system 1 is shown in functional block form in FIG. 1. Broadly, the major system components are:

(1) A microcomputer 10 which may be built around a microprocessor and which is programmed to control the overall operation of the system, to interact with the user and to generate graphics information for display.

(2) A user interface 20 which may comprise joystick controls such as 21 and/or a keyboard (optionally with visual display unit) 22.

(3) A display system 30 which may comprise a video monitor, television set, projection tv or any other suitable device for displaying a video picture.

(4) A video playback device 40 for producing moving picture sequences stored on a record medium 41.

(5) An interface 50 between the microcomputer 10 and the video playback device 40 so that the microcomputer can control the operation of the video playback device to access the moving picture sequences as required in the course of the game.

(6) Video signal processing circuitry 60 for processing the video signals which are output by the video playback device 40, for mixing them with graphics information output by the micro computer 10 and delivering the combined signals to the display system 30.

The microcomputer 10 can be of any suitable type, may be dedicated to the system 1, and may incorporate the user inputs 20. The software necessary to operate the system 1 may be stored in non-volatile memory within the micro computer 10, for example on a floppy disc, ROM (read only memory), cartridge or tape cassette; alternatively, the software may be at least in part stored on the video record medium 41, with the micro computer 10 then incorporating a bootstrap routine for accessing the software at the start of operation of the system and loading it into its own RAM (random access memory). It is preferable if at least that part of the system software required to play a particular game is stored on a removable medium so that the game to be played can readily be changed for another.

The video playback device is suitably a video disc player and preferably of the laser-scanned variety. As is well known, the video information is encoded on a laser scanned video disc in the form of a series of microscopic indentations arranged in a spiral track on the disc. During reproduction, a read head moveable radially across the disc under the control of a servo mechanism directs a very fine laser beam at the row of pits. A photodetector arrangement serves both to keep the read head servo-locked on the spiral track and to read the video information encoded by means of the recorded pits. As is conventional, each video frame comprises two interlaced fields. Normally, the arrangement is such that an integral number of frames, usually one, is recorded per revolution of the disc which, during playback, is rotated so that the recorded video signal is reproduced at the normal frame rate; for use in the U.S.A. the disc will normally rotate at 1800 rpm for a frame rate of 30 frames per second.

Broadly, the operation of the system 1 is that the software stored in the micro computer 10 directs the general progress of the game, keeps the score, if there is one, and so forth and, via the interface 50, controls the video disc player 40 to access the moving picture sequence required at any particular stage in the game, this sequence being delivered at its output for processing by the circuitry 60 and display.

For any particular game, a video disc 41 is used which has recorded on its a series of moving picture sequences which constitute the visual setting in which the game takes place. The moving pictures may provide essentially a background with the game "action" deriving from the real-time superimposition of further graphics information generated by the microcomputer 10 or alternatively at least part of the game action may be contained in the moving pictures. The moving picture sequences may be filmed in real life or using models or may be animations, either artist-drawn or generated on one of the extremely high resolution, computer assisted, animation systems which are now coming into use.

As mentioned above, there may be one or more branch points in the video programme material where the programme branches into two or more alternative sequences. Which sequence is selected, depending on the rules of the games, may depend on the choice of the user as input via the user interface 20 or, for example, it may be determined by his or her performance earlier in the game, e.g. one option may be delivered when a score reaches a particular value, with another option being delivered when the score is not high enough or which sequence is selected may depend on what sequences have already been displayed.

The game need not be limited to one complete reading of the video disc 41. There may be segments to the game, variously distributed across the video disc which may be linked together in any suitable material by suitable accessing instructions delivered from the micro computer 10 via the interface 50 to the disc player 40.

The circuitry used in the interface 50 will depend inter alia on the particular microcomputer and video playback device used in the system. Primarily its function is to provide instructions from the microcomputer 10 to control the video playback device to access the required sequences of moving pictures and to read them in the required order and at the required times. Where the playback device is a video disc player, the instructions may include ones to move the read head to a particular radial location on the disc to access the programme material stored there. The interface may be two-way, to enable a communications protocol to be implemented with the playback device providing signals indicating when the instructed position has been reached, when the head is locked onto the desired part of video track and so forth. Also it may be convenient for the video synchronisation of the system to be derived from the output of the video playback device and the interface 50 may therefore provide the microcomputer 10 with synchronising signals from the video output of the playback device such as frame signals, colour frame signals and line and vertical field signals.

Figure 2:
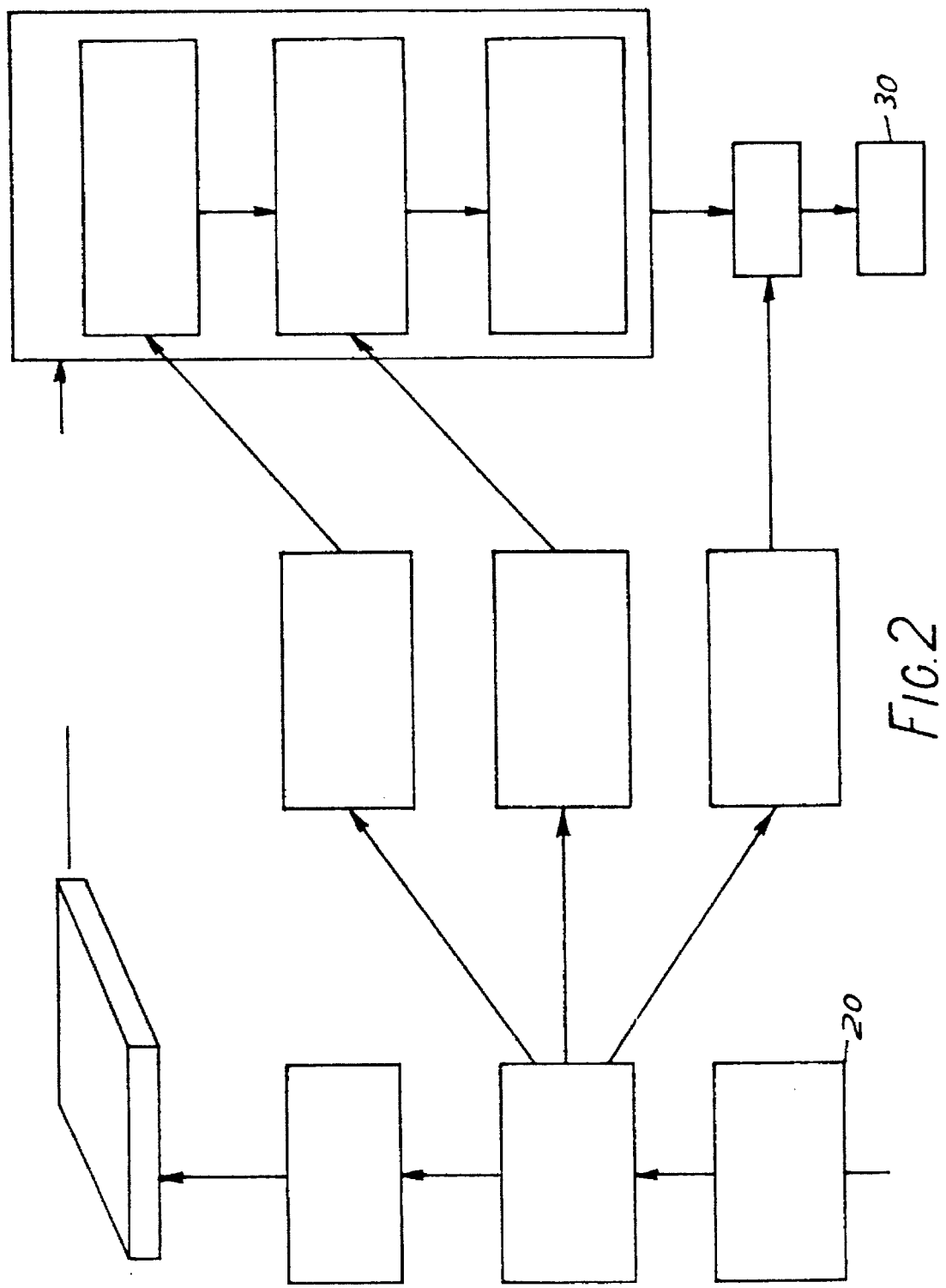
FIG. 2 illustrates the operation of the system of FIG. 1.

FIG. 2 shows schematically the general functioning of the system. As will be seen, the microcomputer 10 monitors the input at the user interface, inteprets the user activity in accordance with the game software and sends suitable read instructions to the video disc layer 40 to access the appropriate moving picture sequences and if necessary to generate the appropriate additional graphics. The signal output from the video disc player 40 is processed by the processing circuitry 60 and, where there are concurrent alternative moving picture sequences available, the appropriate one is selected for processing by the output of micro computer 10. The video signal to be output is mixed in the processing circuitry 60 with computer generated graphics from the micro computer 10 and the combined output is displayed to the user via the display 30. The computer generated graphics may integrate into the picture provided by the prerecorded video picture so as to provide, for example, moving missiles and rockets, explosions, stars and planets, terrain and landscape features and so forth as well as textual information such as scores, prompts and instructions to the user.

FIG. 3 is intended to explain the format of the signals recorded on the video disc 41 and the action of the signal processing circuitry 60. FIG. 3a shows a series of frames F1, F2, F3, F4 . . . , of a single moving picture sequence. These are recorded in sequence around the spiral track on the video disc, one frame occupying one revolution of the video disc. Obviously, as well as representing the distance along the spiral, the ordinate in FIG. 3a also represents time, assuming the read head of the disk player 40 is controlled to read contiguous frames.

FIG. 3b shows the corresponding situation at one of the branch points in the video programme material on the video disc 41. FIG. 3b illustrates the situation where there are three options, A, B and C. Successive frames of each option are recorded on the video disc 41 in serially interleaved fashion, i.e. so that the first frame of option A is followed by the first frame of option B, followed by the first frame of option C, followed by the second frame of option A and so forth.

Because of this interleaving, assuming the read head successively reads contiguous frames from the video disc 41, the frames of one option (e.g. F1B, F2B, F3B . . . , can be selected by time division demultiplexing of the output of the video disc layer 40. This process is shown in FIG. 3C. As will be apparent from FIG. 3C there are time gaps between the successive frames and in order to present a continuous video signal for display, each frame is repeated twice as shown in FIG. 3D to fill in the gaps. Thus what is actually displayed is a sequence of frames F1B, F1B', F1", F2B, F2B', and so forth. Because the new-picture rate is now one third of the replay frame rate, the signal processing circuitry 60 may be arranged to suitably modify the video signals so as to increase the information processing load on the eye/brain.

Figure 4:
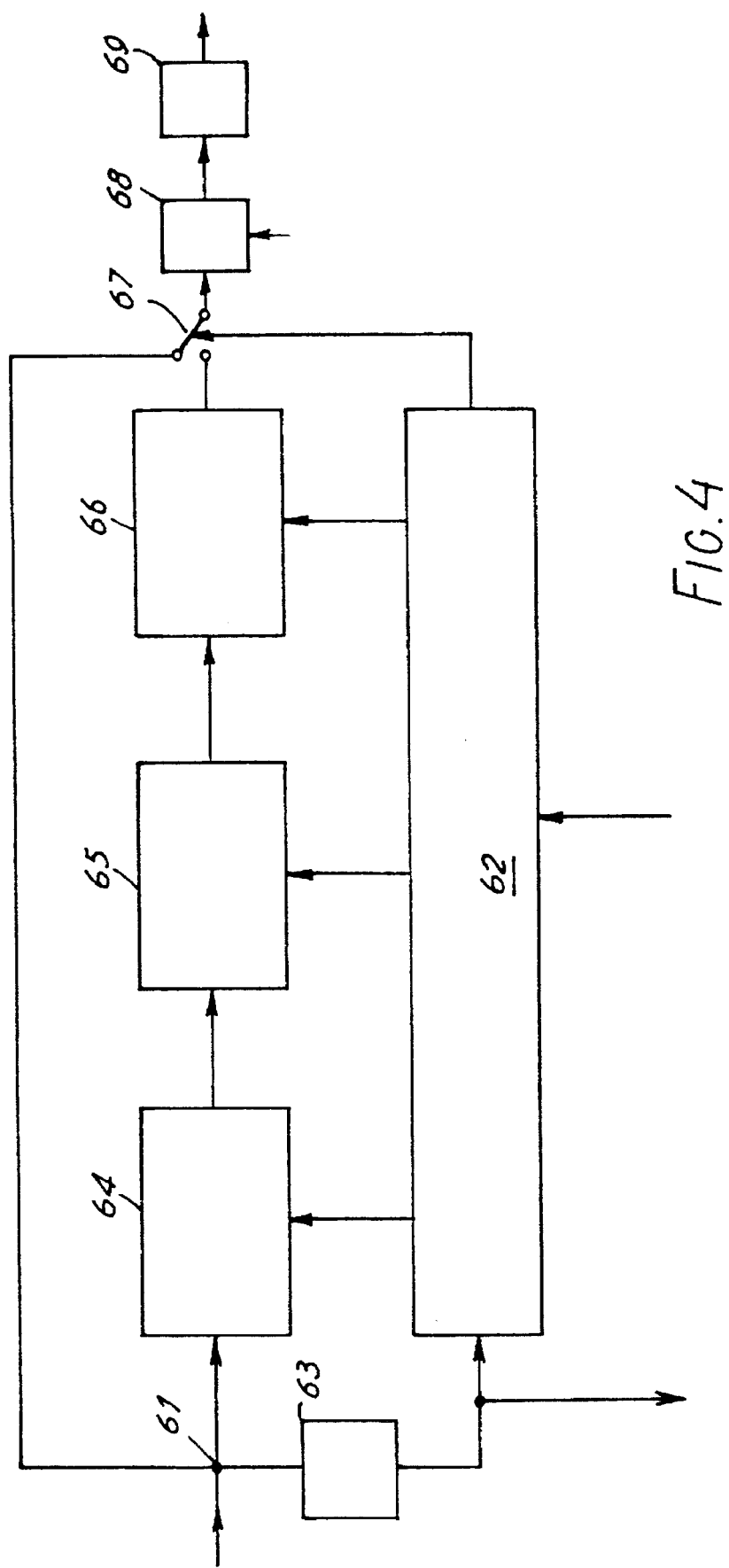
FIG. 4 is a functional block diagram of one form of the video signal processing circuitry of the system of FIG. 1.

FIG. 4 shows one possible arrangement for the signal processing circuitry 60. The output of the video disc player 40 is applied to an input terminal 61 for processing. A timing and control circuit 62 is connected to the microcomputer 10 to receive instructions from it regarding the processing required of the video signal and to control the other circuitry so that these instructions are carried out. The instructions frame the micro computer 10 include, inter alia, whether the signal processing circuitry is to decode a selected alternative moving picture sequence following one of the option branch points. In order to be able to co-ordinate the signal processing circuitry appropriately, the timing control circuit 62 may receive the output of a sync stripper 63 which provides timing signals corresponding to the vertical and/or horizontal synchronizing signals in the incoming video signal. Alternatively, suitable synchronising signals may be provided by the microcomputer 10.

An analogue time division demultiplexer and data selector 64 receives the incoming video signal and, in response to a control signal from the timing and control circuit 62, gates the successive frames of the selected option through to a frame store 65 into which it is read. This frame store 65 may be of any suitable analogue or digital form and is so arranged that each selected frame is repeated a sufficient number of times at its output to fill in the gaps as in FIG. 3D. This output is applied to a modulator or modifier 66 which processes the video signal so as to increase the information processing load presented by it. Where there are three options so that each selected frame has to be repeated twice, the first repetition may have the relative level of one of the its colour difference signals varied as compared with the original frame and the second repetition may have its luminance level varied or vice versa. The timing and control circuit 62 controls a gate or electronic switch 67 so that either the output of the modulate 66 or the original incoming video signal may be delivered to the output, depending on which is required at any particular time.

The processed output is delivered via a mixer 68 which is used to mix the processed video signal with the incoming graphics data from the microcomputer 10. The block 69 in FIG. 4 takes care of any further processing which may be required of the video signal.

Preferably, the system is adapted so that it can handle different frame rates without modification, in particular the 25 fps frame rate used in Europe and the 30 fps used in the U.S.A. This may for example be achieved by a switch or jumper wire in the system timing circuitry. Alternatively, the system hardware may include a circuit for automatically detecting the frame rate, e.g. by monitoring the video signal from the video playback device and arranged to provide a suitable indicating signal to the microcomputer 10 or which ever other circuit is responsible for generating the system timing signals. Adjusting the system to the frame rate in use is, of course, necessary to ensure inter alia that the decoder 60 functions correctly.

FIG. 5 shows the three options available at a branch point in a game being used in a representation of flight across a landscape to indicate three different flight paths A, B and C. Equally, the three degrees of freedom available with three options could provide the choice between level, climbing and decending flight. With five options, up/down and left/right options as well as straight ahead could be accommodated simultaneously. FIG. 5 also illustrates how certain details of the landscape such as the towns 100 and 101 may be inserted in the moving picture landscape by graphics generated by the microcomputer 10; the graphics could also be used to alter the landscape and/or sky colouring to provide variety when the game is repeated or where the same landscape is used more than once in the game. Obviously the microcomputer 10 could also generate images of aircraft, spacecraft, weaponery and so forth. The microcomputer 10 may be programmed to arrange so that inserted graphics material suitably changes in perspective or elevation according to the moving picture option being replayed, e.g. where the different options relate to different flight paths.

Figure 6:
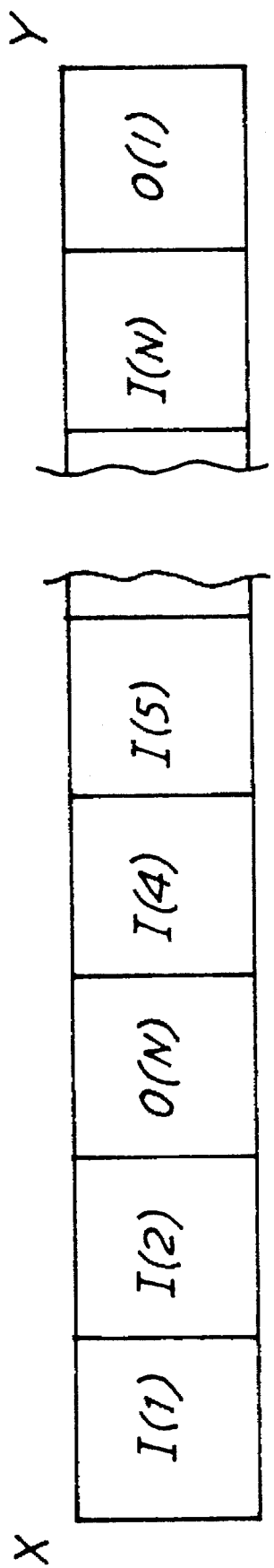
FIG. 6 shows schematically the disposition of two series of frames to enable reading in either direction across the video record medium.

At certain points in the programme material, it may be desirable to allow movement in either direction across the disc. This can be achieved by having the programme material between these two physical points of the disc consisting of interleaving frames, one set of which is to be read during the inward journey and the other set of which is to read during the outward journey as illustrated in FIG. 6. There, the frames to be read with the read head travelling inwardly are indicated as I(l)–I(n) and those to be read during outward travel as O(l)–O(n). It will be appreciated that during a traverse of the span X-Y in FIG. 6, all the frames will be read by the read head but depending on the direction required only the I or the O frames will be displayed. This can readily achieved by means of the signal processing circuitry 60, with the timing and control circuit 62 appropriately operating the time division demultiplexer so that the required frames are selected. Purely arbitrarily, in FIG. 6 there are twice as many inward going frames as outward going ones. Note that the frames may be suitably ordered so that the game "story" progresses in the correct direction.

One example of the use of this is to enable a long scene, e.g. long flight over a landscape, to be displayed using a shorter moving picture sequence repeated two or more times with part of the sequence being composed of frames read during the inward movement of the disc player read head and the remainder during its outward movement. The view as actually displayed can be varied when the sequence is repeated by changing the additional graphics information (e.g. terrain colouring and terrain features) provided by the microcomputer 10.

Because during use of the "option" decoding mode, a newly read frame is not required until the repetitions of the previous one are completed, the repetitions can provide time for the read head to be moving to a new reading position. This enables a series of groups of sequence options recorded in succession to be used to develop a tree structure with nodes provided by the branch point of each group of options. These series can extend as far as is permitted by the time made available by the frame repetition during decoding. The overall structure can be further developed by linking trees using the bidirectional pathways described in the preceding paragraph and other techniques such as creating loops between one or more brances of a tree and preceding node in that tree. It will be appreciated that these principles can be used to build up very large numbers of option pathways through the programme material so that, e.g. in using the system to play a game, different sequences may occur each time the game is played.

It may be necessary to have the read head of the video disc layer perform a jump between different radial zones of the disc. With the illustrated system the frame repetition of the video signal during replay in the "option" mode means that by operating in this mode during the read head jumps, no new frame is required during the two, or however many there are, repeats of the original frame. Further, a large jump across the disc can be arranged by having successive moving picture frames which are to be displayed during the jump disposed at intervals so that they can be reached by skips of the read head through a distance corresponding to the time available by virtue of the duplication of the previous frame.

It will be appreciated that these techniques, i.e. the frame interleaving on the record medium, frame selection and duplication during replay and the "pitstop" or "stepping stone" manner in which frames are disposed to enable skips and jumps across the disc are also applicable to other storage media, e.g. video tape, compact disc and other applications, e.g. database access and so forth where it is desirable for a continuous picture to be displayed while a new picture is accessed.

FIG. 7 illustrates a "sortie" in the course of a game over a particular piece of terrain. The frames Z for the inward going journey are interleaved with frames D for the return journey, three optional flight headings A, b and C, any one of which may be selected by the player, and after the flight along one of these paths has been completed, the picture cuts to the return sequence D. These actions are achieved by suitable coordination of the operation of the disc player 40 and the processing circuitry 60 by the microcomputer 10.

The system may include a multi-channel audio section for providing sound effect and musical accompaniment to the programme material.

FIG. 8 shows an example of this where a second video disc player 110, also under the control of the microcomputer 10, reproduce 8 channels of sound to accompany the video programme, these 8 channels being mixed by a mixer 120, also under control of microcomputer 10, the mixed sound being reproduced by, e.g., for loudspeakers 130a–130d set up in a quadraphonic-type configuration.

FIG. 9 shows one possible assignment of the 8 channels, (each of which may contain stereo information in suitable decodable form); it will be noted that there are provisions for sound effects, music and "destruction" and "success" sounds to enhance the game "environment" and provide feedback to the player. The mixer 120 may be controlled by the microprocessor 10 to provide a particular set of relative levels (including 0) of reproduction of each of the channels depending on the current stage in the game and how the game is going. To provide a measure of adaptability in the music to the state of the game, two or more channels may be set aside for low frequency components of the music, for example, bass tracks, which are at different tempos so that by mixing between them the pace of the music can be made to appear to change. It will be appreciated that the above described games system may be for home use, or suitably built into a robust cabinet as an arcade games machine.

Although in the above, the invention has been described with reference to its application to video games, it will be apparent that there are many other applications in which it may be used. For example, it may be used in various types of simulation such as flight and driving simulations, interactive tuition for academic subjects, sports and leisure activities and so forth, and also to provide a friendly user-interface or interactive computer software. The features which have been described with reference to its games applications may also be employed mutatis mutandis in these and other applications. The programme pathways made available by trees and loops in the programme material can make it possible in say a tuition application to enable the pupil to call up more detailed explanation and help when necessary, repeat parts of the tuition material and so forth.

Interleaving of frames on the video disc 41 or other storage medium thus reduces the access time at a branch point and improves the subjective quality of the display. However, the display will never be very interesting unless it can vary in dependence upon the user's input, such as from the joystick unit 21. Thus to take the example of a racing car on a track, the car needs to be able to appear to move left to right across the track as it drives along it. This simulation of movement requires the system to store in each frame a much larger picture than can be displayed on the display 30, and at any instant to select the right part of the larger picture for display. This then becomes a very substantial data processing operation, because in the interval between displaying two frames on the display the system has to read a new frame from the video disc, and work out which part of the new frame needs to be displayed. This will be different from the part of the previous frame displayed because the user (or car) is presumed to be moving across the track. It anything approaching a high quality display is to be achieved with a standard of detail of the same order as that used on conventional television broadcasting, the amount of data to be processed in the short time available is beyond the capacity of currently economically available microprocessors.

We have analysed the problems involved and have provided a solution which dramatically reduces the processing requirements enabling a corresponding increase in picture quality to take place.

It will be appreciated that each frame from the video disc 41 is stored in the frame store 65 for a certain period of time. The time duration is dictated by the rate at which the next relevant frame is supplied by the video disc player. The time available is at a minimum when the "car" is going along the "track" at the maximum speed of which the system is capable. The speed of production of frames available is in turn related to the fact that the frames are interleaved on the video disc, see FIG. 3.

Within the frame store 65 a subset of all the pixels (picture elements) that comprise the full frame picture is created. We refer to this subset as the refresh array. As shown in FIG. 10, the frame store 65 comprises a relatively large picture 150 and the subset or refresh array comprises a much smaller picture 152 within that larger picture. The refresh array 152 only is supplied to the monitor 30. FIG. 11 illustrates a part 152 of the larger picture 150 becoming the displayed picture 154 on the monitor. The user never sees the full frame but only the subset of it.

A register associated with the frame store holds values defining which part of the larger picture 150 comprises the refresh array 152. This "window" is defined on a co-ordinate basis as described below. The refresh array can be re-located within a frame interval to any new position within the frame store. To effect this change, in accordance with this invention, the microprocessor 10 controlling the frame store 65 simply uniformly adjusts the values of the x and y co-ordinates within the co-ordinate register that defines the refresh array. FIG. 12 is a purely diagrammatic sketch illustrating how co-ordinate values can be associated with the four corners of the frame store and of the refresh array.

In practice the co-ordinates are defined with very much finer precision than that shown.

In practice, for reasons that will become apparent, it is convenient to define the origin (0,0) of the co-ordinates as being the centre point of the frame store. When the user is "traveling" exactly along the centre path set by the original direction of motion of the camera used to film the frame sequence being used, then the centre of the refresh array will coincide with the centre of the frame store, and furthermore will remain at that point. Thus the values held in the co-ordinate store do not need to be changed, since the size of the refresh array will remain unchanged.

However, as soon as the user moves the joystick array from its central position to indicate movement off the original path, possibly with the intention of following a heading towards an object that is also off centre, then the part of the frame store to be chosen as the refresh array will need to be continuously changed. In discussing the type of changes required the following terms will be referred to:

NPA—natural perspective algorithm
PPT—pseudo-perspective transformation
AVC—array vector co-ordination Thus, as the joystick is moved to move the refresh array away from the centre of the framestore, the NPA generates increments for the x and y co-ordinates of the refresh array. These increments are such that the refresh array matches the perceived path and velocity of the object being followed. The software generates the motion of the refresh array by generating increasing amount of uniform increment that corresponds to the displacement within the frame store (and original film) of the object the user is heading for. The object will pass towards the edge of the screen slowly at first and then with increasing velocity. The movement is such that the object being followed remains central within the refresh array and central within the display. If the user is successfully following an object, that object must remain in the centre of the refresh array. However, when the frames were originally filmed the object was not at the centre. Thus as the camera took successive frames and got closer to the object, the object moved more and more quickly away from the centre of the picture.

This is illustrated in the sequence in the sequence shown in FIG. 13 which shows three frames from a sequence at (a), (b) and (c). The far end of the road is central on the picture, so as long as the car steers towards the exact centre of the picture no alteration is required to the position of the refresh array in the frame store. Suppose, however, the user deviates slightly to the right by movement of the joystick and heads for the sign 160. The refresh array moves until the sign 160 is at its centre and then the joystick will be returned to its central position. Now the sign must always be seen to stay at the centre of the refresh array, i.e. the displayed picture. But as successive frames, e.g. (b) and (c), pass, the sign moves more and more off-centre in the frame store as it gets closer. The refresh array must therefore move to the right at an increasing speed. The non-deviation of the sign within the screen confines of the monitor is an important part of the illustration.

It is seen from the above that the movement of the refresh array within the frame store is caused by two factors. The first is caused by movement of the joystick. The second is the movement necessary to give the illusion of continuing to be headed towards an object which is, in fact, off centre in the frame store. This is handled by the NPA, which also takes account of any deviation from a straight line which occurred when originally filming the stored frames. The NPA is implemented by appropriate software routines in the micro-processor 10.

If the increment of the refresh array address co-ordinate due to joystick control outstrips the displacement of an object represented within the frame store, then if say the original camera passed that object on its right then on the monitor display the user will gain the impression of passing it on their left. This is the principle of user motion control and is illustrated in FIG. 14. Three successive frames (a), (b) and (c) are shown. In (a) the object 170 is slightly right of centre of the frame store, so were the user to continue forward without moving the joystick the object would move out at an increasing speed to the right of the refresh array and of the display. The user would see that the object had passed them on their right. The user could, however, initiate a sharp right turn. Assume that at the instant of shown the object is "moving" to the right at a speed of 5 cm/s on the screen. If a right hand turn is initiated which corresponds to a rightwards movement of 10 cm sec, the refresh array will move to the right faster than the object does. Relative to the refresh array, the object moves to the left by 5 cm/s, and this is what is seen on the display. The user thus has the illusion that the object passes them on the left.

By the same token if the camera passed the object by on its right but the refresh array increments match its displacement, then the user will appear to be on a collision course with that object. In this way the user will gain the sensation of being able to roam at will, committed neither to the directions nor to the perspectives of the original camera path.

The calculation of the increment values for the refresh array address co-ordinates will now be described.

It will be assumed that the camera originally used to film the landscape followed a linear path at constant velocity. If it did not, then deviations from this are recorded along with the frames and can be used to effect appropriate modification to the values obtained by the following methods. The motion of all objects within the framestore can be precisely predicted and plotted following normal Euclidean geometric principles to take account of the motion parallax. These plots will take the form shown in FIG. 15, where the horizontal axis shows distances or deviations from the central point in the frame store and the vertical axis shows the amount of increment required to the centre point of the refresh array, i.e. the velocity of its movement. There is a family of curves, three of which are shown, which correspond to different distances of the vertical plane through the lens and the horizontal plane of the image. For example, the stars in the sky are effectively at infinity and will never seem to move, always being the same on all the frames of the sequences. On the other hand, the sign at the sign of the road will move past quite quickly. The shapes of the curves are held in the NPA software. This is described in more detail below. One curve and the related frame store contents is shown in FIG. 15A.

It will be appreciated that there are furthermore two families of curves. One concerns movement in the vertical direction, i.e. towards the player, and is dependent upon the horizontal deviation of the image portion from the centre of the frame store, and the other concerns movement in the horizontal direction, i.e. sideways on the screen, and is dependent upon the vertical deviation of the image portion from the centre of the frame store. The resultant movement at any image point is given by the vector sum of these two component movements. In what follows we shall consider the first component mentioned principally.

Thus it is seen that the movement of the refresh array within the frame store is dependent upon the user control at the user interface, and the increment given by the NPA.

Referring to FIG. 16, one of the curves is shown in more detail and the regions defined by the curves explained.

Consider an object to the right of the centre of the frame store at point P. A vertical line from P intersects the curve at Q which corresponds to a rate of displacement given by R. To this has to be added the rate of movement set by the joystick control. If there is no movement required in response to the joystick control, there is no deviation from the line (0), and only motion parallax adjustment is made. If the movement due to joystick control is in the same direction as that due to motion parallax, the line PQ is extended into region (+). If the movement due to joystick control is in the opposite direction to that due to motion parallax, but less than it in magnitude, the resultant is to move into the area (−). If the movement is greater than that represented by the distance PQ and in the opposite direction, the resultant movement with be negative or below the line OP as shown by the region (−).

Obviously something has to be done when the edge of the refresh array reaches the edge of the frame store. It will be recalled that the camera that photographed the landscape to produce the sequence of frames passed linearly over the landscape. Then it did a repeat sweep parallel but adjacent to the first. We shall consider the position with three such parallel paths producing three frame sequences or chapters. FIG. 17 illustrates the three paths A, B and C and shows the different positions of a hill in the three frame sequences which result. These may be termed three array vectors.

In some cases it may be more appropriate for the array vectors not to be parallel but to be radial as shown in FIG. 18, which is based on FIGS. 5 and 7 but showing the shape of the frames taken by the camera. One of these series of frames is shown more clearly in FIG. 19 which relates the views seen in successive frames of sequential B to the features of the terrain. FIG. 20 illustrates the situation where the refresh array gradually moves across the frame at least in part under joystick control towards the edge of the frame.

As is seen in FIG. 21, any given frame of one sequence will overlap at least as to distance landscape features with the corresponding frame of the adjacent sequence. The landscape features will appear indifferent parts of the frame.

The three sequences comprise frames $A_1, A_2, \ldots A_n$; $B_1, B_2 \ldots B_n$; and $C_1, C_2 \ldots C_n$. The frames are stored in an interlaced fashion as we have described above, namely in the order:

$$A_1, B_1, C_1, A_2, B_2, C_2 \ldots A_n, B_n, C_n$$

so as to make it easy to move sideways from a point in one frame sequence to a corresponding point in one of the other sequences. The system picks from the composite signal coming from the videodisc player or other video storage device only those frames from the relevant sequence which are then sent to the frame store. The interleaving means that the frame information which represents alternative views is never more than a frame away from the read head.

The numbering and interleaved storage of the frames is illustrated in FIG. 22.

Each frame of each array vector or sequence is divided into four quadrants as shown in FIG. 23. The refresh array should not be seen as passing out of one frame into another, or more array vector into another, but out of one quadrant into another. FIGS. 24 to 27 give three examples of ways in which the adjacent frames within the array vectors effectively build up a panorama. Such a panorama can be used to simulate a 360 degree landscape by repeating the sequence of array vectors $A_1, B_1, C_1 A \ldots$ as shown in FIGS. 28 and 28A to give an all-round effect as shown in FIG. 29.

The twelve quadrants of the three array vectors are indicated on FIG. 27. The correlation between these quadrants is contained in the microprocessor in AVC software. The quadrant correlation is important to ensure that the user sees the correct face of a mountain that they are flying around, and that objects that they have passed by on one side do not suddenly reappear or flash past the screen.

Referring for example to FIG. 27, and in particular at the trees in vector A, it will be assumed that the user is in quadrant $A_3$ travelling faster than motion parallax. In other words the increment which displaces the refresh array is to be found within the (+) section of FIG. 16. On the display objects will appear to be coming in the left side and leaving on the right side, giving the user the impression that they are travelling an anticlockwise curve. If at any point the user wishes to cease curving and to travel in a straight line the refresh array movement must then match the rate of motion parallax as described above. FIG. 16 can then be re-defined as shown in FIG. 30.

So as the refresh array approaches the edge of quadrant $A_3$, which is also the edge of the frame store and consequently the edge of vector array A, the system then ensures both that the hardware stops reading frames from array vector A and starts reading C, and also that the refresh array is relocated in quadrant $C_4$ of the frame. Not only that, but the joystick commanded movement in quadrant $C_4$ is now such as to cause the refresh array to move in the opposite direction to that caused by motion parallax, i.e. towards the centre of the frame store. Thus the velocity and vector are to be found in the (—) section of FIG. 16, at a point diagrammatically opposed across the origin as shown in FIG. 30A. In this way the same sense of an anticlockwise curve is maintained with objects once again entering from the left hand edge and leaving from the right hand edge of the user monitor. Continued movement is illustrated in FIG. 30B which indicates how a number of successive transitions can occur.

The relationship between the movement areas defined by FIGS. 16 and 30 and the array vector quadrants is given in the Table given in FIG. 46. The arrows indicate vector direction. The refresh array can be defined in the frame store solely by means of its central co-ordinates and their displacement from the centre of the frame store (0,0). The refresh array movement conditions (0) and (−) as shown on FIG. 16 always leave one quadrant and reenter the corresponding quadrant in the next array vector. This can be represented in terms of the refresh array movement (RAMo):

$$(C_1 \quad A_1)^0 \text{ or } (C_3 \quad A_3)^0$$
$$\text{and } (C_1 \quad A_1)^- \text{ or } (C_3 \quad A_3)^-$$

Conversely conditions (+) and (−) pass through adjacent quadrants. This can likewise be represented as:

$$(C_2 \quad A_1)^+ \ldots (C_1 \quad C_2)^- \ldots (B_2 \quad C_1)^+$$
$$\text{and } (A_1 \quad A_2)^- \ldots (A_2 \quad B_1)^+ \ldots (B_1 \quad B_2)^-$$

Thus the array vector coordination is important in its relation to quadrant correlation. Each quadrant relates to a specific combination of signs of the x,y co-ordinates of the centre point of the refresh array related to the centre of the frame store.

To provide the correct amount of displacement the correct one of the family of curves shown in FIG. 15 should be chosen. Each curve represents a different one of a set of motion parallax equations. The selection is made on a determination as to whether the picture portion contains predominantly background, midground or foreground. The variable as to whether it is foreground etc. is encoded and stored in the vertical blanking intervals and is thus supplied to the microprocessor. Where there is a conflict foreground objects take precedence.

The incremental movement of the refresh array takes place between frames, not in real time, such that the more important e.g. foreground objects are kept central. This increment gives a variable to determine which of the family of curves of FIG. 15 is required.

After originally filming the frames, they undergo a post-production phase before they are recorded on the video disc. In this post-production operation an operator calls up selected key frames and logs on to the major feature in that frame. The movement made between frames enables a determination of the relevant constants to select the right one of the family of curves shown in FIG. 15. These constants are stored on the video disc along with the selected frames.

In this way the operator effectively makes the necessary decision as to whether an object is foreground, midground or background so that although a foreground object may occupy exactly the same position within the frame store as a background object, their subsequent rates of movement are very different. FIG. 31 illustrates a scene looking through a canyon to a distant horizon, where the horizon is the background at (a), the narrow canyon is the foreground at (b) and the midground is constituted by an intermediate picture (c). When these are superimposed as at (d), although the point p shown has the same coordinance for all three components, its subsequent rate of movement is different for each case.

From reference to FIG. 15 is will be recalled that the curves for foreground, midground and background have different profiles or shapes. It will be appreciated that there is in fact a continuum or infinite number of such curves. The selection of the appropriate profile is dependent upon the variable encoded in the vertical blanking interval, which informs the microprocessor as to whether objects are foreground, midground or background, all relative to the centre of the lense of the camera used originally to take the frames.

An important aspect of the division of the frames into quadrants is that each quadrant has a separate variable indicative of whether the quadrant predominantly contains foreground information etc. For example, a picture such as would be seen by a low level aircraft flying on a clear day will have similar variables for the bottom two quadrants which will produce graphs with deep profiles associated with foreground information, and similar variables for the upper two quadrants appropriate to only background information. With each quadrant having its own such "proximity variable" indicative of the closeness of the primary object in that part of the scene to the original camera lense, there is considerable scope for combining foreground and background information. In such circumstances the curves, particularly those related to vertical displacement, will be asymmetric about the horizontal axis as indicated in FIG. 32. The change of display and curves is illustrated in FIGS. 32A and 32B respectively for the example of a low-flying aircraft approaching a runway.

The derivation of the natural perspective algorithm (NPA) described above will now be described. The algorithm is implemented in software and is intended to reproduce the natural motion of all of the objects within the frame store. It must, therefore, be capable of reproducing motion parallax.

In addition to the original camera motion to be linear, or for any changes in path and velocity to the meticulously noted, and for each landscape or environment to be filmed in parallel sweeps, there are two other factors that must be noted. These are the distance between adjacent parallel sweeps, namely the array separation, and the distance travelled by the camera between each exposure, namely the exposure interval.

Figure 34:
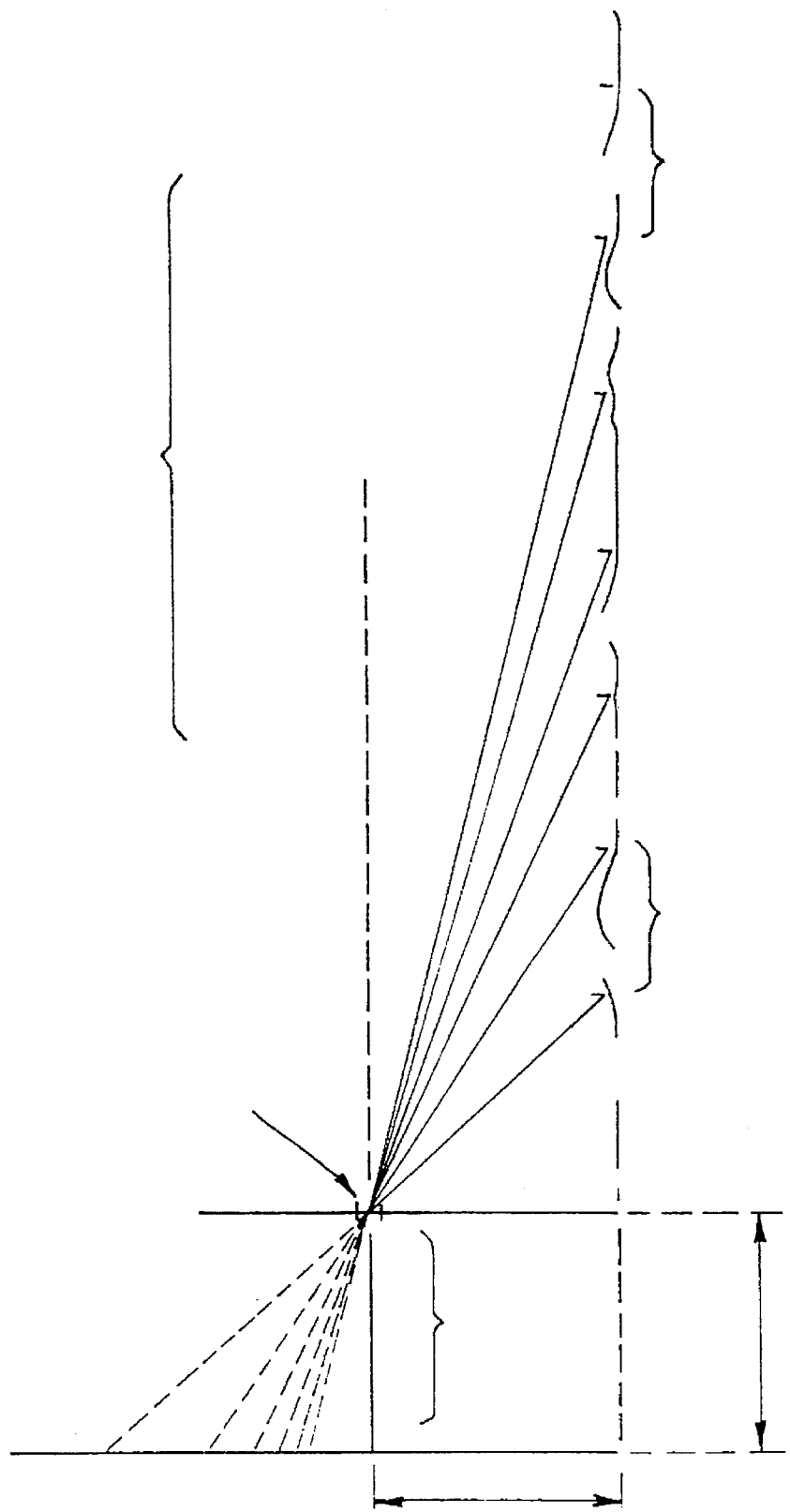
Figure 34A:
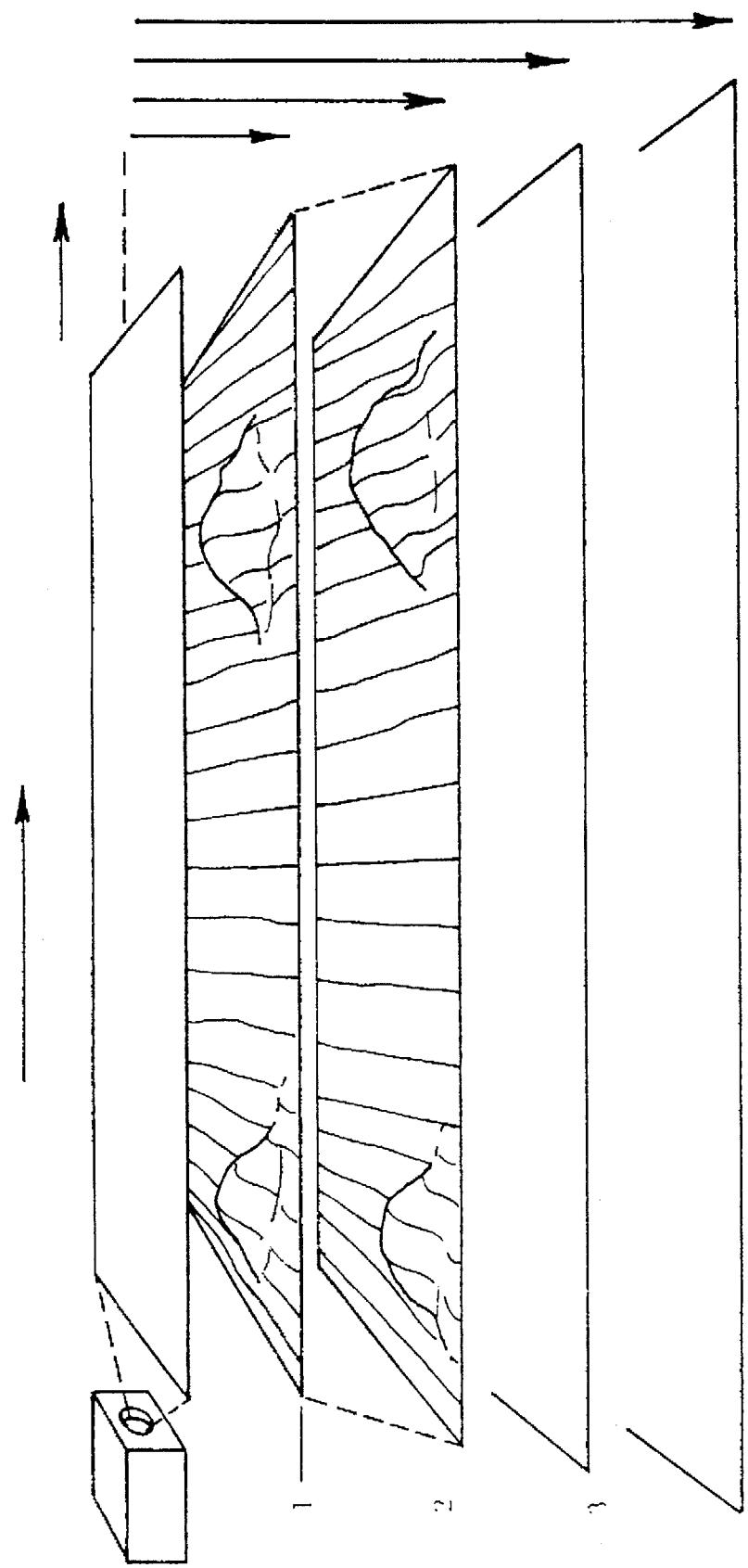
Figure 34B:
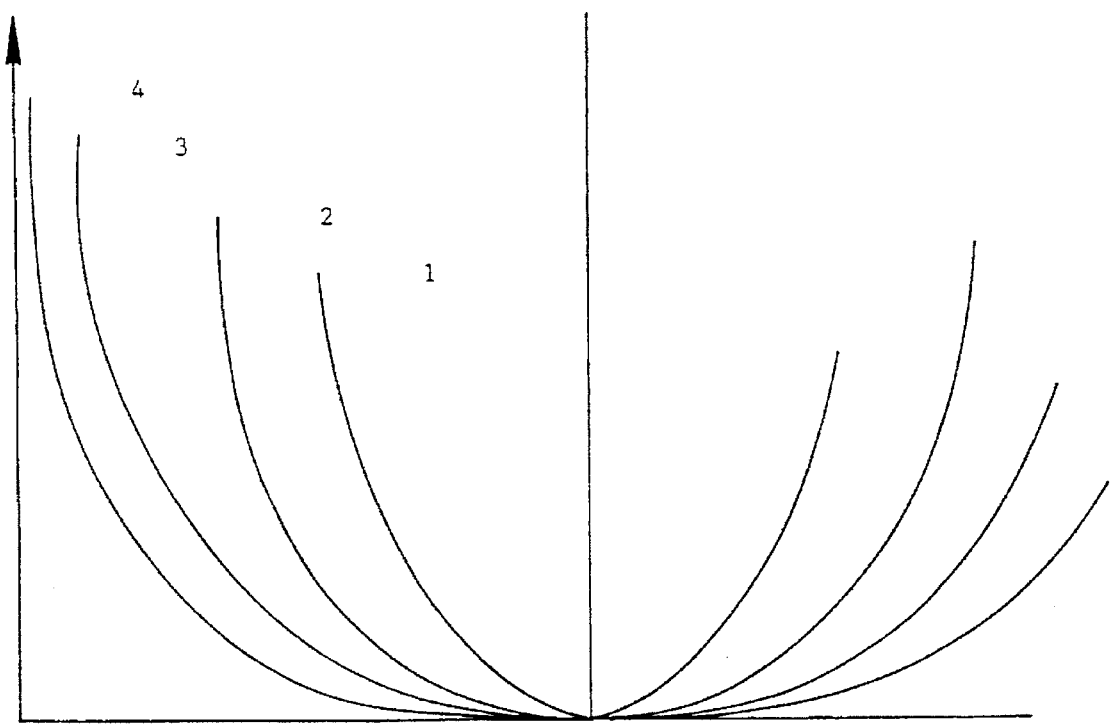

Considering the exposure interval, without this value it is not possible to calculate the x and y coordinate increments within the frame store. This will be seen from FIG. 33 which shows the relationship between the images motions on the screen and the virtual image that they imply. As the object approaches the observer's plane, the degree of movement to be noted on the monitor screen for a given interval of distance transversed greatly increases. FIG. 33 and 33A demonstrate the derivation of part of the motion parallax equation, that give the increment of the y coordinates and vector. FIG. 34 shows the more complicated and significant relationship between the virtual image in FIG. 33 and the real and film images intially produced by the camera. FIG. 34A illustrates the various object planes and FIG. 34B profiles of the various movement curves. FIGS. 33 and 34 are concerned with y or vertical incremental displacement. A similar relationship exists for the x coordinate.

Referring to FIG. 34, the position of the refresh array required to allow for motion parallax given by the natural perspective algorithm is:

$$[Y] = \frac{\text{constant 1} \times \text{exposure interval}}{\text{constant 2} + \text{exposure interval}}$$

The next position will be:

$$\text{New } [Y] = \frac{\text{constant 1} \times (\text{exposure interval} + 1)}{\text{constant 2} + (\text{exposure interval} + 1)}$$

Thus the difference is:

$$[Y] \text{ increment} = \text{New } [Y] - \text{oil } [Y].$$

Note that the x and y coordinates are at any instant related by:

$$\frac{\text{Old }[X]}{\text{Old }[Y]} = \frac{\text{New }[X]}{\text{New }[Y]}$$

Thus (X) increment can be calculated similarly from New [X]—Old [X].

The various steps in the NPA software are set out in the flow chart of FIGS. 37A to 37E which are well-annotated and self-explanatory in view of the detailed description given above.

Figure 35:
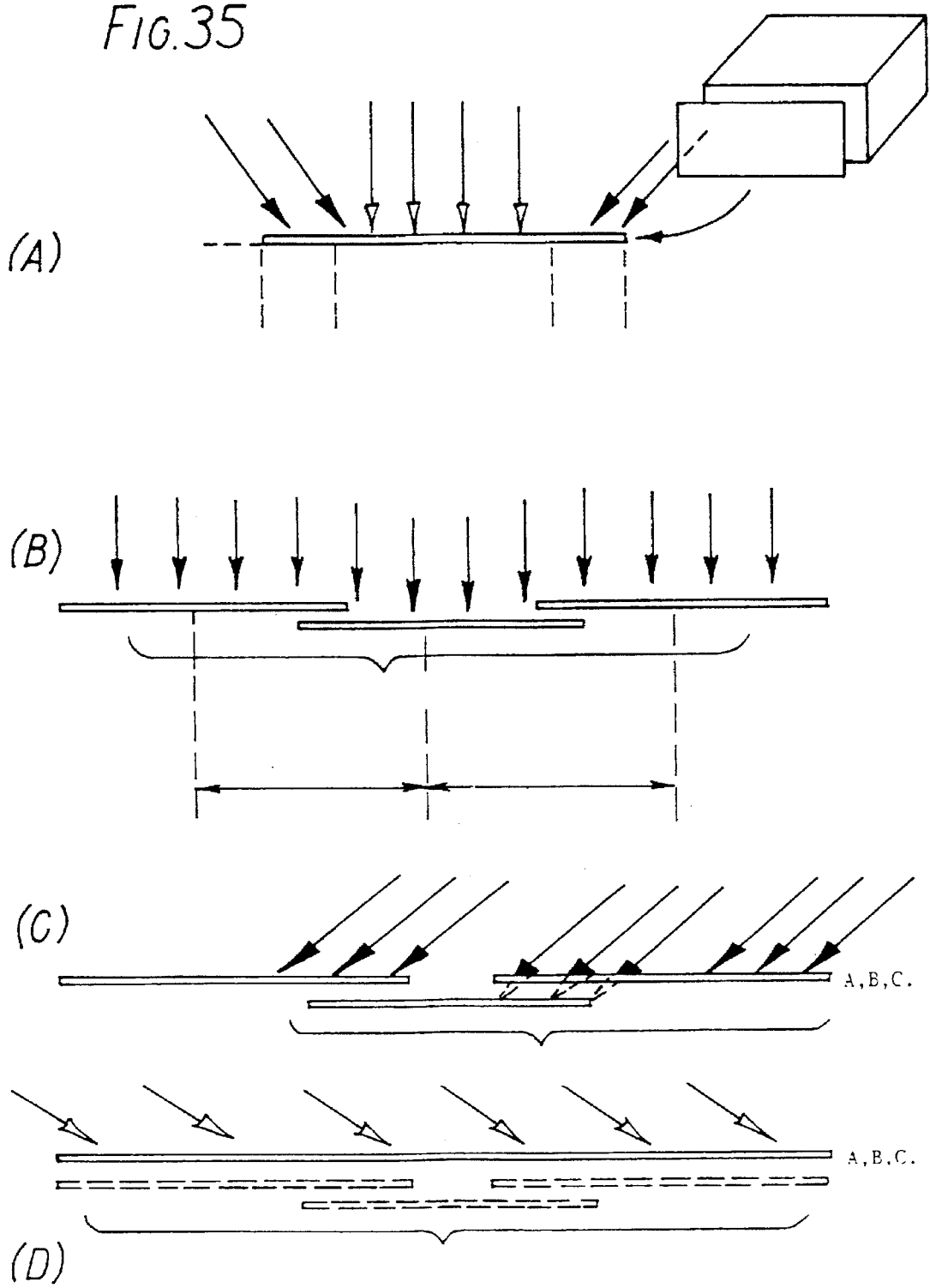
Figure 35A:
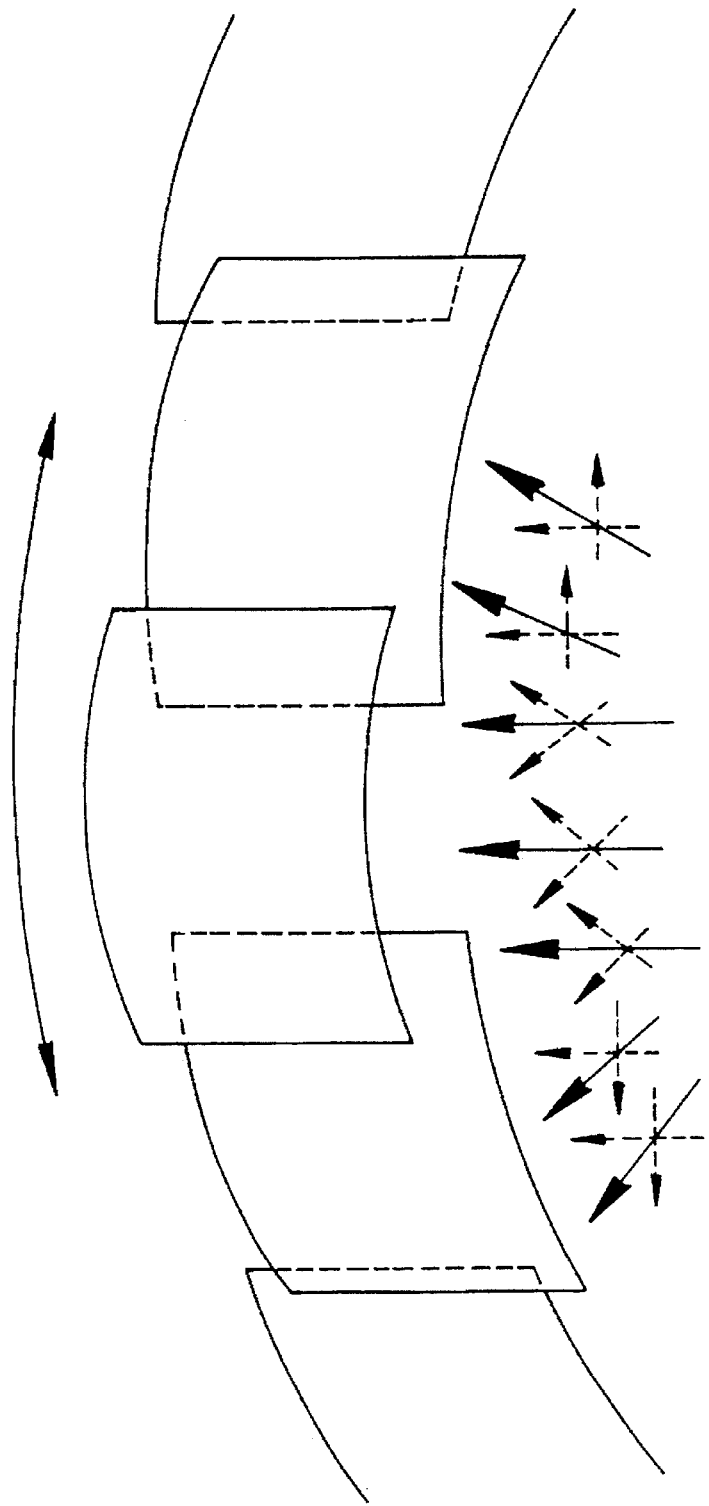

The array separation is chosen to ensure the correct degree of image overlap within the frames of adjacent array vectors. Each frame has information that represents the front of certain objects and the side of others. This is illustrated in FIG. 35. In order to allow the user to see the right side and left side of objects, that information must be somewhere represented in the information stored on the video disc and be quickly available. The ratio of the central region shown at (b) in FIG. 35 to the peripheral regions shown at (c) determines the array separation. This ratio is governed by two factors, namely the properties of the lense, and the distance between the original lense and the objects in view. FIG. 35A shows the intricate relationship between central and peripheral regions and the way they enmesh from one array vector to the next to create a representative panorama.

Figure 35B:
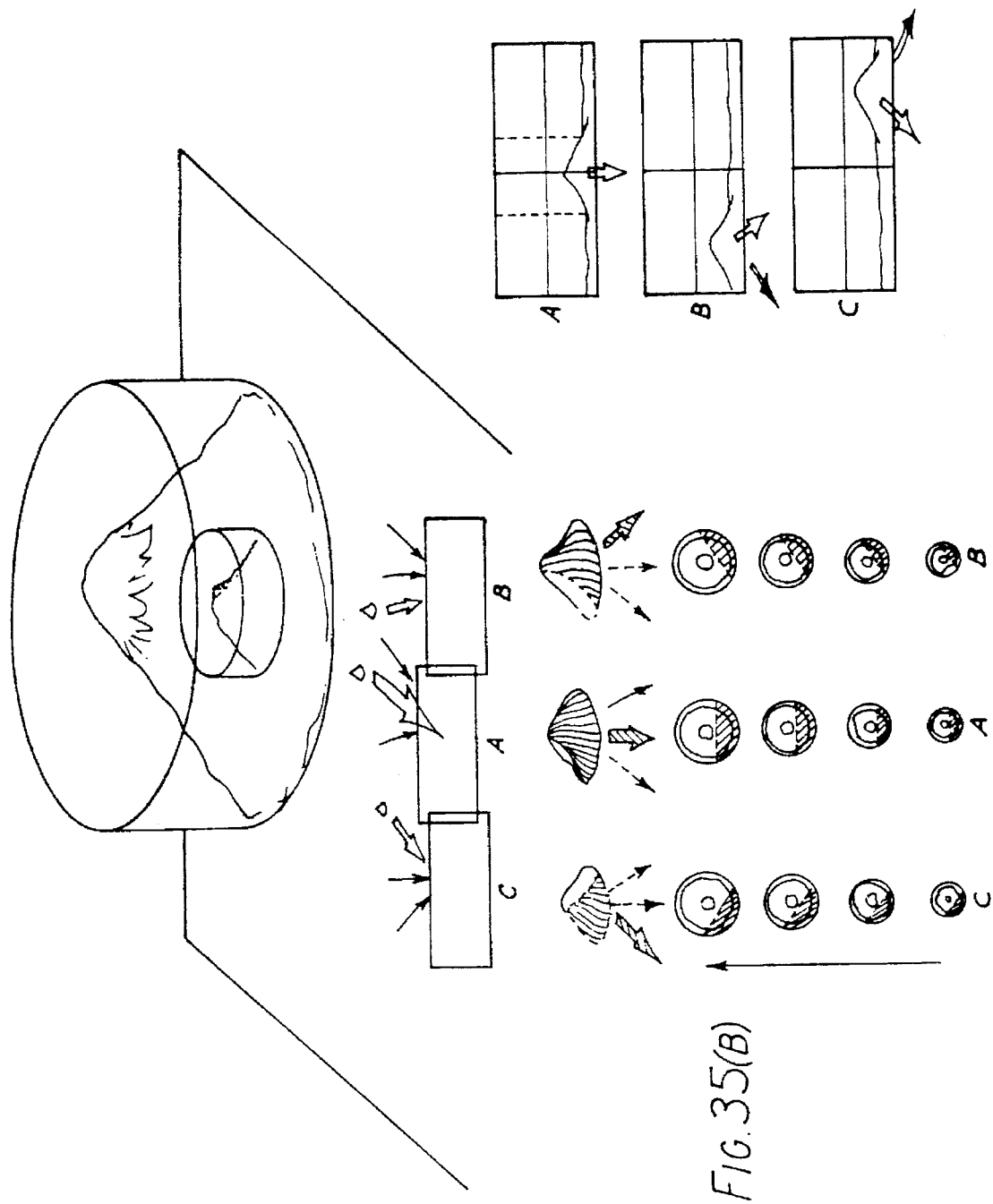
Figure 35D:
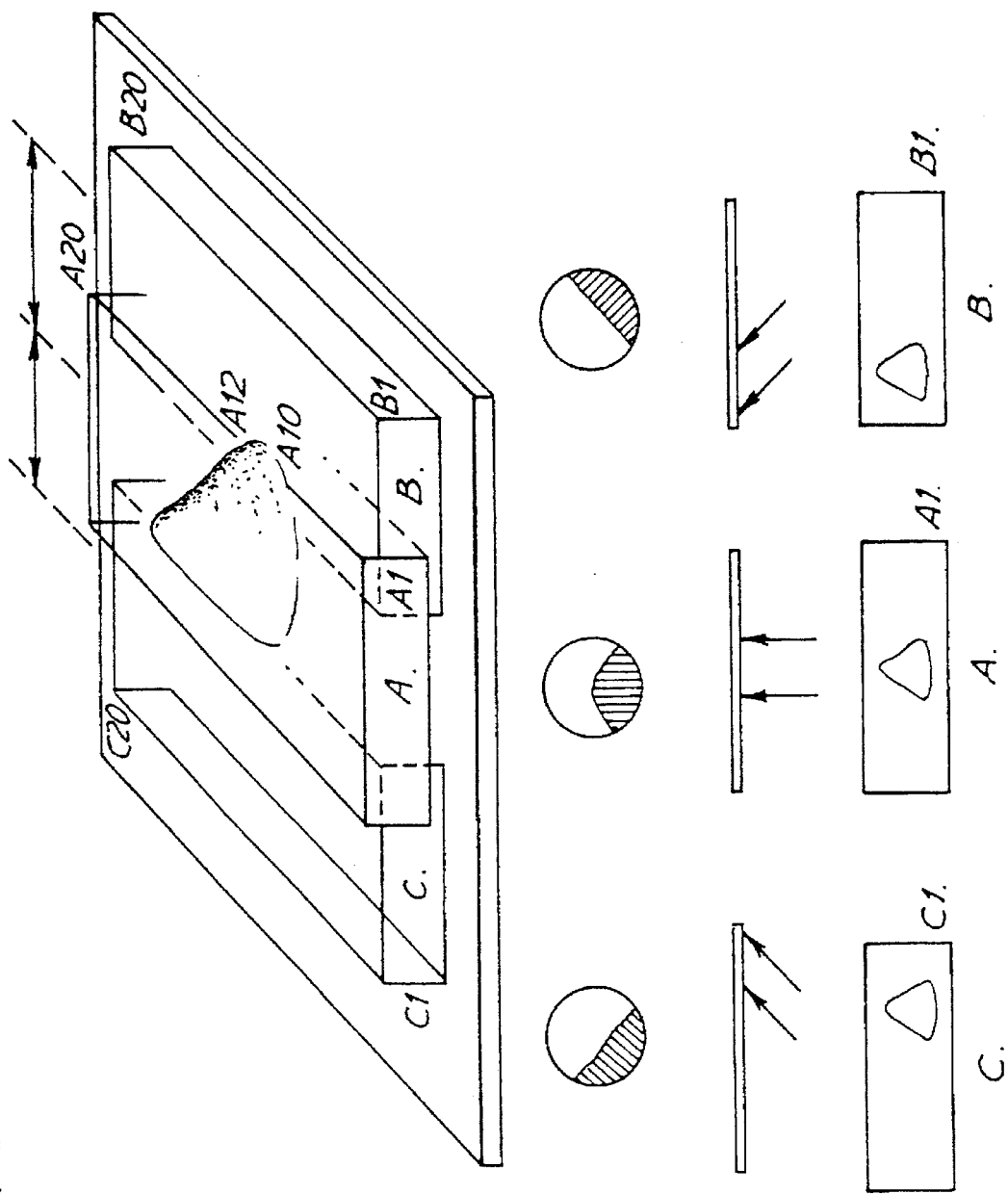
Figure 35E:
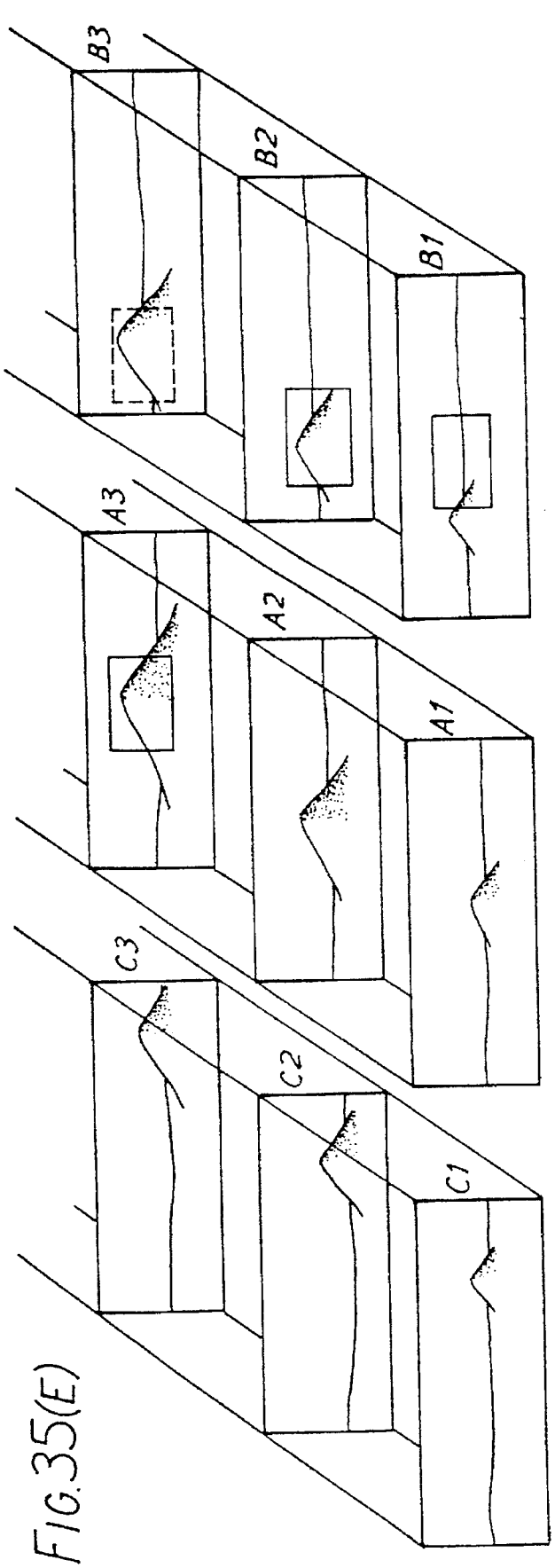
Figure 35F:
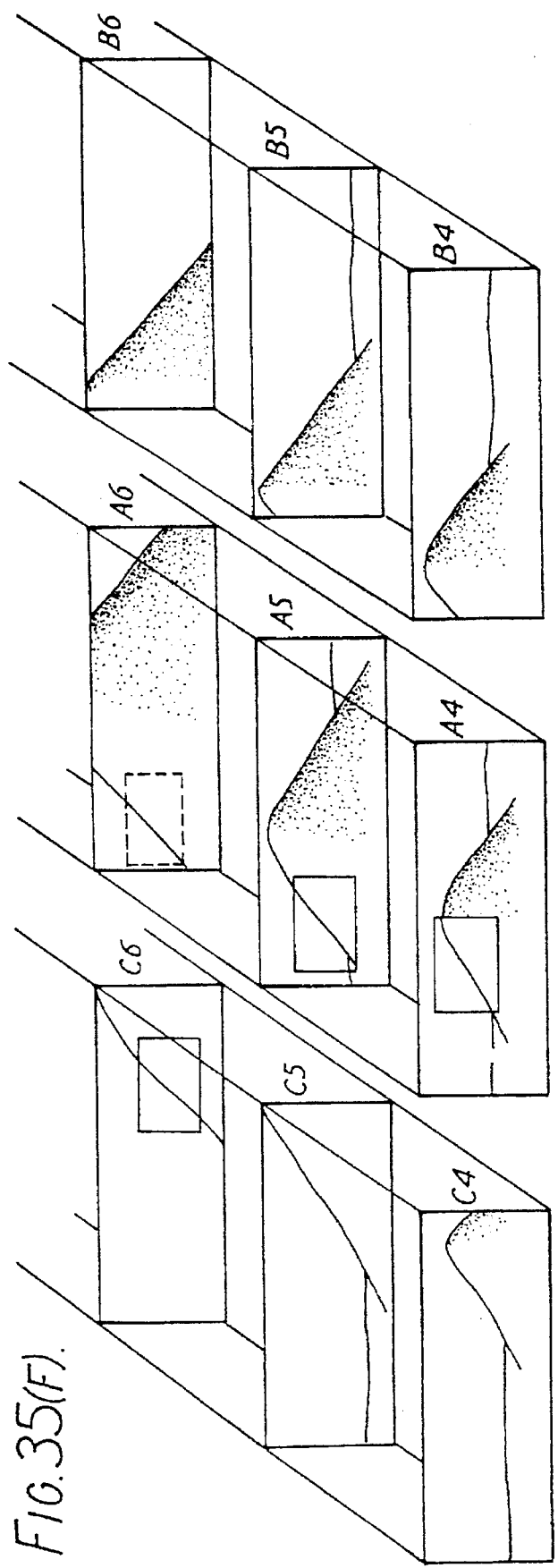
Figure 35G:
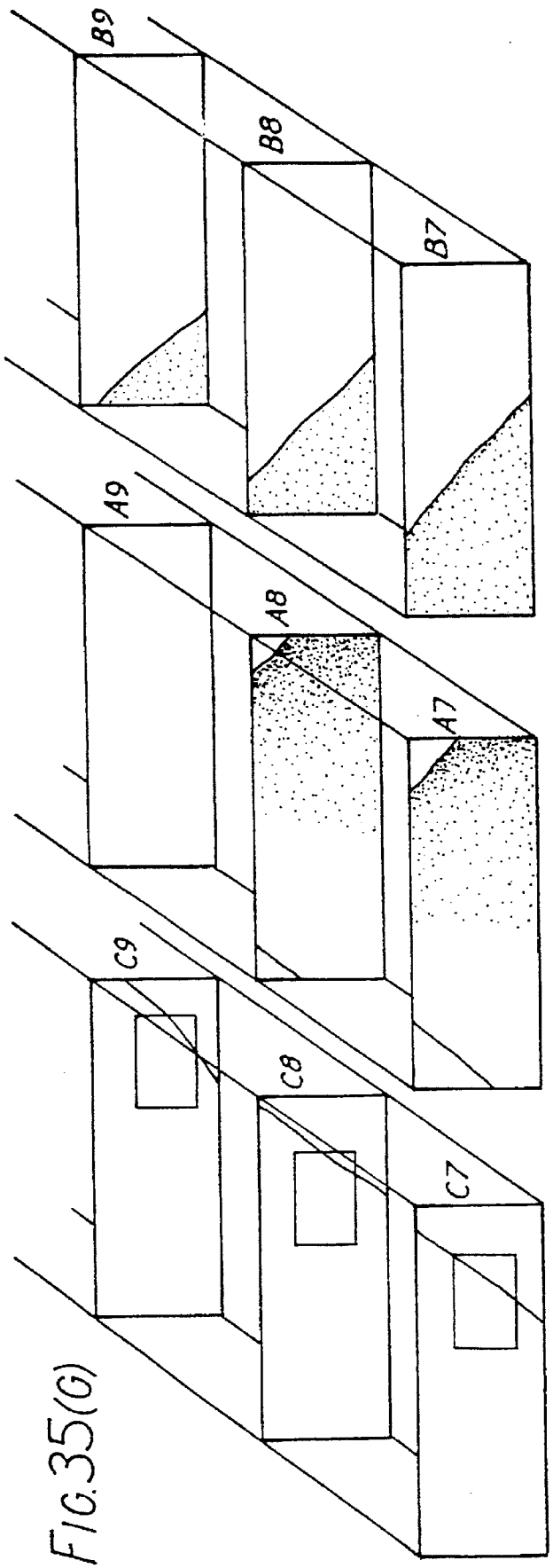
Figure 35H:
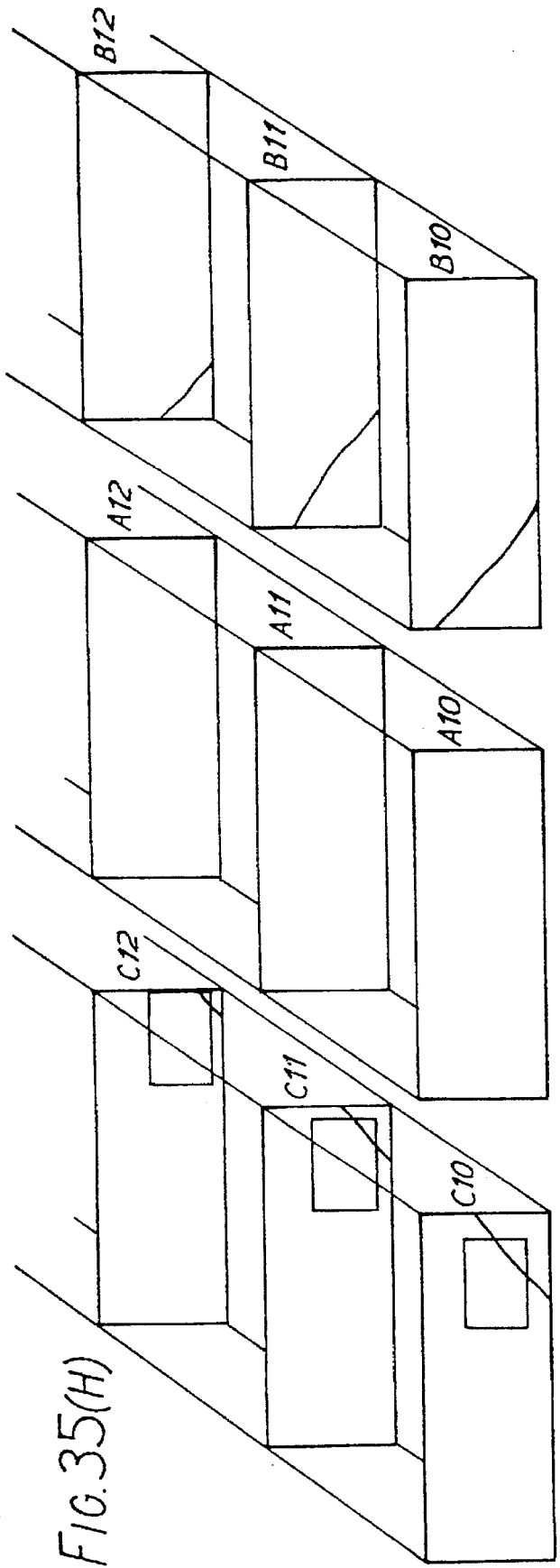
Figure 35I:
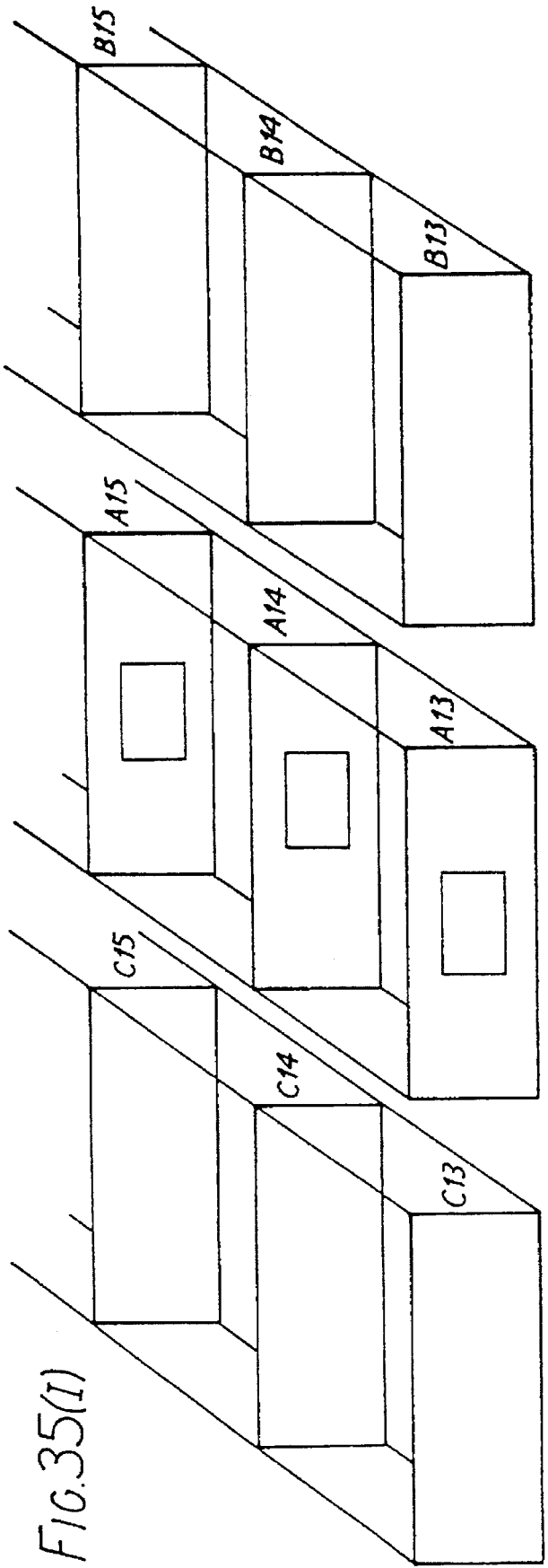

FIG. 35B shows the relationship between the central and peripheral regions as depicted in FIGS. 35 and 35A, and the aspect orientations of the objects on view in the frame.

Figure 35J:
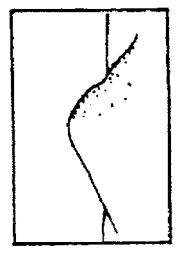

FIGS. 35C to 35J illustrate a "flight around a mountain". FIG. 35C indicates how a representative view must be created at each point in the flight. The "flight" sequences on the following figures have been broken down into five sets of three frames; above are keyed-in the first frame of each of the five sets. FIG. 35J shows the views "out of the cockpit" (the monitor display) of all fifteen frames.

FIGS. 35D to 35J illustrate graphically how the flight path presented in FIG. 35C adjacent, is created by frame selection and refresh array movement within the framestore.

With reference to FIG. 35J it will be recalled that FIG. 30 gives the curves due to each joystick increment (in terms of curved or linear flight) —(+) or (−). As one would expect, joystick increments alone produce curved flight; when no joystick increments is recorded then RAMo always follows motion parallax, i.e. the craft flies in a straight line.

It will be appreciated from the above that the perspectives introduced by the system described are not perfect, but the system relies on the fact that the user's brain generates his sense of perspective from the information presented on an essentially flat two dimensional retina of his eye. Perspective does not exist on this retina, but is generated as an end product by the brain. The transformations introduced by the system are more than adequate for the brain to use to generate proper and very effective subjective perspective effects. The system described is based upon a recognition of the cues which the brain finds most important for generating perceived natural perspectives. It should be noted that the structure illustrated in FIG. 1 can be altered by the addition of a plurality of different image sources such as video discs coupled to one or more frame stores through a frame selector. The microprocessor controls the selection of frames to be stored in the frame store or stores. Subject to cross considerations, the image source could be a solid state memory device accessed by the microprocessor.

The systems illustrated can be provided with appropriate teletext type data transmission systems to allow textual data to be transmitted with signals to the frame store and displayed on the screen. One or more audio channels can be encoded on the laser disc which can be used to enhance the effects created for the user.

As illustrated in FIG. 36, a rotational or rolling effect can be achieved by allowing the refresh array effectively to rotate in its position on the frame store. This feature can be used to simulate the effect of an aircraft backing into a turn for example, and is provided as at 70 in FIG. 1.

The system described has many uses other than in video entertainments systems of the type described. Examples include education, simulation, as the system is capable of simulating a wide variety of situations such as a low-level flight through valleys or a drive through a city environment, business and sports training, assistance in navigation by providing information portrayal which can be compared with what is actually seen, and finally animation producing cartoon style entertainment or television commercials etc. In particular in relation to this last application, it is possible for the system to use intelligent modification of the colour structure of the animated video picture sequences, to give the impression of higher animation rates than are actually being structure of the animated video picture sequences, to give the impression of higher animation rates than are actually being presented.

When interleaving is used, the actual frame refresh rate to the framestore is effectively reduced by a factor equal to half the number of frame sequences interleaved (we have in this text generally illustrated three). This is because in the case of the video disc (or compact disc) the read head lingers on each groove for only one half revolution, reading a field only. The monitor refresh rate is supplied by the frame store, and is at the normal rate. Image motion in each new frame is not solely dependent upon the software images, for the refresh array movement also generates motion which is therefore frame store generated. However, one result of interleaving is to lower the rate at which the original images reach the monitor.

This effect is masked in accordance with a feature of this invention by altering the colour spectral balance of the image for the three successive frame periods for which a particular frame image is shown. This is achieved by a colour look-up table in memory interposed between the frame store and the monitor display.

Further details of some of the elements of FIG. 1 are given in FIGS. 38 to 40. FIG. 38 shows the frame store 60 in more detail in a preferred form, and FIG. 39 a frame grabber circuit which selects appropriate frames outputted by the videodisc player in accordance with a control signal from microprocessor 10. The microprocessor enables the frame grabber on a per-frame or per-field basis so that any desired frame or field can be digitised and stored in the frame store. The video signal is decoded from PAL or NTSC format to RGB component format and the three components digitised simultaneously but separately. The frame store continuously refreshes the monitor. This must be synchronised with the video data being received from the video disc, but it must supply its own clock when the video disc signal is not available, during 'seek' operations for example. The microprocessor preferably can write directly into the frame buffer and also read from it.

The basic sequence of frames is:

Original

Red shift

Original

Blue shift

Original and this five-frame sequence is continuously repeated. The cycle automatically continues at the same frequency which is desirable to achieve optimum subjective effect. The picture-introduced motion still continues on the repeated fields, as the changes in the reading of the framestore still continue.

FIG. 40 shows the additional circuitry required to implement the chromotron feature of varying the colour cast or spectral balance on repeated frames. The colour changes necessary for a particular refresh-frame are calculated and implemented by altering the contents of the colour look-up table (CLT), interposed between the frame buffer and the video output. The CLT can also produce special effects. These include:

(a) The selective viewing of a single colour plane from the frame buffer. This allows limited 'loop' animations of two-colour images without using the video disc or any extra processing power.

(b) Scheme (a) can be extended to store a number of limited colour images in the same frame buffer. Using the CLT the system can switch between these images at any rate, independent of the video disc.

(c) The frame buffer can be split into two separate frame buffers with half the total number of colour planes each. This allows the RIV system to employ a 'double-buffering' scheme. The graphics processor can be building up an image in one of the frame-buffers, whilst the video refresh shows the completed image from the other buffer. This means that the user never sees any half-completed images and that the RIV system exhibits 'graceful degradation' as it is required to produce ever more complex computer-generated animations ('perspective-distortions', 'full-screen rotation') in real-time.

(d) Colour special effects, such as colour reversal, contrast stretching, 'posterisation', pseudo colour and cyclic colour change effects.

(e) One of the frame buffer planes, can be dedicated to switching between the two video sources (video disc and frame buffer). This allows static or dynamically changing areas to contain computer generated images while the rest of the picture information is obtained direct from the video disc.

FIG. 41 shows a preferred video supply device and associated circuitry. There are several laserdisc readers or other playback devices. Perspective transformation takes place in a first frame store which holds a complete stored frame, and two further buffered frame stores hold a complete image for display.

The RIV system can be used to bring film footage under computer control. In this the computer regenerates the original filmed images, but with the user controlled points of view and motion, the computer uses its NPA software to first match the original perspectives and then goes on to generate pseudo perspective transformations using NPA software, all within the frame refresh intervals, which give the user the realtime ability to explore the original filmed environment.

The RIV system's ability to generate a 25 megabyte per second image, means that it can be allied to other computer generated images to create both a realistic background, the texture and perspectives of which are wholly realistic, and a generated object in the foreground with mathematical precision, and then set them in realistic motion controlled settings so that the perspectives of both the foreground object and background objects are integral, complete and hardware controlled.

The interleaved nature of the frame storage is particularly suitable for tuition applications. A point can be taught using a first one of the interleaved sequences. If adequately understood, the pupil moves on to the next point in that sequence. However, if the point is not adequately understood, the pupil can move on to the other sequences in succession to have that particular point re-enforced until it is understood. The successive presentations can include increasing amounts of graphical information to illustrate the point, and can provide for print out of some of the information carried e.g. in teletext form in the vertical blanking interval of selected frames. In this arrangement the main frame store need only hold an image the size of the display as perspective transformation may not be required.

For example, it is possible to create on screen an interactive lecture as given by, for example, a nuclear physicist with permitted discussion within a controlled topic range.

In the case of recreating such a lecture the system does not have to cope with the generation of natural perspectives or pseudo perspective transformation. RIV education recreates the basic teaching didactic process in which the on screen teacher explains a point, however complex and at whatever length; and then asks the class to indicate whether as not they understood. If they do the teacher immediately goes on to the next point. If they indicate that they have not understood, then the teacher presents the same point but by way of a different analogy or further reference material, or by a practical or secondary example.

The RIV system techniques allow the encoding and realtime interactive presentation of these explanations for each theme.

Figure 44A:
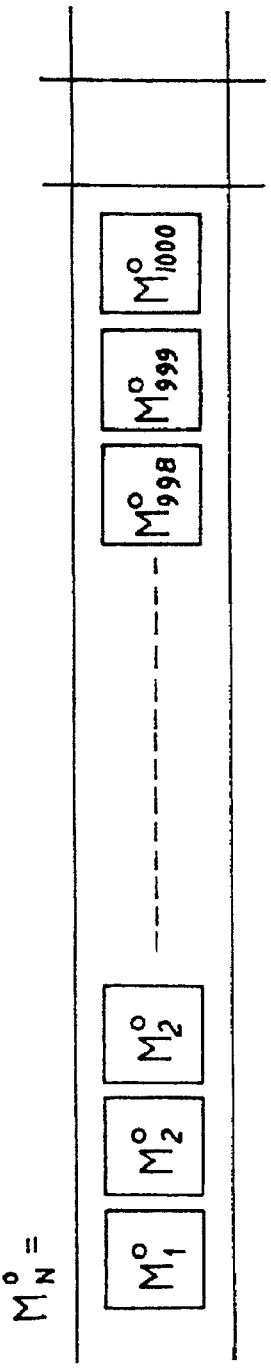
Figure 44B:
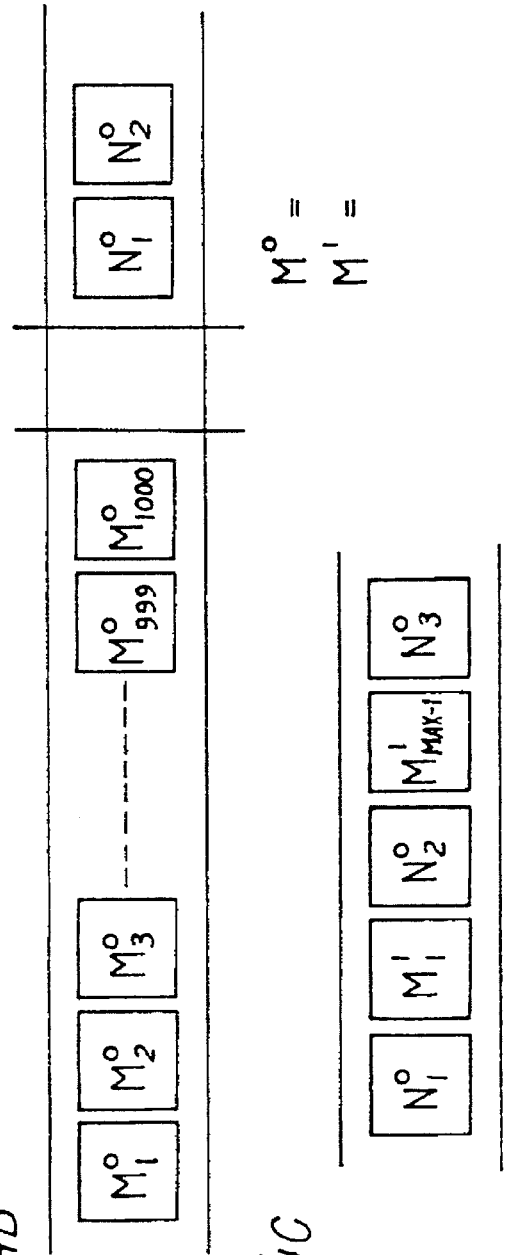
Figure 44C:
Figure 44D:
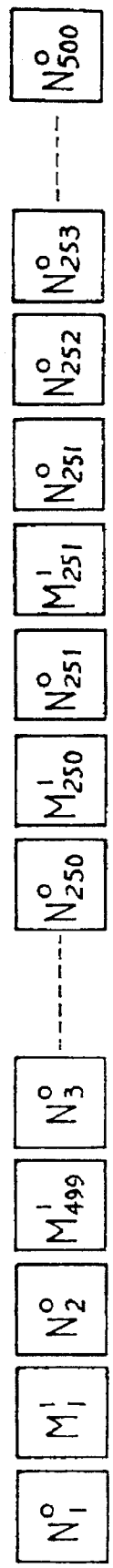
Figure 44E:
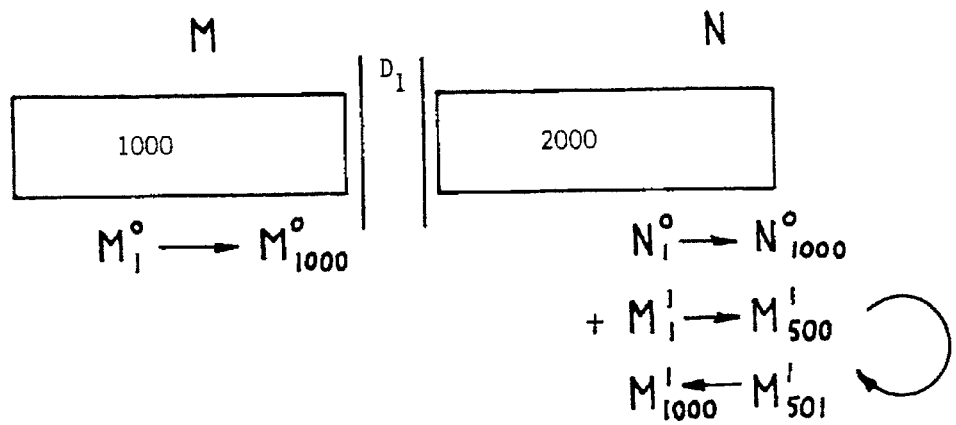
Figure 44F:
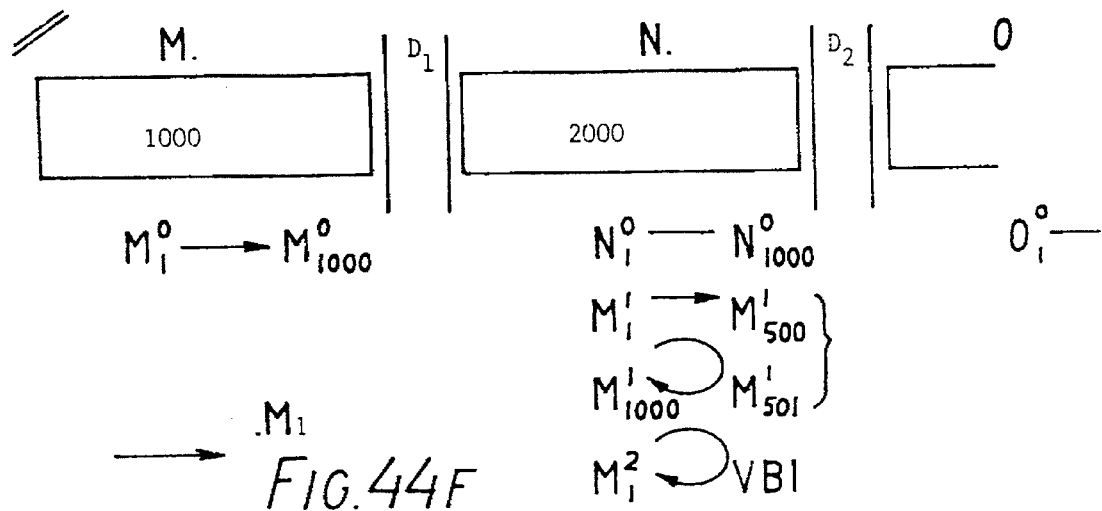
Figure 44G:
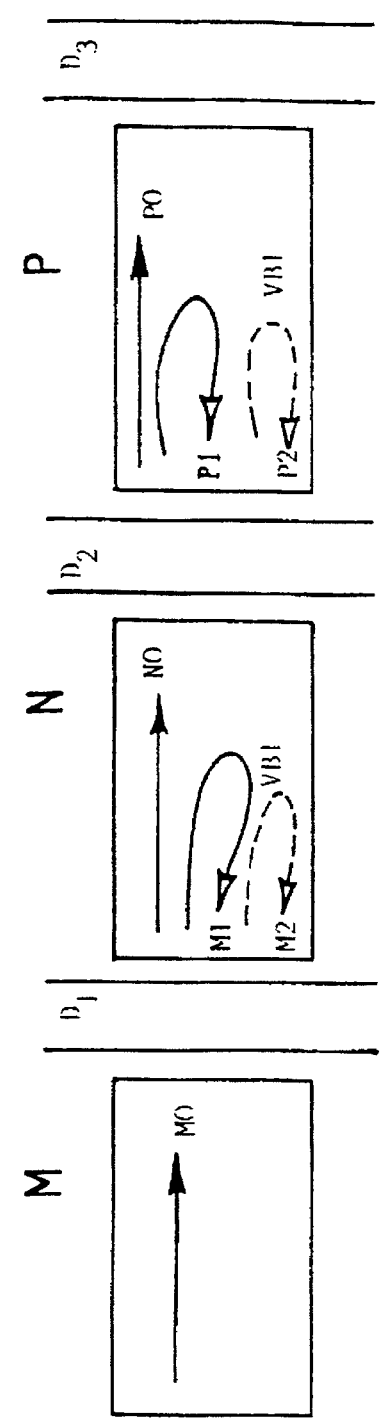
Figure 44H:
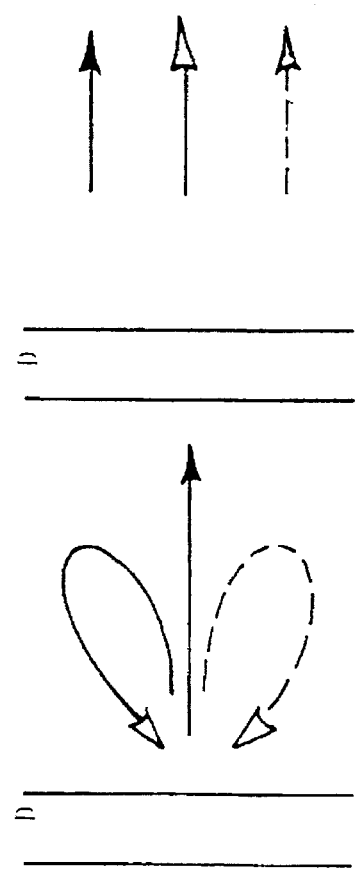

RIV software has interleaved frames, with each frame not necessarily relating to the preceding and succeeding frames. If we consider a particular point, presented in an audio visual manner and requiring say 1000 frames, we shall call these the M° frames. So, the point is explained as the read head scans frames $M°_1$ to $M°_{1000}$, as shown in FIG. 44A. After frame $M°_{1000}$, there is a divider zone $D_1$. At the end of the explanation frame $M°_{1000}$, the onscreen individual (the teacher) then asks if it was understood. If the answer is yes then the read head addresses to the next section, which contain the N° frames comprising the explanation of the next point, see FIG. 44B.

However, if the response is no, i.e. that it was not understood, then the read head still advances on to the N section of frames, for interleaved amongst them are the frames carrying the second explanation of the first point.

These interleaved frames $M_1^1 \ldots M_{500}^1$ are read up to halfway through section N, and then the read head returns to the Zone $D_1$, reading the other frames $M_{500}^1 \ldots M_{1000}^1$. ..., Thus in between the frames $N°_1$ to $N°_{500}$ there are the two interleaved sets of frames, frames $M_1^1$ to $M_{500}^1$ being one set, and $M_{1000}^1$ to $M_{501}^1$ being the other set. At zone $D_1$ the on screen teacher can again ask if the point is now understood after the second explanation. If it is then the read head advances smoothly onto the beginning of Section N, which it is positioned so to do. This is illustrated in FIGS. 44C to 44H, FIG. 44D shows part of a sequence of 500 $M^1$ frames rather than 1000.

If however, at the second arrival at Zone D1, the response is still that the point is not understood, then a third explanation is presented. This is in the form of a teletext presentation of text on screen with pictogram style graphics. If a printer is part of the hardware this presentation can be printed out. This is intended to simulate the teacher telling the pupil to read up on the subject to aid and/or speed understanding. This third and final teletext explanation is encoded within the vertical blanking interval (VBI) capacity of the frames carrying the second explanation, so that once the teletext presentation is complete the read head is once again in Zone $D_1$, and therefore is ready to proceed smoothly into the explanation of the next point. In other words, because the second explanation frames double back on themselves, beginning and ending at the Zone $D_1$, so also the teletext presentation, being contained within the VBI of those same frames, likewise begins and ends at Zone $D_1$.

Based on laserdisc and compact disc technology as its image source, each explanation begins from and ends at a D Zone. See FIG. 5.

The system illustrated in its various variants has enormous advantages over prior interactive video systems. It does not require a machine with fast access times, and there is no need for high speed scans of the video scans. That is to say with a videodisc embodiment the laser head never needs to leave the disc; it is always reading and it never has to travel faster than 60 disc grooves per second. The rapid access time between adjacent sequences (i.e. array vectors, or chapters) is achieved by hardware processing of the video signal. Once it has left the video disc player, the frame grabber simply selects the required one of the interlaced sequences, under microprocessor control. Thus, the requirements on the videodisc play are that the laser head is capable of moving at speeds of 0 to 60 grooves per second (or frames per second). This top speed is less than the fast forward speed on domestic CD or VCR players.

The onscreen speed that the user sees is dependent upon three things. The first is the speed of the laser tracking head, the second is the distance moved by the camera between exposures in the initial preparation of the stored frames, and the third the speed of the refresh array movement within the frame store.

It is possible to design an effective system based on equipment currently-available for sale for domestic use, with appropriate additional interfacing and control circuitry. The digital image stored in the frame store, which in cases where psuedo perspective transformation is used is never fully seen at one time, may for example be up to 1000 by 1000 pixels per frame. Preferably the picture seen by the user has an interlaced scan and uses only part, up to say 500 by 1000, pixels per displayed frame.

In summarising, the RIV system integrates software preparations with hardware architecture and hardware (microprocessor) processing to produce unique and highly effective results. This integration is reflected in the fact that where the RIV system ROM and RAM memory are seen as a joint "hybrid" memory which is referred to as RARAM : Read and Random Access Memory.

This integration allows the RIV system to generate it three characteristic features:

(1) RIV: encoding/decoding, which establishes a more effective random access heuristic method than hitherto seen, it allows the selection of the relevant frames within a frame interval and without disruption of the image supply device and therefore is economical both in terms of time and equipment.

(2) RIV: chromatron which is a simple effective image enhancer.

(3) RIV: Perspectives, which employ AVC (array vector coordination, which includes quadrant correlations) and NPA (Natural perspectives algorithm) to generate PPT (Psuedo perspectives transformations), which bring the massive data rates of natural images under microcomputer control.

PPT, Pseudo perspective transformations are the end effect, when the user's joystick performance and NPA are combined within the RIV system, to generate the sensation of the user being able to head off in any direction. As has been already explained, this sensation is in part an optical illustration, generated by the hardware's unseen movement of the frame of reference that the brain uses to generate the user's understanding of what is going on. These frames of reference are the static edges of the monitor screen, which the brain uses to interpret the on screen motion. In effect the RIV hardware and software are combining to intelligently move the edges of the monitor, generating secondary perspectives: pseudo perspective transformation.

RIV perspectives are clearly essential to some applications of the RIV system, and represent the most dynamic of the above three features. However, it is important to stress that the criteria for all applications of the RIV system is that the system should allow a realtime interaction and for many of these, perspectives transformations are not required.

FIG. 45 shows the main system components with implementational details as to the preferred microprocessors used. The host subsystems is based on an 80286 microprocessor with half a megabyte of RAM memory. The framestore sub-system which receives the video signal can be based on 32K by 8-bit static RAMs, ten of which can be organised as two 32K by 40 bit field store blocks. Writing takes place to one store while the other is being read. Samples can take place with:

| | |
|---|---|
| 4 luminance samples at 7 bits each | |
| 1 U sample | at 6 bits |
| 1 V sample | at 6 bits. |

This gives a packet size of 40 bits. With 768 samples per line the framestore receives the 40 bit packets at 1.6 MHz. The construction of the full system will be apparent to the skilled reader of this specification from the information given.

A list of selected applications is given on the following appendix.

APPENDIX

THE RIV SYSTEM

APPLICATIONS

The RIV system is an interactive video system designed to have many applications, which, initially included;

1. RIV: SIMULATION

The RIV systems developed for this application could be considered to be the top end of the range, and they will demonstrate the most vivid aspects of the RIV systems capabilities. These systems will be able to simulate a wide range of environments and situations including a low level flight through the Welsh Valleys or a drive through New York City.

2. RIV: EDUCATION

This was also one of the initial areas, the intention being to aim for equipping all schools with a RIV: Education Consul and a set of RIV: Education Videodiscs. The approach being akin to the "Nuffield Program". In this application all the pupils (in the particular class) would have a key pad-interface on their desks which, together with a controller device for the teacher, would connect to the consul. Should such a system be adopted, considerable planning would go into each item of software. The main advance over current class visual teaching aids, being that as opposed to "sit and watch", the RIV system is pupil participation and being realtime, it will hold their attention.

3. RIV: ENTERTAINMENT

This was the area initially considered, the intention being to introduce the most graphically advanced and stimulating series of arcade and eventually domestic games into the market, so much so that we look upon them as an "entertainment experience" rather than just a game. We believe that on their introduction, they will set the standard for the others to follow.

4. RIV: TRAINING

Similar to RIV: Simulation, but aimed at the more prosaic world of business training, sports trains, and "on site" information, with a greater emphasis on textual presentation, and with far less need for image manipulation.

The following applications were considered, following initial work on the above;

5. RIV: NAVIGATION (In-flight)

An in-cabin display system which also interfaces with the instrumentation panel, to give a visual representation of the landscape below and around the linear, along with textural information pertinent to that location. Each software disc enclosed for a particular route, with a premium for those hazardous approaches. A future version for cars and holidaying abroad is a possibility.

6. RIV: ANIMATION

A library of classic and contemporary animated backgrounds, for studio use in the making of low budget, high quality children's programming. Also as a high resolution interactive supplement to computer generated animation for consummate effects.

7. RIV: HOME LIBRARY

The RIV hardware in a domestic setting with RIV software arriving via cable. The massive high speed and random access memory capabilities of the RIV System make it formidable in this application if properly developed with an input from cable interests.

Some preparation study was carried out on the following application areas:

8. RIV: COMPUTER THEATRE

A combination of RIV Entertainment and RIV Education, with an entire cinema audience supplied with a basic keypad and joystick and interactive on a "majority-rule" basis, with a high quality film with an adventure content. Amusement parks initially and then perhaps selected cinemas.

9. RIV: "USER FRIENDLY"

At this stage, a speculative concept, linking the RIV System to natural language generators and natural language analysers as and when they arrive for humanising the face of high technology, literally.

10. RIV: MACHINE-TO-MACHINE SIMULATIONS

All these areas, with the possible exception of "home library", involve visual image data being the prime component of the video signal within the system. More interesting future applications involve "non-visual" data simulations, in which the RIV System connects with other systems of whatever nature: alarm systems, A.I. systems, component testing systems, general computer systems, and puts them "through their paces" by introducing to them, via the link up, situations analogous to the system-format under consideration, and by varying the conditions in "realtime", see how efficiently the system can cope with various eventualities.

I claim:

1. A video system comprising:

a video playback device for sequentially reproducing a plurality of images stored on a record medium which form a moving picture sequence, said device comprising:

a display device for reproducing a video picture from the video playback device;

an input device for enabling the user to indicate desired movement;

a framestore coupled between said video playback device and said display device, said framestore being capable of storing an image substantially larger than that currently displayed on said display device;

control means for controlling reading of video information from the framestore, said control means being operable to select a desired image from said plurality of images and a desired portion of said selected image in dependence on:

(i) the output of said input device, and (ii) the image and image portion currently being displayed on the display device, wherein at least some of the image portions are repeated for display; and, means coupled between said framestore and said display device for giving some of the repeated images color casts to help mask the effect of the repetition of the frames.

2. A method of reproducing on a display a plurality of images which form a moving picture sequence stored on a record medium, said plurality of images forming said moving picture sequence having a larger format than that of said display, said method comprising the steps of:

reading said plurality of images forming said picture sequence from said record medium;

storing successive images of said picture sequence from said record medium in a framestore in the form of video data;

reading said video data from said framestore and displaying a portion of said video data representing an image selected from said plurality of images in said framestore on a video display device;

providing a signal from a user input device to indicate desired movement and monitoring said signal from said user input device;

monitoring the portion of the selected image currently being displayed;

the reading of said video data from said framestore being controlled such that the image selected from said plurality of images and the portion of the selected image displayed on said video display device are chosen in dependence upon:

(i) the signal supplied by the user input device; and, (ii) the image and image portion currently being displayed;

supplying image portions at a rate lower than that required by the video display device;

storing selected image portions in a framestore; and supplying selected image portions of video data from said framestore to said video display device and repeating at least some of the image portions for display, at least some of the repeated image portions being given color casts to help mask the effect of the repetition of said image portions.

* * * * *